United States Patent [19]

Johnson et al.

[11] Patent Number: 6,081,798

[45] Date of Patent: Jun. 27, 2000

[54] OBJECT ORIENTED CASE-BASED REASONING FRAMEWORK MECHANISM

[75] Inventors: Verlyn Mark Johnson, Wykoff; Dennis Dale Koski; Thomas Alan Shore, both of Rochester, all of Minn.

[73] Assignee: International Business Machines Corp., Armonk, N.Y.

[21] Appl. No.: 08/639,322

[22] Filed: Apr. 24, 1996

[51] Int. Cl.[7] .................................................. G06F 15/18
[52] U.S. Cl. ................................ 706/54; 706/53; 706/60
[58] Field of Search .................................. 395/75, 50, 62, 395/76, 51; 706/54, 59, 60, 53

[56] References Cited

U.S. PATENT DOCUMENTS

| | | | |
|---|---|---|---|
| 4,531,186 | 7/1985 | Knapman | 707/5 |
| 4,943,932 | 7/1990 | Lark et al. | 706/60 |
| 5,020,019 | 5/1991 | Ogawa | 707/5 |
| 5,057,996 | 10/1991 | Cutler et al. | 395/676 |

(List continued on next page.)

FOREIGN PATENT DOCUMENTS 94305866  8/1994  European Pat. Off. ........ G06F 17/30

OTHER PUBLICATIONS

T. Yamaguti et al., "Legal Knowledge Acquisition Using Case–Based Reasoning and Model Inference," Proceedings of the Fourth International Conference on Artificial Intelligence and Law, Dec. 1993, pp. 212–217.

R. Bergmann et al., "Explanation–based Similarity for Case Retrieval and Adaptation and its Application to Diagnosis and Planning Tasks," European Workshop on Case–Based Reasoning, Springer, Dec. 1993, pp. 182–196.

Text of *IBM Technical Disclosure Bulletin*, vol. 37, DeBinder et al., Feb. 1994, "Results Folder Framework", pp. 431–432.

Text of *IBM Technical Disclosure Bulletin*, vol. 36, Coskun, N., Jun. 1993, "Persistent Framework Independent Record/Playback Framework", pp. 261–264.

Text of *IBM Technical Disclosure Bulletin*, Baker et al., Oct. 1991, "Model View Schema", pp. 321–322.

Text of *IBM Technical Disclosure Bulletin*, Baker et al., Oct. 1991, "Office Container Class", pp. 309–310.

Text of *IBM Technical Disclosure Bulletin*, Cavendish et al., Jul. 1991, "Icon Pane Class", pp. 118–119.

Text of *IBM Technical Disclosure Bulletin*, Baker et al., Jun. 1991, "Distribution List Class", p. 159.

Text of *IBM Technical Disclosure Bulletin*, Cavendish et al., Jun. 1991, "Object–Oriented Documentation Tool", pp. 50–51.

Text of *IBM Technical Disclosure Bulletin*, Allard et al., Feb. 1990, "Object–Oriented Programming in C—the Linnaeus System", pp. 437–439.

(List continued on next page.)

*Primary Examiner*—Robert W. Downs
*Attorney, Agent, or Firm*—Martin & Associates L.L.C.; Derek P. Martin

[57] ABSTRACT

A framework for use with object-oriented programming systems provides a case-based reasoning (CBR) system shell that permits a framework user to develop a case base having case histories and generates a case-based reasoning system that receives user requests for query solutions and produces a query solution that can be incorporated into the case base. The framework includes a Session component that controls processing of the CBR system, a Control Flow component that manages the extension of the categories and classes of the OO framework, a Data Store component that stores persistent case structure definitions, case instances, and a change log, a Presentation component that manages the user interface to the CBR system user, and a Query Engine that evaluates a received query against the case base. The case definitions and case base descriptions comprise a set of object oriented classes that are organized into an inheritance hierarchy. Also disclosed is a case-based reasoning system that permits dynamic adjustment of property weights in either object oriented programming implementations or procedural programming implementations. This permits users to control which properties and weights are used and whether missing items should penalize case matching.

98 Claims, 43 Drawing Sheets

U.S. PATENT DOCUMENTS

| | | | |
|---|---|---|---|
| 5,101,364 | 3/1992 | Davenport et al. | 345/328 |
| 5,119,469 | 6/1992 | Alkon et al. | 706/25 |
| 5,119,475 | 6/1992 | Smith et al. | 345/353 |
| 5,181,162 | 1/1993 | Smith et al. | 707/530 |
| 5,195,172 | 3/1993 | Elad et al. | 706/62 |
| 5,222,195 | 6/1993 | Alkon et al. | 706/25 |
| 5,226,161 | 7/1993 | Khoyi et al. | 395/683 |
| 5,247,693 | 9/1993 | Bristol | 395/705 |
| 5,249,270 | 9/1993 | Stewart et al. | 395/200.52 |
| 5,251,131 | 10/1993 | Masand et al. | 704/9 |
| 5,257,384 | 10/1993 | Farrand et al. | 395/285 |
| 5,261,080 | 11/1993 | Khoyi et al. | 395/500 |
| 5,263,159 | 11/1993 | Mitsui | 707/5 |
| 5,274,572 | 12/1993 | O'Neill et al. | 702/57 |
| 5,276,775 | 1/1994 | Meng | 706/51 |
| 5,287,447 | 2/1994 | Miller et al. | 345/342 |
| 5,289,563 | 2/1994 | Nomoto et al. | 706/45 |
| 5,293,470 | 3/1994 | Birch et al. | 345/435 |
| 5,297,283 | 3/1994 | Kelly, Jr. et al. | 395/674 |
| 5,315,703 | 5/1994 | Matheny et al. | 345/507 |
| 5,317,677 | 5/1994 | Dolan et al. | 706/10 |
| 5,367,633 | 11/1994 | Matheny et al. | 345/514 |
| 5,369,766 | 11/1994 | Nakano et al. | 395/685 |
| 5,377,309 | 12/1994 | Sonobe et al. | 706/60 |
| 5,379,430 | 1/1995 | Nguyen | 707/3 |
| 5,388,264 | 2/1995 | Tobias, II et al. | 707/103 |
| 5,390,325 | 2/1995 | Miller | 395/183.14 |
| 5,396,626 | 3/1995 | Nguyen | 395/701 |
| 5,398,336 | 3/1995 | Tantry et al. | 707/103 |
| 5,404,514 | 4/1995 | Kageneck et al. | 707/5 |
| 5,412,756 | 5/1995 | Bauman et al. | 706/45 |
| 5,418,951 | 5/1995 | Damashek | 707/5 |
| 5,555,201 | 9/1996 | Dangelo et al. | 364/489 |
| 5,555,370 | 9/1996 | Li et al. | 345/334 |

OTHER PUBLICATIONS

Text of *IBM Technical Disclosure Bulletin*, vol. 38, No. 1, Jan. 1995, pp. 411–414, J. Knapman "Generating Specific Server Programs in Distributed Object–Oriented Customer Information Control System".

Text of *IBM Technical Disclosure Bulletin*, vol. 37, No. 12, Dec. 1994, pp. 19–20, Al–Karmi et al., "Events Set for Event Tracing in Distributed Object–Oriented Systems".

Text of *IBM Technical Disclosure Bulletin*, vol. 37, No. 12, Dec. 1994, pp. 375–378, Acker et al., "Automatically Generating Formatted Documentation for Object–Oriented Class Libraries".

Text of *IBM Technical Disclosure Bulletin*, vol. 37, No. 11, Nov. 1994, pp. 71–72, Behrs et al., "Device Support Framework to Support ISO DPA 10175 and POSIX 1387.4".

Text of *IBM Technical Disclosure Bulletin*, vol. 37, No. 7, Jul. 1994, pp. 145–146, Banda et al., "Exception Management Algorithm for Multi–Threaded Method Invocation".

Text of *IBM Technical Disclosure Bulletin*, vol. 37, No. 6B, Jun. 1994, pp. 553–556, Gest et al., "Portable Object–Oriented Event Manager".

Abstract for WIPO Patent Application No. WO 95/04966, F.T. Nguyen, Feb. 16, 1995, "Automatic Management of Components in Object–Oriented System".

Abstract for U.S. Patent No. 5,388,264, Milne et al., Feb. 7, 1995, "Object–Oriented Framework System for Enabling Multimedia Presentations with Routing and Editing of MIDI Information".

Abstract for WIPO Patent Application No. WO 94/23364, Heninger et al., Oct. 13, 1994, "Framework Processing Apparatus for Application Software".

Abstract for U.S. Patent No. 5,369,766, Heninger et al., Nov. 29, 1994, "Object Oriented Application Processing Apparatus".

Abstract for WIPO Patent Application No. 94/19752, Anderson et al., Sep. 1, 1994, "Concurrent Framework Processing Apparatus For Two or More Users".

Abstract for WIPO Patent Application No. 94/19751, Anderson et al., Sep. 1, 1994, "Concurrent Framework Processing Apparatus For Application Users".

Abstract for WIPO Patent Application No. 94/19740, Goldsmith et al., Sep. 1, 1994 "Framework Processor of Object–Oriented Application".

Abstract for WIPO Patent Application No. 94/15286, Goldsmith et al., Jul. 7, 1994, "Object–Oriented Framework for Object Operating System".

Abstract for WIPO Patent Application No. 94/15282, Anderson et al., Jul. 7, 1994, "Dialog System Object–Oriented System Software Platform".

Abstract for WIPO Patent Application No. 94/15281, Anderson et al., Jul. 7, 1994, "Atomic Command Object–Oriented System Software Platform".

Abstract from WIPO Patent Application No. WO 9415285, Jul. 7, 1994, "Object–Oriented Notification Framework System", D.R. Anderson et al.

Abstract for U.S. Patent No. 5,119,475, Schoen et al., Jun. 2, 1992, "Object–Oriented Framework for Menu Definition".

Abstract for WIPO Patent Application No. 95/01610, Koko et al., Jan. 12, 1995, "Object Oriented Product Structure Management in Computer–Aided Product Design".

Abstract for WIPO Patent Application No. 95/02219, Helgeson et al., Jan. 19, 1995, "Distributed Computation Based on Movement, Execution and Insertion of Processes in Network".

Abstract for EPO Patent No. 619544, S. Danforth, Oct. 12, 1994, "Language–Neutral Object–Oriented Programming".

Inspec Abstract No. C9504–7460–043, Sells et al., Jul. 1994, "Implementation of the Architecture for a Time–Domain Dynamical System Simulation in a Very High–Level Pictorial Object–Oriented".

Inspec Abstract No. C9504–7460–042, Coleman et al., Jul. 1994, "An End–To–End Simulation of A Surveillance System Employing Architecture Independence, Variable Fidelity Components and Software Reuse".

Inspec Abstract No. C9503–6140D–045, Satoh et al., Nov. 1994, "Process Algebra Semantics for a Real Time Object Oriented Programming Language".

Inspec Abstract No. C9501–7160–020, C. Le Pape, Nov. 1993, "The Cost of Genericity: Experiments With Constraint–Based Representations of Time–Tables".

Inspec Abstract No. C9501–6140D005, S. Vinoski, Sep. 1994, "Mapping CORBA IDL Into C++".

Inspec Abstract No. C9501–7330–007, Salminen et al., Oct. 1994, "Modeling Trees Using an Object–Oriented Scheme".

Inspec Abstract No. C9412–6110B–221, Berghel et al., Mar. 1992, "A Generic Object–Oriented Concurrency Mechanism for Extensibility and Reuse of Synchronization Components".

Inspec Abstract No. B9412–6210Q–016, from Qingzhong et al., Mar. 1992, "An Object–Oriented Model for Intelligent Networks".

Inspec Abstract No. C9412–7810–003, from Jung et al., Oct. 1993, "Development of an Object–Oriented Anthropometric Database for an Ergonomic Man Model".

Inspec Abstract No. C9412–6110J–014 from Griss et al., Nov. 1994, "Object–Oriented Reuse".

Inspec Abstract No. C9411–6130B–108, from Mili et al., Aug. 1992, "Building a Graphical Interface for a Reuse--Oriented CASE Tool".

Inspec Abstract No. C9411–7100–029 from C. Le Pape, Dec. 1994, "Implementation of Resource Constraints in ILOG Schedule: A Library for the Development of Constraint–Based Scheduling Systems".

Inspec Abstract No. C9411–6115–035 from Mili et al., Jul. 1991, "SoftClass: An Object–Oriented Tool for Software–Reuse".

Inspec Abstract No. C9410–6180G–015, from Eichelberg et al., Sep. 1993, "Integrating Interactive 3D–Graphics into an Object–Oriented Application Framework".

Inspec Abstract No. B9409–6210M–025, from Hellemans et al., Apr. 1994, "An Object–Oriented Approach to Dynamic Service Descriptions".

Inspec Abstract No. C9409–6180–059, from Wang et al., Aug. 1993, "A Framework for User Customization".

Inspec Abstract No. C9408–6110B–016, from Chen et al., May 1994, "An Experimental Study of Using Reusable Software Design Frameworks to Achieve Software Reuse".

Inspec Abstract No. C9408–7420–021, from Pirklbauer et al., May 1994, "Object–Oriented Process Control Software".

Inspect Abstract No. C9408–6110J–011 from Gyu–Chung, Hau, et al., Dec. 1993, "System Methodologies of Object–Oriented Programs".

Inspec Abstract No. C9407–7420D–045, from Desai et al., Mar. 1994, "Controller Structure Definition Via Intelligent Process Control".

Inspec Abstract No. C9407–6140D–014, from Satoh et al., May 1994, "Semantics for a Real–Time Object–Oriented Programming Language".

Inspec Abstract No. C9406–6150N–015, from Schmidt et al., Mar. 1994, "The Service Configurator Framework: An Extensible Architecture for Dynamically Configuring Concurrent, Multi–Service Network Daemons".

Inspec Abstract No. C9405–6180G–031, from Woyak et al., Mar. 1993, "A Motif–Like Object–Oriented Interface Framework Using PHIGS".

Inspec Abstract No. C9504–6130B–049, from A. van Dam, Oct. 1993, "VR as a Forcing Function: Software Implications of a New Paradigm".

Inspec Abstract No. C9504–6140D–024, from Sheffler et al., Feb. 1995, "An Object–Oriented Approach to Nested Data Parallelism".

Inspec Abstract No. C9503–6110B–045, from Rosiene et al., Mar. 1994, "A Data Modeling Framework for Queueing Network Models".

Inspec Abstract No. B9503–8110B–023, from Mautref et al., Sep. 1994, "An Object–Oriented Framework for the Development of Interactive Decision Support Systems".

Inspec Abstract No. C9502–7160–026, from Menga et al., Oct. 1994, "An Object–Oriented Framework for Enterprise Modelling".

Inspec Abstract No. C9502–6130G–006, "Support for Enterprise Modelling in CSCW", P. Hennessy et al., Aug. 1994.

Inspec Abstract No. C9502–7810C–058, from Lin et al., Dec. 1993, "Can CAL Software Be More Like Computer Games?".

Inspec Abstract No. C9501–6115–039, from Elia et al., Nov. 1993, "G++: An Object Oriented Environment for Developing Distributed Applications".

Inspec Abstract No. C9412–7330–186 from Righter et al., Oct. 1994, "An Object–Oriented Characterization of Spatial Ecosystem Information".

Inspec Abstract No. C9412–6160J–025 from J. Iivari, Dec. 1994, "Object–Oriented Information Systems Analysis: A Comparison of Six Object–Oriented Analysis Methods".

Inspec Abstract No. C9412–6110J–006, from Lau et al., Oct. 1993, "Using SOM for Tool Integration".

Inspec Abstract No. C9411–6160J–001, from Odberg et al., Sep. 1992, "A Framework for Managing Schema Versioning in Object–Oriented Databases".

Inspec Abstract No. C9406–6115–048, Aug. 1993, "Constructing Multi–View Editing Environments Using MViews".

Inspec Abstract No.4664213, "Maintaining Information about Persistent Replicated Objects in a Distributed System"., 1993 IEEE Conference on Distributed Computing Systems, May 1993.

Inspec Abstract No. C9406–6110J–029, "A Comparison of Object–Oriented Analysis and Design Methods,", Proceedings of C++ World 1993, Feb. 1993.

Inspec Abstract No. C9406–0310F–011, 1993, "Cost–Benefit Analysis of Object–Oriented Technology", Feb. 1993.

Inspec Abstract No. C9406–6110J–009, from, J.D. Grimes, "Objects 101—An Implementation View", Proceedings of Compcon '94, Feb. 1994.

Inspec Abstract No. 4647921, from Uhorchak et al., Mar. 1993, "An Object–Oriented Class Library for Creating Engineering Graphs Using PHIGS".

Inspec Abstract No. 4642214, from, Marshall et al., May 1992, "Using VDM Within an Object–Oriented Framework".

Inspec Abstract No. 4626386, from Arora et al., Nov. 1993, "Building Diverse Environments with PCTE Workbench".

Inspec Abstract No. 4622794, from Campbell et al., Dec. 1993, "A Technique for Documenting the Framework on an Object–Oriented System".

Inspec Abstract No. 4618974, from Bowers, Dec. 1993, "Some Principles for the Encapsulation of the Behaviour of Aggregate Objects".

Inspec Abstract No. 461931, from, Islam et al., Sep. 1993, "Uniform Co–Scheduling Using Object–Oriented Design Techniques".

Inspec Abstract No. 4613481, from Thieme et al., Jun. 1993, "Schema Integration in Object–Oriented Databases".

Inspec Abstract No. 4603430, from G. Booch, Feb. 1994, "Designing an Application Framework".

Inspec Abstract No. 4596323, from Frank et al., Mar. 1993, "An Integrated Environment for Designing Object–Oriented Enterprise Models".

Inspec Abstract No. 4593721, Periyasamy et al, Oct. 1993, "A Formal Framework for Design and Verification of Robotic Agents".

Inspec Abstract No. 4588839, from L. Fisher, Oct. 1992, "Constructing a Class Library for Microsoft Windows".

Inspec Abstract No. 4588834, from G. Olander, Oct. 1992, "Chembench: Redesign of a Large Commercial Application Using Object–Oriented Techniques".

Inspec Abstract No. 4566447, from J. Rossazza, Nov. 1992, "An Object–Centered Fuzzy Representation".

Inspec Abstract No. 4565630, from Karpovich et al., Jul. 1993, "A Parallel Object–Oriented Framework for Stencil Algorithms".

Inspec Abstract No. C9402–6150G–002, from Bruegge et al., Sep. 1993, "A Framework for Dynamic Program Analyzers".

Inspec Abstract No. 4550414, from Parrish et al., Nov. 1993, "Automated Flow Graph–Based Testing of Object–Oriented Software Modules".

Inspec Abstract No. 4540729, from Bailes et al., "The ecology of Class Refinement", Jan. 1991.

Inspec Abstract No. 4534334, from Campbell et al., Sep. 1992, "A Technique from Documenting the Framework of an Object–Oriented System".

Inspec Abstract No. 4534330, from Istavrinos et al., Sep. 1992, "Experiences with an Object–Oriented Mapper for Coherent Distributed Shared Memory".

Inspec Abstract No. 4528985, from Beneventano et al., Dec. 1993, "Taxonomic Reasoning with Cycles in LOGIDATA+".

Inspec Abstract No. 4525743, from Hakimzadeh et al., Dec. 1993, "Instance Variable Access Locking for Object–Oriented Databases".

Inspec Abstract No. 4512593, from H. Sakai, Jun. 1993, "A Method for Contract Design and Delegation in Object Behavior Modeling".

Inspec Abstract No. B9310–6210L–099, "Templates, Types and Classes in Open Distributed Processing", Rudkin, S., Jul. 1993.

Inspec Abstract No. 4459325, from Kesim et al., Jun. 1992, "On the Evolution of Objects in a Logic Programming Framework".

Inspec Abstract No. 4447153, from Klein et al., Nov. 1992, "An Object–Oriented Framework for Curves and Surfaces".

Inspec Abstract No. 4426852, from Benveniste et al., Dec. 1992, "Concurrent Programming Notations in the Object-Oriented Language Arche".

Inspec Abstract No. 4425343, from Demurjian et al., Feb. 1993, "Programming Versus Databases in Object–Oriented Paradigm".

Inspec Abstract No. 4417604, from Kraiem et al., Jun. 1992, "Mapping of Conceptual Specifications Into Object–Oriented Programs".

Inspec Abstract No. 4417563, from E. Maim, Jun. 1992, "Recognizing Objects from Constraints".

Inspec Abstract No. 4411998, from Yi Deng et al., Jun. 1992, "Unifying Multi–Paradigms in Software System Design".

Inspec Abstract No. 4408394, from Allen et al., Jun. 1992, "GEM: Global Event Management in CAD Frameworks".

Inspec Abstract No. 4400350, from Y. Shoham, Mar. 1993, "Agent–Oriented Programming".

Inspec Abstract No. 4395549, from Hogstrom et al., Mar. 1992, "Portability and Data Structures in Scientific Computing–Object–Oriented Design of Utility Routines in Fortran".

Inspec Abstract No. 4391388, from Thomas et al., Mar. 1992, "A Generic Object–Oriented Concurrency Mechanism for Extensibility and Reuse of Synchronization Components".

Inspec Abstract No. 4387201, from Chu et al., Jun. 1992, "A Pattern Based Approach of Integrating Data and Knowledge to Support Cooperative Query Answering".

Inspec Abstract No. 4366189, from Holt, et al., Apr. 1992, "A Framework for Using Formal Methods in Object–Oriented Software Development".

Inspec Abstract No. 4356300, from Bertino et al., Feb. 1993, "Path–Index: An Approach to the Efficient Execution of Object–Oriented Queries".

Inspec Abstract No. 4341376, from Bertino et al., Feb. 1992, "Optimization of Object–Oriented Queries Using Path Indices".

Inspec Abstract No. 4331060, from Lau et al., Jun. 1992, "An Object–Oriented Class Library for Scalable Parallel Heuristic Search".

Inspec Abstract No. 4318465, from P. Madany, Jun. 1992, "Object–Oriented Framework for File Systems.".

Inspec Abstract No. 4302722, from Eggenschwiler et al., Oct. 1992, "ET++SwapsManager: Using Object Technology in the Financial Engineering Domain".

Inspec Abstract No. 4298324, form S. Nichol, Nov. 1992, "Extending Turbo Vision".

Inspec Abstract No. 4297404, from Tanaka et al., Apr. 1992, "Two–Level Schemata and Generalized Links for Hypertext Database Models".

Inspec Abstract No. 4287814, from Natarajan et al., Sep. 1992, "Issues in Building Dynamic Real–Time Systems".

Inspec Abstract No. 4281362, from Marshall et al., Oct. 1991, "Using VDM within an Object–Oriented Framework".

Inspec Abstract No. 4275707, from Tsukamoto et al., Dec. 1991, "DOT: A Term Representation Using DOT Algebra for Knowledge–Bases".

Inspec Abstract No. 4275698, from Van den Bussche et al., Dec. 1991, "Evaluation and Optimization of Complex Object Selections".

Inspec Abstract No. 4275693, from Giannotti et al., Dec. 1991, "Non–Determinism in Deductive Databases".

Inspec Abstract No. 4270361, from Artale et al., Oct. 1991, "Introducing Knowledge Representation Techniques in Database Models".

Inspec Abstract No. 4270125, from Becker et al., Oct. 1991, "Reusable Object–Oriented Specifications for Decision Support Systems".

Inspec Abstract No. 4258492, from M. Ball, Sep. 1992, "Inside Templates: Implementing C++ Strategies".

Inspec Abstract No. 4258051, from Rundensteiner et al., Aug. 1992, "Set Operations in Object–Based Data Models".

Inspec Abstract No. 4244023, from George et al., Aug. 1991, "An Object–Oriented Data Model to Represent Uncertainty in Coupled Artificial Intelligence–Database Systems".

Inspec Abstract No. 4234438, from Madany et al., Dec. 1991, "Organizing and Typing Persistent Objects Within an Object–Oriented Framework".

Inspec Abstract No. 4152687, from M. Wolczko, Mar. 1992, "Encapsulation, Delegation and Inheritance in Object–Oriented Languages".

Inspec Abstract No. 4117514, from Wuwongse et al., May 1991, "An Object–Oriented Approach to Model Management".

Inspec Abstract No. C94204–6110J–017, "Choices Frameworks and Refinement", R.H. Campbell et al., Dec. 1991.

Inspec Abstract No. 4090970, from P. Kougiouris, May 1991, "Device Management Framework for an Object–Oriented Operating System".

Inspec Abstract No. 4077440, from A. Mahler, Jan. 1991, "Organizing Tools in a Uniform Environment Framework".

Inspec Abstract No. 4067033, from Shaw et al., Jun. 1990, "Experience with the ET++ Application Framework".

Inspec Abstract No. 4060084, from Muller et al., Jun. 1984, "ODICE: Object–Oriented Hardware Description in CAD environment".

Inspec Abstract No. 4050569, from Di Giovanni et al., Jun. 1990, "HOOD Nets".

Inspec Abstract No. C91072815, from Holtkamp et al., Oct. 1990, "DEMOM–A Description Based Media Object Data Model".

Inspec Abstract No. C91072016, from A. Lane, Jul. 1991, "/DOS/C++—Application Frameworks".

Inspec Abstract No. C91072574, from Hemery et al., "An Analysis of Communication and Multiprogramming in the Helios Operating System", Sep. 1991.

Inspec Abstract No. C91064787, from Madany et al., Jul. 1989, "A Class Hierarchy for Building Stream–Oriented File Systems".

Inspec Abstract No. C91064580, from Gamma et al., Jul. 1989, "Integration of a Programming Environment Into ET++—A Case Study".

Inspec Abstract No. C91058815, from Menga et al., Mar. 1990, "G++: An Environment for Object Oriented Analysis and Prototyping".

Inspec Abstract No. B91052096, from Cusack et al., May 1990, "Object–Oriented Specification in LOTOS and Z, or My Cat Really is Object–Oriented!".

Inspec Abstract No. C91053475, from Queinnec et al., Jul. 1998, "An Open Ended Data Representation Model for EU–LISP".

Inspec Abstract No. C91053151, from E. Cusack, Apr. 1991, "Refinement, Conformance and Inheritance".

Inspec Abstract No. C91042802, from T. Yokoyama, May 1990, "An Object–Oriented and Constraint–Based Knowledge Representation System for Design Object Modeling".

Inspec Abstract No. C91041980, from Choi et al., Jan. 1991, "Graph Interpretation of Methods: A Unifying Framework for Polymorphism in Object–Oriented Programming".

Inspec Abstract No. C91042655, from Q. Li, Mar. 1991, "Extending Semantic Object Model; Towards More Unified View of Information Objects".

Inspec Abstract No. C91024852, from Pierra et al., Sep. 1990, "An Object Oriented Approach to Ensure Portability of CAD Standard Parts Libraries".

Inspec Abstract No. C91010951, from T. Helton, Nov. 1990, "Level5 Object".

Inspec Abstract No. B90075006, from Gossain et al., Nov. 1984, "Designing a Class Hierarchy for Domain Representation and Reusability".

Inspec Abstract No. C91003997, from J. Muys–Vasovic, Nov. 1989, "MacApp: An Object–Oriented Application Framework".

Inspec Abstract No. C91004708, from Bertino et al., Mar. 1990, "Optimization of Queries Using Nested Indices".

Inspec Abstract No. C90052277, from I. Tervonen, Jan. 1990, "Object–Oriented Development as a Multiview Software Construction Methodology".

Inspec Abstract No. C90052627, from Schrefl et al., Jul. 1988, "A Knowledge–Based Approach to Overcome Structural Differences in Object Oriented Database Integration".

Inspec Abstract No. C90047457, from Yokoyama et al., Dec. 1990, "A Constraint–Based and Object–Oriented Knowledge Representation".

Inspec Abstract No. C90034818, from Q. Chen, Apr. 1988, "Extending the Object–Oriented Paradigm for Supporting Complex Objects".

Inspec Abstract no. C90030609, from Forde et al., Dec. 1990, "Object–Oriented Finite Element Analysis".

Inspec Abstract No. C90007733, from Weinand et al., Dec. 1989, "Design and Implementation of ET++, A Seamless Object–Oriented Application Framework".

Inspec Abstract No. C89062837, from Pasquier–Boltuck et al., Aug. 1988, "Prototyping an Interactive Electronic Book System Using an Object–Oriented Approach".

Inspec Abstract No. C89056727, from Campbell et al., Apr. 1984, "Principles of Object–Oriented Operating System Design".

Inspec Abstract No. C89056859, from Hull et al., May 1989, "On Accessing Object–Oriented Databases: Expressive Power, Complexity, and Restrictions".

Inspec Abstract No. C89049257, from Madany et al., Apr. 1984, "Class Hierarchy for Building Stream–Oriented File Systems".

Inspec Abstract No. C89039001, from Brophy et al., Jan. 1989, "A Framework for Multiple, Concurrent Graphical Representation".

Inspec Abstract No. C89033226, from Corradi et al., Sep. 1988, "PO: An Object Model to Express Parallelism".

Inspec Abstract No. C89014870, from R. King, Oct. 1988, "Semantic and Object–Oriented Database Support for Software Environments".

Inspec Abstract No. 89003142, from Tanma et al., Oct. 1986, "A System for Generating Language–Oriented Editors".

Inspec Abstract No. C88013915, from Woelk et al., Sep. 1987, "Multimedia Information Management in an Object–Oriented Database System".

Inspec Abstract No. C88007447, from P. Allen, Feb. 1987, "A Framework for Implementing Multisensor Robotic Tasks".

Inspec Abstract No. C87007043, from Whitted et al., May 1986, "Exploiting Classes in Modeling and Display Software".

Inspec Abstract No. C86039588, from K. Fukunaga,, Aug. 1985, "Prompter: A Knowledge Based Support Tool for Code Understanding".

Inspec Abstract No. C86024804, from Greenspan et al., Dec. 1986, "A Requirements Modeling Language and Its Logic".

Inspec Abstract No. C84005713, from Meyer et al., Sep. 1982, "Towards a Two–Dimensional Programming Environment".

Inspec Abstract No. C81005505, from Mylopoulos et al., Oct. 1980, "Some Features of the TAXIS Data Model".

R. Bergmann, et al., "Explanation–based Similarity: A Unifying Approach for Integrating Domain Knowledge into Case–based Reasoning for Diagnosis and Planning Tasks," European Workshop on Case–Based Reasoning, Springer, pp. 182–196, Dec. 1993.

L. Becker and T. Guay, "Knowledge reusability in diagnostic environments," J. of Intelligent Manufacturing, pp. 137–154, Dec. 1991.

K. Becker and F. Bodart, "Reusable Object–Oriented Specifications for Decision Support Systems," Object Oriented Approach in Information Systems, pp. 137–155, Oct. 1991.

E. Simoudis, et al., "Automated support for developing retrieve–and–propose systems," Proc. SPIE, Applications of Artificial Intelligence 1993: Knowledge–Based Systems in Aerospace and Industry, vol. 1963, pp. 285–292, Apr. 1993.

J. Kolodner, Case–Based Reasoning, Morgan Kaufmann Pub., Inc., pp. 16–23, 346–368, Dec. 1993.

A. Aamodt, "A Knowledge Representation System for Integration of General and Case–Specific Knowledge," Proc. Sixth Int'l. Conf. on Tools with Artificial Intelligence, pp. 836–839, Nov. 1994.

J.P. Burke, "ART*Enterprise builds professional objects," HP Professional, vol. 8(12), p. 20, Dec. 1994.

P. Katalagarianos, "On the Reuse of Software: A Case–Based Approach Employing a Respository," Automated Software Engineering, Mar. 1995, vol. 2, pp. 55–86.

OBJECT ORIENTED CASE-BASED REASONING FRAMEWORK MECHANISM

BACKGROUND OF THE INVENTION

1. Field of the Invention

The present invention relates generally to data processing and, more specifically, to object-oriented programming systems and processes.

2. Description of the Related Art

The phrase "case-based reasoning" (CBR) generally refers to a computer process that finds solutions to current problems by examining descriptions of similar, previously encountered problems and their associated solutions, matching the novel problems to the closest previously encountered problems, and using the associated solutions to produce a solution to the current problem. In a CBR system, problem-solution descriptions are stored in a database called a case base. Weights assigned to different properties of each case are used in scoring cases for similarity against a current problem. The CBR system receives a description of a current problem. retrieves the closest matching cases from the case base using a query engine processor, and iteratively prompts the user for additional descriptive information until the retrieved case or cases are sufficiently close (similar) to be considered a solution to the current problem. The produced solution is then validated through a variety of means, such as user feedback or automatic validation. A validated solution can be added to the case base and used in future problem solving, if appropriate.

CBR systems permit experience gained from solving problems to be applied to a much larger number of problem situations than could possibly be remembered by any one individual with substantially reduced chance of providing erroneous or inconsistent solutions. Validation of problem solutions provides an additional safeguard. Finally, updating the case base permits continuous expansion of the case base against which problems are matched, reducing the likelihood that a satisfactory problem solution cannot be produced. In practical terms, CBR systems are gaining use in computer-assisted and automated help-desk and customer service systems and in computer help programs.

The construction of the case base and the way in which stored cases are matched and retrieved can vary greatly from CBR system to CBR system. For example, the case base can comprise problem-solution descriptions stored as plain language text, data records having predefined fields, or semantic networks. Case matching and retrieval processing by the query engine can comprise implementation of nearest-neighbor algorithms, decision trees, or associative memories. The user interface also must be part of the CBR system development process, including construction of the user input and solution presentation mechanisms. The development of each CBR system therefore can require much time, effort, and expense in making such data representation and processing, decisions and implementing them.

Many CBR systems are tailored for each particular subject matter application and are developed using conventional procedure-oriented programming languages, such as FORTRAN, Pascal, and C. Many lines of computer programming code must be created for each application. For example, even if the same type of case-matching, query engine processing is used for different CBR systems, the query engine must be adapted to work with the problem-solution description being used. Some code can be modified from other versions, or deleted and replaced with different instructions for different applications, which still can require much analysis and design effort. The development of CBR systems would be easier, less expensive, and less time consuming if the user interface could be more consistent, representation of the problem-solution descriptions standardized, development of the case base made simpler, and the query engine made interchangeable from application to application.

As CBR systems become more widely distributed, more users of CBR systems will be novice users who might be unfamiliar with the case base and with CBR search techniques generally. With current CBR search implementations, search techniques employed by novice users can easily be relatively ineffective. For example, CBR systems typically use weighted matching techniques to find the cases in the case base that are the closest match to a set of specified search criteria. Cases are defined by a set of properties and cases are deemed more closely matched to a search query if they have more properties in common. Conventional weighting techniques can be said to penalize cases that are more completely defined (have more properties in their definition) because searches that leave many properties unspecified result in fewer completely-defined cases being deemed a match. Novice users are especially prone to leaving search properties unspecified.

Many CBR search techniques also penalize cases that are under-defined, or that have fewer properties defined than are defined in the search query. Users of the CBR system have no control over the way in which the system deals with unspecified properties. Some systems attempt to reduce such problems by assigning different weights to properties and thereby properly accommodate case properties that are not specified in a search, case properties that are unmatched to a search, or search properties that are unmatched to a case. Specifying the case base can become relatively complicated, as case base developers struggle to assign weights. Moreover, different weights might be advisable, depending on the specific search. The CBR system either becomes unresponsive to different searches or case definition becomes too complex.

In addition, it would be advantageous to permit both case base developers and CBR system users to include their knowledge about the relative importance of properties for each search query and to adjust the match scoring approach. That is, a CBR system user should not be forced to use the weight set specified by the case base developer. Unfortunately, a CBR system that also supports input of weight values for each search query has not been available.

From the discussion above, it should be apparent that there is a need for a case-based reasoning system development mechanism tool that provides a basis for more rapid, less expensive, and simpler development of case-based reasoning systems with greater user flexibility. The present invention satisfies this need.

SUMMARY OF THE INVENTION

In accordance with the present invention, a reusable object oriented (OO) framework for use with object oriented programming systems comprises a case-based reasoning (CBR) shell that permits a framework user to use a case set comprising a set of case instance descriptions and generates a case-based reasoning system that receives user requests for query solutions and produces a query solution that can be incorporated into the set of case instance descriptions. The object oriented framework includes a Control Flow component that controls processing of the CBR system, a Data Store component that manages all persistent data associated with the system, and a Presentation component that manages interface to users of the CBR system. After the OO operating environment is established, the CBR system user can engage in operations such as query processing, building case history definitions, and modifying operating parameters, according to the object definitions. Thus, the case history descriptions and search queries comprise a set of object oriented classes that are organized into an inheritance hierarchy. In this way, a single framework can be used to generate, update, and use many different case histories and evaluate search queries with reduced development time. The extended framework thereby quickly and efficiently provides a variety of case-based reasoning systems.

In addition, the present invention permits dynamic, user adjustment of property weights used in specifying a search query and in specifying a case set from which a solution will be retrieved. Such dynamic weighting can be applied to a case-based reasoning system implemented in an object oriented environment or in a procedural environment.

In one aspect of the invention, the CBR system developer uses the framework to provide a set of case definitions, property definitions, and case base descriptions for the CBR system under development. The framework provides the CBR system shell having the Control Flow component, Presentation component, Data Store component, and a Query Engine component. The extended framework provides a CBR system that includes the case base and receives a current problem query, matches the current query description to the closest case history description in the case base, and produces a solution to the current query. The produced solution is validated and, if appropriate, is added to the case base. In this way, a CBR system developer can more quickly integrate a case base with a query engine and user interface to provide an operable CBR system.

In another aspect of the present invention, property weights assigned to cases in the case base are dynamically adjusted during search and property weights are also assigned to the search query. In this way, users specifying searches can control which properties are used, what combinations of weights are used, and whether or not missing properties should penalize the case history matching.

For the case base, cases are stored as sets of property/value pairs and each property is assigned an importance rank value relative to the other properties of the case. The rank values are normalized, so that unspecified properties in a query that ordinarily would result in a lower match score instead can be compared in relative terms. Also, only properties specified in a query are considered in calculating the normalized rank score, so that unspecified properties do not skew the scoring. In a similar fashion, search queries are specified as property/value pairs and each property is assigned a normalized importance rank relative to the other properties of the search query and a match score is computed considering only the defined properties of the query. In this way, unspecified properties in a search query do not result in lower match scoring.

Other features and advantages of the present invention should be apparent from the following description of the preferred embodiment, which illustrates, by way of example, the principles of the invention.

BRIEF DESCRIPTION OF THE DRAWINGS

FIG. 21 is a class diagram representation of the Case category and related classes implemented by the computer processing system illustrated in FIG. 8.

DESCRIPTION OF THE PREFERRED EMBODIMENT

Overview—Object Oriented Technology

Figure 1:
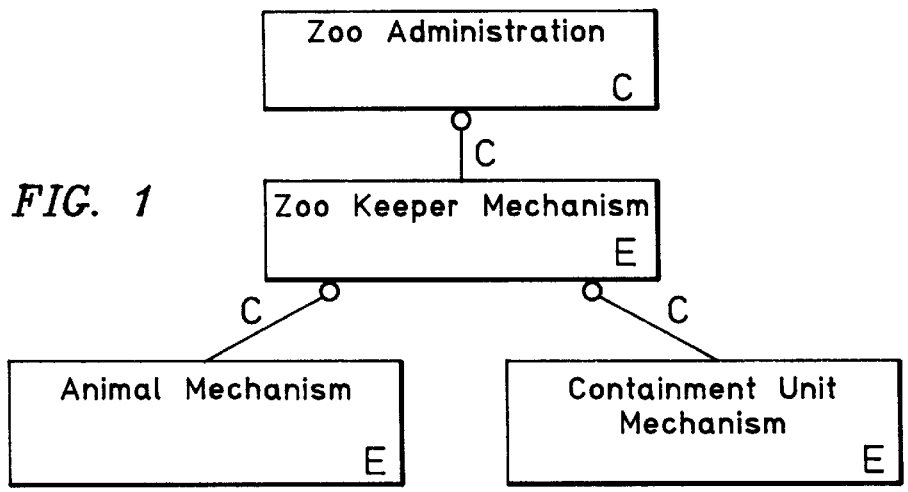
FIG. 1 is a category diagram of an exemplary Zoo Administration framework that illustrates the principles implemented by the system of the present invention.

The present invention was developed using Object-Oriented (OO) framework technology. The preferred embodiment is implemented in an object oriented programming environment. Therefore, an exemplary OO system will be described next. Individuals skilled in the art of OO framework technology may wish to proceed to the Detailed Description section of this specification. However, those individuals who are new to framework technology, or new to OO technology in general, should read this overview section in order to best understand the benefits and advantages of the present invention.

Object-oriented Technology v. Procedural Technology

Though the present invention relates to a particular OO technology (i.e., OO framework technology), the reader must first understand that, in general, OO technology is significantly different than conventional, process-based technology (often called procedural technology). While both technologies can be used to solve the same problem, the ultimate solutions to the problem are always quite different. This difference stems from the fact that the design focus of procedural technology is wholly different than that of OO technology. The focus of process-based design is on the overall process that solves the problem; whereas, the focus of OO design is on how the problem can be broken down into a set of autonomous entities that can work together to provide a solution. The autonomous entities of OO technology are called objects. Stated another way, OO technology is significantly different from procedural technology because problems are broken down into sets of cooperating objects instead of into hierarchies of nested computer programs or procedures. That is, procedural technology defines a system in terms of data variables and process functions whereas OO technology defines a system in terms of objects and classes.

The Term "Framework"

There has been an evolution of terms and phrases which have particular meaning to those skilled in the art of OO design. However, the reader should note that one of the most loose definitions in the OO art is the definition of the word "framework." The word framework means different things to different people. Therefore, when comparing the characteristics of two supposed OO frameworks, the reader should take care to ensure that the comparison is indeed one of "apples to apples." As will become more clear in the forthcoming paragraphs, the term framework is used in this specification to describe an OO technology system that has been designed to have core function and extensible function. The core function is that part of the framework that is not subject to modification by the framework purchaser. The extensible function, on the other hand, is that part of the framework that has been explicitly designed to be customized and extended by the framework purchaser as part of its implementation.

OO Framework

While in general terms an OO framework can be properly characterized as a type of OO solution to a programming problem, there is nevertheless a fundamental difference between a framework and a basic OO programming solution. The difference is that frameworks are designed in a way that permits and promotes customization and extension of certain aspects of the OO solution, whereas a basic OO solution can be said to comprise a particular collection, or library, of classes and objects. In other words, frameworks provide an OO programming solution that can be customized and extended to address individualized requirements that change over time. Of course, the customization/extension quality of frameworks is extremely valuable to purchasers (referred to herein as framework consumers) because the cost of customizing or extending a framework is much less than the cost of replacing or reworking an existing program solution.

Therefore, when framework designers set out to solve a particular problem, they should do more than merely design individual objects and specify how those objects interrelate. They should also design the core function of the framework (i.e., that part of the framework that is not to be subject to potential customization and extension by the framework consumer) and the extensible function of the framework (i.e., that part of the framework that is to be subject to potential customization and extension). In the end, the ultimate worth of a framework rests not only on the quality of the object design, but also on the design choices involving which aspects of the framework represent core function and which aspects represent extensible function.

ZAF—An Illustrative Framework

While those skilled in the art appreciate that framework design is necessarily an intertwined and iterative process, example design choices for a simplistic framework are set forth in the paragraphs that follow. It should be understood, though, that this is only an example framework that is being used in this specification to illustrate and best explain frameworks such that the reader can better understand and appreciate the benefits and advantages of the present invention.

Framework designers determine what objects are needed for a framework mechanism by selecting objects from what is called the problem domain. The problem domain is an abstract view of the specific problem at hand. The example problem domain chosen for the illustrative framework is that of zoo administration. The specific problem presented is that of designing a framework that assists zoo keepers in the care and feeding of zoo animals. In the example, which will be referred to as a Zoo Administration Framework (ZAF), an OO framework designer would look to the zoological problem domain and decide that any ZAF would of necessity involve an abstraction that represents the relationship between zoo keepers and animals (i.e., represents how zoo keepers care for animals). The framework designer would also likely recognize that zoo animals usually live in cages, pens, tanks, and other sorts of containment units. Therefore, the framework designer also would start with the idea that the framework would have to involve abstractions or mechanisms that represent all of these fundamental entities and relationships.

How ZAF is Designed

To begin the design process, the framework designer would likely begin with what is called a category diagram. Category diagrams are used to describe frameworks at a high level and to define how the framework components relate to one another. FIG. 1 is a category diagram for the example framework ZAF. The notation used in FIG. 1, and that used in the other figures of this specification, is explained in detail in the Notation section at the end of this portion of the specification. Each entity, or icon, in a category diagram represents groupings of data objects that perform a particular function. For the purposes of illustration, assume that the framework designer decides that ZAF should be made up of four components that, at a high level perspective, will be referred to as mechanisms: a Zoo Administration mechanism, a Zoo Keeper mechanism, an Animal mechanism, and a Containment Unit mechanism.

As shown in FIG. 1, the Zoo Administration mechanism has been designed to use the Zoo Keeper mechanism to administer the zoo. The Zoo Administration mechanism is therefore said to have a "using" relationship with the Zoo Keeper mechanism. (Again, please refer to the notation section of this specification for an explanation of this relationship and the other notation used in this specification.)

As discussed above, the Zoo Administration mechanism has been designed to have responsibility for overall control of ZAF. Accordingly, the Zoo Administration mechanism is responsible for scheduling the operation of the Zoo Keeper mechanism. Note also that the framework designer has designed the Zoo Administration mechanism to be a core function of ZAF, which means that it has been designed such that it will not be subject to potential customization and extension. The upper case block letter "C" in the category box for the Zoo Administration mechanism denotes this fact. Note further that the "uses" relationship between the Zoo Administration mechanism and the Zoo Keeper mechanism also has been designed as a core function such that it is not available for ultimate customization by the framework consumer.

The Zoo Keeper mechanism has been designed to be generally responsible for the care and feeding of the zoo animals. Accordingly, it uses the Animal and Containment Unit mechanisms to perform its tasks. Unlike the design of the Zoo Administration mechanism, however, the framework designer has designed the Zoo Keeper mechanism to be an extensible function, which again means that the Zoo Keeper mechanism has been designed to be available for modification and/or extension by the framework consumer to address future care and feeding requirements. This fact is denoted by the upper case block letter "E" in the Zoo Keeper mechanism category box.

The framework designer has designed the Animal mechanism to represent the animal side of the interaction between zoo animals and zoo keepers. Since the animal population in the zoo is something that changes on a regular basis, the Animal mechanism has similarly been designed as an extensible function. The Containment Unit mechanism interacts with the Zoo Keeper mechanism by representing individual containment units such as pens, tanks, and cages. Like the Animal mechanism, the Containment Unit mechanism has been designed as an extensible function such that it can handle future customization and extension requirements. Please note here, however, that even though the Zoo Keeper, Animal, and Containment Unit mechanisms have all been designed as extensible functions, the relationships between the mechanisms have been designed to be a core function of ZAF. In other words, even though it is desirable to give ZAF's consumers flexibility relative to the Zoo Keeper, Animal, and Containment Unit mechanisms, it is not desirable to allow ZAF's consumers to change how these mechanisms relate to one another.

The framework designer next designs the classes and relationships that make up the mechanisms shown on FIG.

1. A class is a definition of a set of like objects. As such, a class can be thought of as an abstraction of the objects or as a definition of a type of object. From the view of a computer system, a single object represents an encapsulated set of data and the operation or a group of operations that are performed by a computer system upon that data. In fact, in a secure computer system, the only access to the information controlled by an object is via the object itself. This is why the information contained in an object is said to be encapsulated by the object.

Each class definition comprises data definitions that define the information controlled by the object and operation definitions that define the operation or operations performed by objects on the data that each object controls. In other words, a class definition defines how an object acts and reacts to other objects by defining an operation or set of operations that is/are performed on the defined data. (Please note that operations are sometimes called methods, method programs, and/or member functions.) When taken together, the defined operation(s) and data are said to be the behavior of the object. In essence, then, a class definition defines the behavior of its member object or objects.

Figure 2:
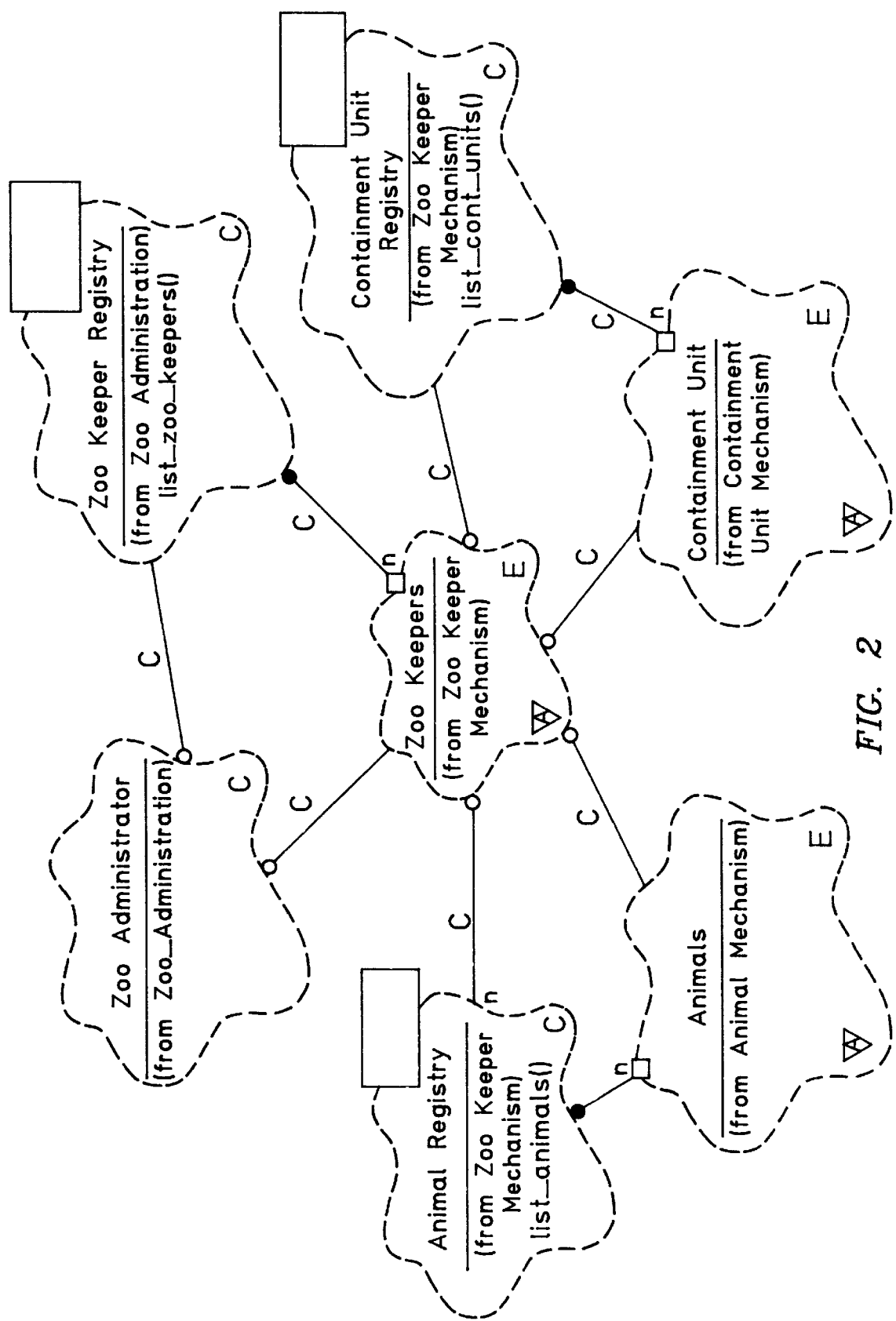

FIG. 2 is an OO class diagram that shows the fundamental classes that the framework designer has designed for ZAF. Each class representation indicates its relationship to the mechanisms shown on FIG. 1. For example, the Zoo Keepers class is denoted as being from the Zoo Keeper mechanism. The fundamental classes of ZAF include: the Zoo Administrator class, which is part of the Zoo Administration mechanism; the Zoo Keeper Registry class, which is also part of the Zoo Administration mechanism; the Animal Registry class, which is part of the Zoo Keeper mechanism, the Zoo Keepers class, which is also part of the Zoo Keeper mechanism; the Containment Unit Registry class, which is also part of the Zoo Keeper mechanism; the Animals class, which is part of the Animal mechanism; and the Containment Unit class, which is part of the Containment Unit mechanism. It should be noted that the relationships between the classes have been designed as core functions of ZAF such that they are not available for ultimate modification by ZAF's consumers.

The Zoo Administrator class is the definition of the object that is responsible for the overall control of ZAF. Again, OO classes only define the objects that interact to provide a solution to the problem. However, it is by exploring the characteristics of the class definitions that one is able to understand how the objects of the framework mechanism have been designed to provide a living solution that can be customized and/or extended to address future requirements.

The Zoo Administration class has been designed to have a "uses" relationship with the Zoo Keeper Registry class. The framework designer has designed the Zoo Administration and Zoo Registry classes to be a core function of ZAF because the designer has decided that ZAF's consumers should not be allowed to modify the behavior of objects that are members of these class definitions. The Zoo Keeper Registry, which has what is called a "contains by reference" relationship with the Zoo Keepers class, is simply a class that defines an object that is a container for all zoo keeper objects. Accordingly, the Zoo Keeper Registry includes a definition for a list_zoo_keeps( ) operation. As will be described later, this operation is responsible for providing a list of Zoo Keepers objects to other objects that request such a list.

Figure 3:
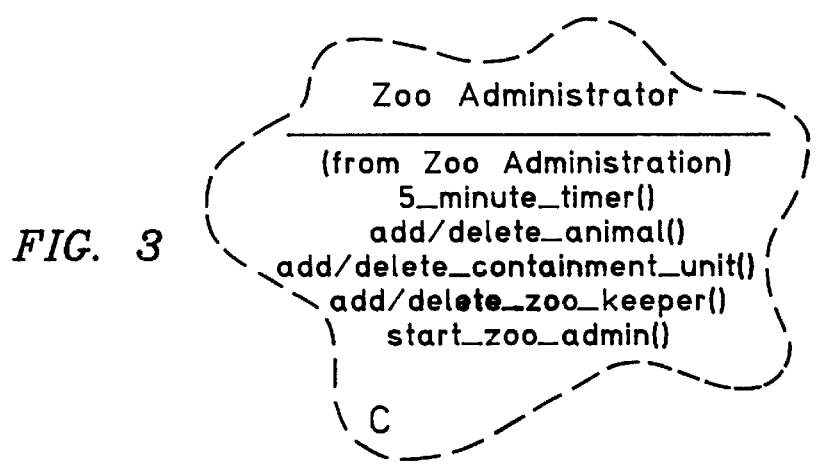
FIG. 2, 3, 4, 5, and 6 are class diagrams for the exemplary Zoo Administration framework of FIG. 1.

FIG. 3 shows a lower level view of the Zoo Administrator class. Because objects of type zoo administrator have responsibility for overall control of ZAF, the Zoo Administrator class has been designed to include operations that perform tasks oriented towards zoo administration. The class definition includes the following five operations: 5_minute_timer( ), add/delete_animal( ), add/delete_containment_unit( ), add/delete_zoo_keeper( ), and start_zoo_admin( ).

The start_zoo_admin( ) operation is responsible for starting ZAF. That is, a user or system administrator will interact with the start_zoo_admin( ) operation to begin administration of a zoo via ZAF. The start_zoo_admin( ) operation has been designed to initiate the 5_minute_timer( ) operation such that, every five minutes, the 5_minute_timer( ) operation instructs the Zoo Keepers objects to go out and check on the zoo animals. The add/delete_zoo_keeper( ) operation is responsible for interacting with users of ZAF to define additional zoo keepers (i.e., additional Zoo Keepers classes), to add additional zoo keepers (i.e., Zoo Keepers objects), and to remove Zoo Keeper classes and/or objects. As will become clear in the forthcoming paragraphs, each of the Zoo Keepers objects is responsible for performing a particular zoo task. Therefore, it is natural that a user of ZAF might well want to add a Zoo Keepers definition and object to handle an additional zoo task or to remove a definition or object that is no longer needed. The ZAF framework designer has provided this flexibility by designing the Zoo Keeper mechanism as an extensible function.

Like the add/delete_zoo_keeper( ) operation, the add/delete_animal( ) operation is responsible for interacting with users to define additional zoo animal classes and objects and also to remove classes and objects that are no longer needed. Again, it is quite natural for a zoo to need to add and remove animals. The add/delete_containment_unit( ) operation is responsible for the definition of new Containment Unit classes and objects and for removal of classes and/or objects that are no longer necessary. Again, the framework designer has provided such flexibility by designing the Animal and Containment Unit mechanisms as extensible functions.

Referring back to FIG. 2, the Zoo Keepers class definition has a "uses" relationship with the Animal Registry, Animals, Containment Unit Registry, and Containment Unit classes. Since the value of ZAF is enhanced by allowing ZAF's consumers to customize and extend the Zoo Keepers, Animals, and Containment Unit classes, the ZAF framework designer has designed these classes as extensible functions. However, changing the behavior of the Animals and Containment Unit Registry classes would disrupt the basic operation of ZAF. Therefore, the framework designer has designed these classes to be core functions of ZAF.

Figure 4:
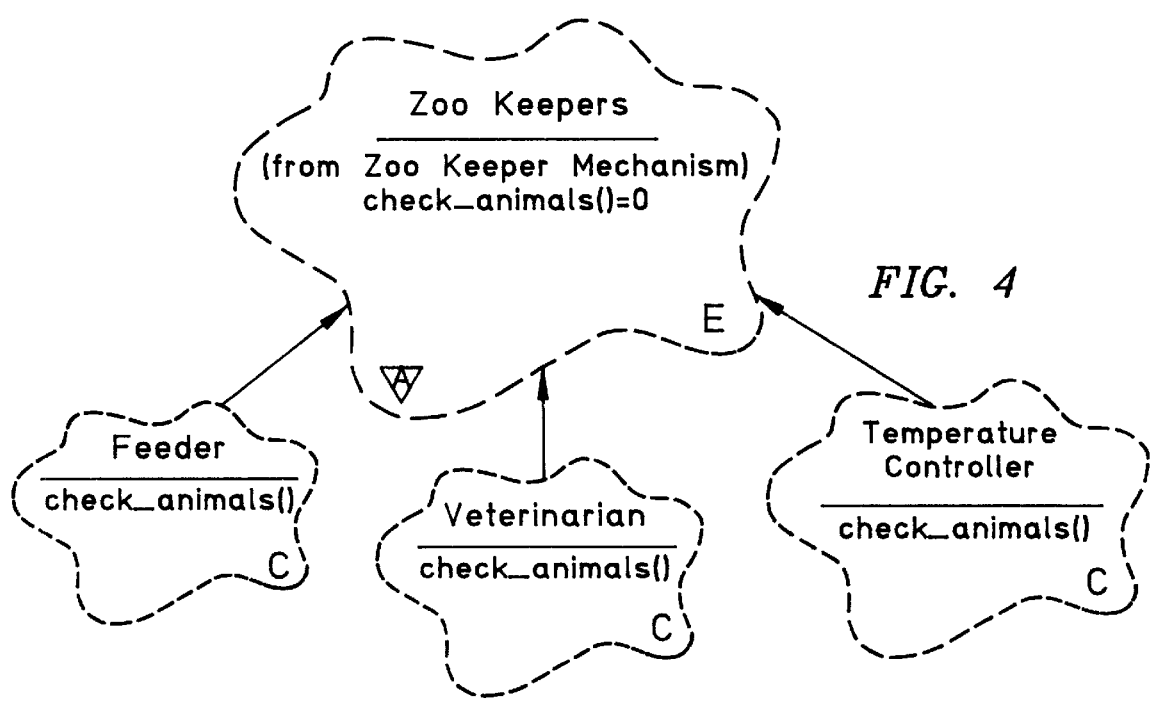

FIG. 4 is a class diagram of the Zoo Keepers class. However, before describing the details of FIG. 4, it is worthwhile to point out that the class definitions shown on FIG. 4 are ranked in a very simple ordering called a class hierarchy. A class, like the Zoo Keepers class, that represents the most (generalized/abstract class in a class hierarchy is referred to as the base class of the hierarchy. The ordering of classes in a class hierarchy goes from most general to least general (i.e., from general to specific), less general classes (e.g., the Feeder class) are said to inherit characteristics from the more general class or classes (i.e., the Zoo Keepers class in this case). As such, class definitions Feeder, Veterinarian, and Temperature Controller are said to be subclasses of the Zoo Keepers class. Inheritance mechanisms will be explored in more detail in the discussion associated with FIG. 5.

As shown on FIG. 4, the Zoo Keepers class definition contains a single operation definition, the check_animals( ) operation definition. The reader should also note that the Zoo Keepers class definition is marked as being an abstract class. Abstract classes are not designed to have objects created as their members, but are instead used to define a common interface/protocol for their subclasses. A class is said to be an abstract class when at least one of its operation definitions is a pure virtual operation definition. Pure virtual operation definitions are designed for the sole purpose of defining a common interface for subclass definition of that operation. In other words, the design of the actual behavior (i.e., the data and operations) is left to the subclasses themselves. In the case of the Zoo Keepers class definition, the Feeder, Veterinarian, and Temperature Controller subclasses define specific implementations of the pure virtual check_animals( ) operation definition that is contained in the Zoo Keepers class. An operation is marked as a pure virtual operation when it is set equal to 0.

It is important to note, though, that the common interface of a pure virtual operation definition must be honored by all subclasses such that requesting objects (called client objects) can use subclass member objects (called server objects) without needing to know the particular subclass of the server object. For examples whenever the object defined by the Zoo Administrator class needs a particular action performed, it interacts with a Zoo Keepers object. Because the interface to these objects was defined in abstract, base class Zoo Keepers and preserved in the subclass definitions for the check_animals( ) operation, the Zoo Administrator object need not have special knowledge about the subclasses of any of the server objects. This has the effect of decoupling the need for the action (i.e., on the part of the zoo administrator object) from the way in which the action is carried out (i.e., by one of the objects of the Zoo Keepers subclasses). Designs (such as the ZAF design) that take advantage of the characteristics of abstract classes are said to be polymorphic.

Polymorphism is extremely important to OO framework design because it allows the way in which something is done (called the implementation) to be changed or extended without effecting the mechanisms that depend on the fact that the action is actually performed. In other words, client objects need only understand that certain objects perform certain functions, not how those functions are actually carried out. This is one way in which a properly designed OO framework can be readily customized and extended to satisfy future requirements.

Figures 5, 6:
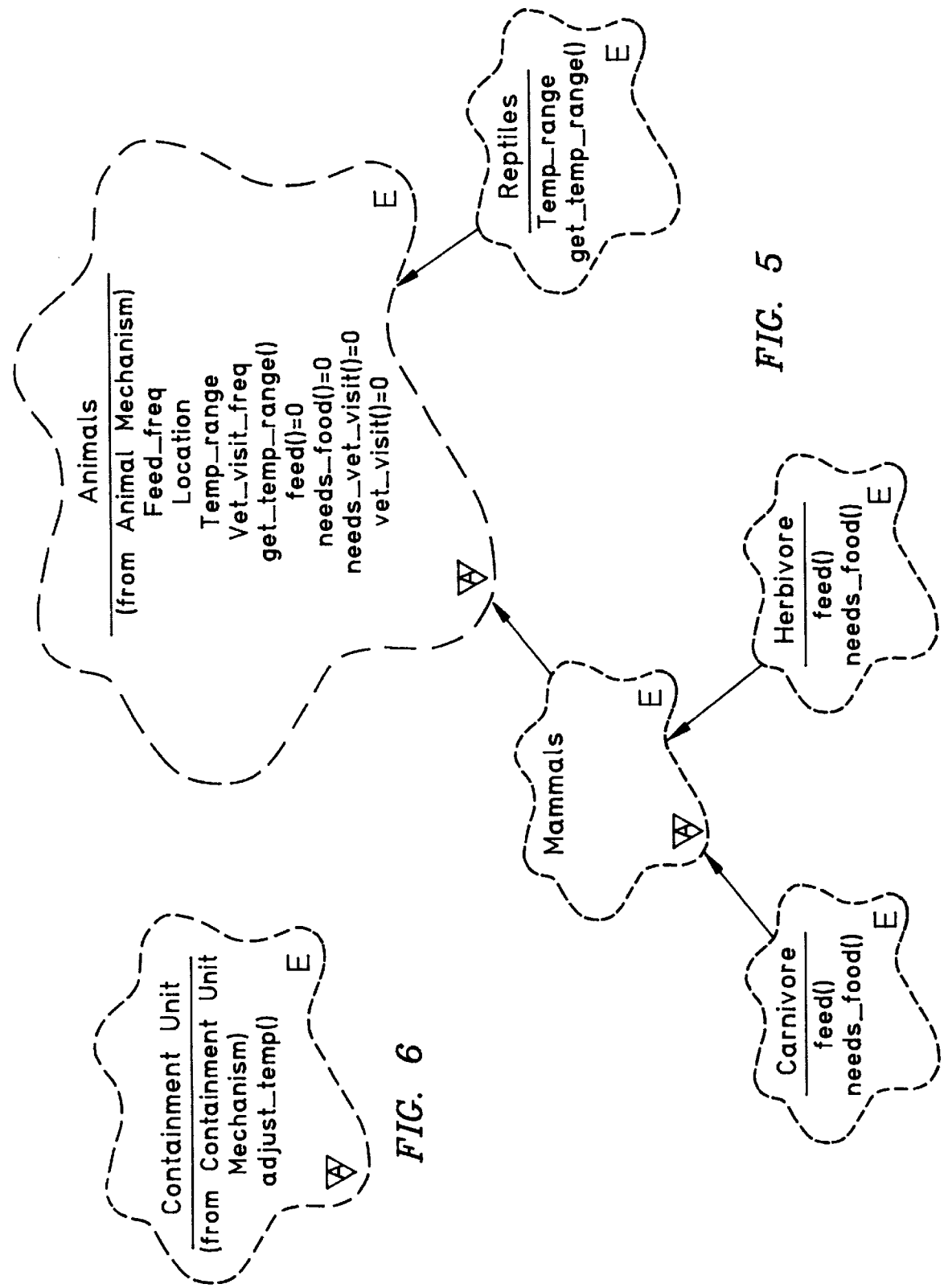

As previously discussed, the framework designer has designed the ZAF framework such that Zoo Keepers objects interact with Animals and Containment Unit objects to perform their respective tasks. FIG. 5 is a class diagram for the class hierarchy of the abstract class Animals. Because the Animals class definition is responsible for representing the characteristics and behavior of zoo animals, the framework designer has designed the abstract class Animals in a way that reflects this responsibility. As shown, the example class definition for Animals includes data definitions feed_freq, location, and temp_range and operation definitions get_temp_range( ), feed( ), needs food( ), needs_vet_visit( ), and vet_visit( ).

For the purposes of this framework overview, it is not necessary to explore each definition in detail. However, the temp_range data definition and the get_temp_range( ) and feed( ) operation definitions are good examples of well thought out framework design choices.

The feed( ) operation definition is designed to perform the actual feeding of the animals (i.e., through specific feeding apparatus, which is not shown). The feed( ) operation is a pure virtual operation. Again, this means that the design of the class is such that the actual mechanism that performs the needed function has been left to be defined by the subclasses. Requiring subclass definition is a good design choice in cases like this where objects that are created as members of the subclasses have particularized needs. In the ZAF framework, for example, each type of animal is likely to have need for a particularized feeding apparatus, which not only makes definition of a generic feed( ) operation difficult, but valueless.

By way of comparison, the framework designer has explicitly designed the get_temp range( ) operation such that it is not a pure virtual operation definition. This means that get_temp_range( ) has been generically defined as a default operation. As such, it is considered a virtual operation. Default operations are used to provide generic function to subclasses. The subclasses can simply use the default operations or they can customize or extend the default operations by redefinition. Redefinition of a default operation is called overriding the default operation.

FIG. 5 shows that Mammals is a subclass of the class Animals and, as such, the Mammals class inherits all of the characteristics of the Animals class. The Mammals class is also designed as an abstract class, which again means that it has not been designed to have objects created as its members, but has instead been designed to provide a common interface for its subclasses. Subclass Mammals is further subclassed into classes Carnivore and Herbivore.

Because definition of the feed( ) operation has been left up to the subclasses, the subclasses Carnivore and Herbivore each have their own definition of the feed( ) operation. Again, this is a good design choice because meat-eating carnivores are going to have different needs than their plant-eating counterparts.

Temp_range is a data definition for the range of temperatures that coincides with that of the specific animal's natural habitat and the get_temp_range( ) operation definition is designed to retrieve the temp_range for a specific animal and return it to a requesting client object. Subclass Reptiles contains its own data definition for temp_range and its own definition for the get_temp_range( ) operation. ZAF has been designed this way to point out that data definitions can be overridden just like operation definitions. Since many reptiles live in desert conditions, where nights can be very cold and days very hot, the default temp_range definition has been overridden in the Reptiles class to include time and temperature information (not explicitly shown on FIG. 5). This is another good design choice because it allows ZAF to treat reptile containment units differently than other containment units by allowing temperature adjustments to be made based on the time of day as well as on the current temperature of the containment unit itself.

FIG. 6 is a class diagram showing a lower level view of the Containment Unit class. The containment unit class contains a virtual operation definition adjust_temp( ). The adjust_temp( ) definition defines both the interface and mechanism used to actually adjust the temperature in the containment units of the zoo (i.e., via heating and cooling mechanisms that are not shown).

How the ZAF Objects Interact

Beyond designing the objects that make up the solution to the specific programming problem, the framework designer must also design how the individual objects interrelate. In other words, the objects must interrelate in way that takes advantage of the manner in which they were designed. As discussed, the way in which the defined operations of an object operate on the data defined for the object is called the object's behavior. While objects may be characterized as autonomous entities, it is still very important that each object exhibit a consistent behavior when interrelating with other objects. Consistent behavior is important because objects depend upon the consistent behavior of other objects so that they themselves can exhibit consistent behavior. In fact, consistent behavior is so important that an object's behavior is often referred to as the contract the object has with the other objects. When an object does not exhibit a consistent behavior, it is said to have violated its contract with the other objects.

When an operation of one object needs access to the data controlled by a second object, it is considered to be a client of the second object. To access the data controlled by the second object, one of the operations of the client will call or invoke one of the operations of the second object to gain access to the data controlled by that second object. One of the operations of the called second object (i.e., a server operation in this case) is then executed to access and/or manipulate the data controlled by the called object.

Figure 7:
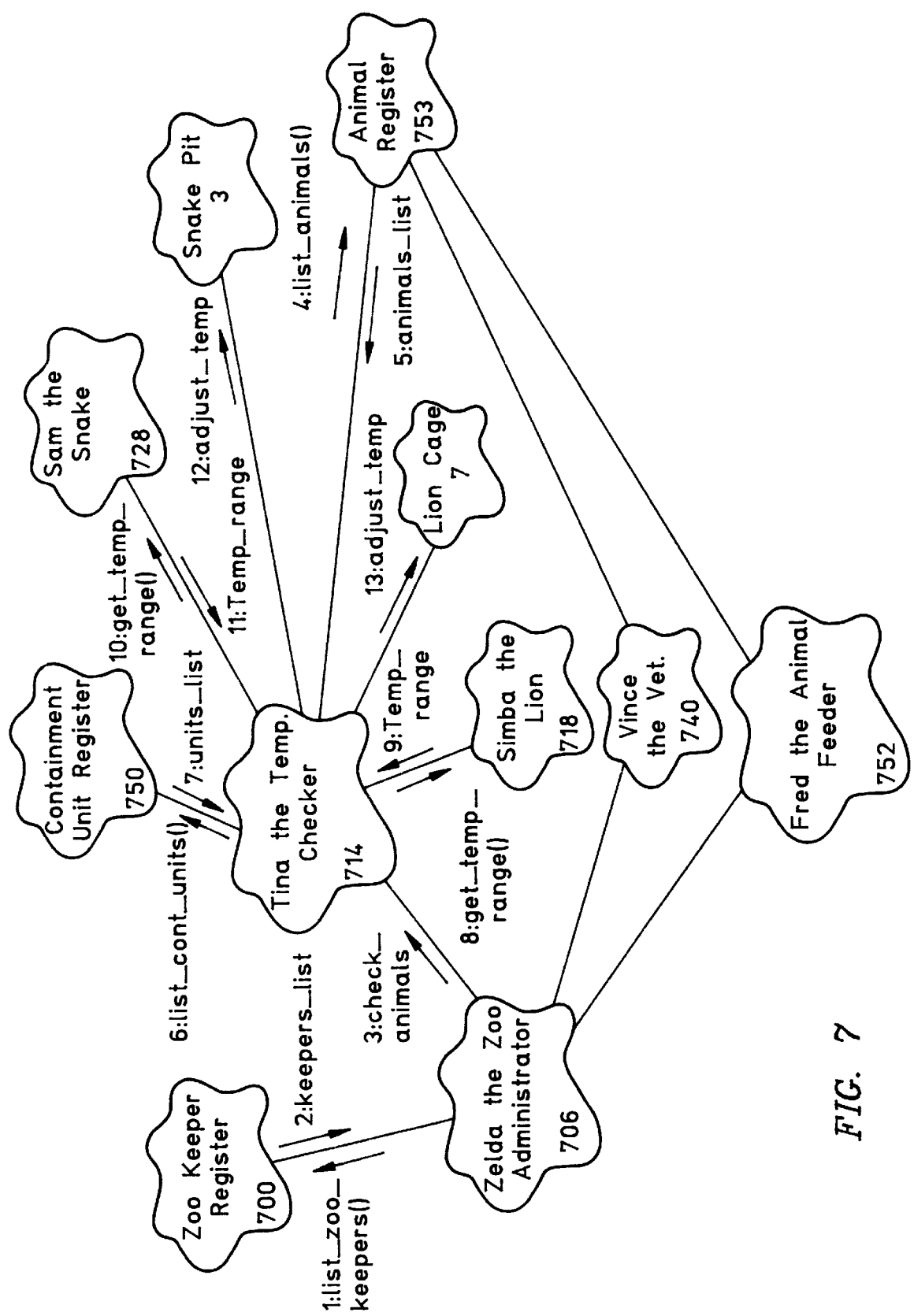
FIG. 7 is an object diagram for the exemplary framework of FIGS. 1 through 6.

FIG. 7 is an object diagram showing how the example objects of ZAF interact to assist zoo personnel in operating the zoo. A detailed analysis of the interaction of all of the ZAF objects is unnecessary for the purposes of this overview. However, the reader should review the following simple control flow to obtain a rudimentary understanding of how objects in an OO environment interact to solve problems.

As mentioned, an object is created to be a member of a particular class. Therefore, the object Zelda the Zoo Administrator 706 is an object that is a member (actually, the only member) of the Zoo Administrator class. As such, object Zelda is responsible for overall control of ZAF. All of the Zoo Keeper objects have registered with the Zoo Keeper Register object [object 700]. Therefore, object Zelda obtains a list of the current zoo keepers by calling the list_zoo_keepers( ) operation [step 1] of the Zoo Keeper Register object. The Zoo Keeper Register object 700 has been created as a member of the Zoo Keeper Register class. For the purposes of illustration, assume that this occurs every five minutes as part of Zelda's 5_minute_timer( ) operation. The Zoo Keeper Register object then responds with the zoo keepers list [step 2]. The list of zoo keepers includes Tina the Temperature Checker [object 714], Vince the Vet. [object 740], and Fred the Animal Feeder [object 752]. Each zoo keeper has been created as a member of the Zoo Keepers class. In particular, objects Tina the Temp. Checker, Vince the Vet., and Fred the Feeder are respectively members of the Temperature Controller, Veterinarian, and Feeder subclasses.

Once the list of current zoo keepers has been returned to object Zelda 706, object Zelda instructs each zoo keeper in the list to check the animals by calling the check_animals( ) operation of each Zoo Keeper object. Only the call to Tina the Temp. Checker is shown, indicated as step 3. It should be noted that object Zelda did not need to understand the types of zoo keepers that were in the zoo keeper list, the number of Zoo Keeper objects in the list, or the specialized characteristics of any one Zoo Keeper object. Object Zelda uses the same interface (i.e., the check_animals( ) operation) to communicate with each Zoo Keeper object. It is then up to the individual Zoo Keeper objects to perform the task for which they have been created. Each Zoo Keeper object performs its assigned task through use of its own check_animals( ) operation. For example, object Tina's check_animals( ) operation retrieves a list of current animals from the Animal Registry object by calling the list_animals( ) operation [step 4] and then a list of containment units from the Containment Unit Register object by calling the list_cont_units( ) operation [step 6]. Upon examining the animal list, object Tina's check_animals( ) operation determines that there are only two animals currently registered in the zoo, Sam the Snake [object 728] and Simba the Lion [object 718].

Object Tina's check_animals( ) operation then calls the get_temp_range( ) operations to (get temperature ranges from objects Sam and Simba [steps 8 and 10]. Once the temperature ranges have been returned, the check_animals( ) operation of object Tina determines which containment units house the respective animals (i.e., Simba and Sam) and then calls the adjust_temp( ) operation of the appropriate containment unit (i.e., Lion Cage 7 in the case of object Simba and Snake Pit 3 in the case of object Sam) to adjust the temperature of the containment units [steps 12 and 13].

The adjust_temp( ) operation of each containment unit then completes the control flow by proceeding to adjust the temperature in a way that is appropriate for the animals contained in each containment unit. (That is, the temperature is adjusted based on time and temperature for Snake Pit 3 and based on time alone for Lion Cage 7.) The reader should note that the relationship between the check_animals( ) operation and the adjust tempo operations is polymorphic. In other words, the check_animals( ) operation of object Tina 714 does not require specialized knowledge about how each adjust_temp( ) operation performs its task. The check_animals( ) operation merely had to abide by the interface and call the adjust_temp( ) operations. After that, it is up to the individual adjust_temp( ) operations to carry our their tasks in the proper manner.

At this point, it is again worthwhile to point out that the ZAF system is an extremely simplistic framework that has been presented to help novice readers understand some basic framework concepts so as to better appreciate the benefits and advantages of the present invention. These benefits and advantages will become more clear upon reference to the following Detailed Description.

The Computer System of the Preferred Embodiment

Figure 8:
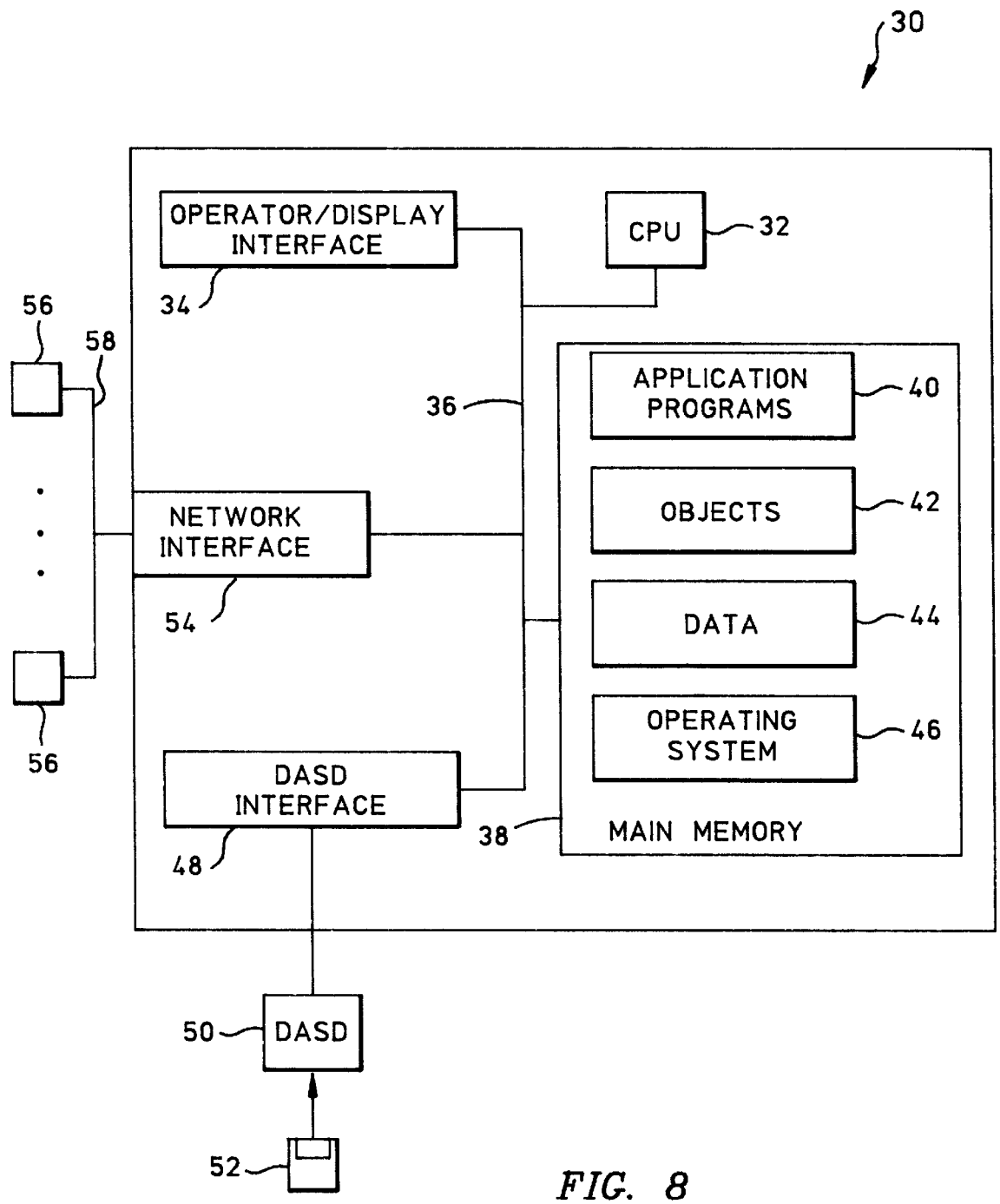
FIG. 8 is a functional block diagram of a computer processing system constructed in accordance with the present invention.

FIG. 8 is a block diagram of a computer system 30 constructed in accordance with the present invention. The computer system includes a central processing unit (CPU) 32 that operates in response to operator commands, which it receives from an operator/display interface 34 to which it is connected by a system bus 36. The CPU also communicates over the system bus with a main memory 38. The main memory is illustrated containing a variety of data structures, including application programs 40, objects 42, data 44, and an operating system 46. The main memory 38 is represented as a single entity, but those skilled in the art will appreciate that the main memory can comprise a combination of random access memory (RAM), hard disk drives, optical disk drives, and other storage devices containing logically segmented storage locations.

The operating system 46 preferably supports an object oriented programming environment such as provided, for example, by the C++ programming language. The application programs 40 are invoked, or launched, by a user through the operator/display interface 34. The application programs can be written in a variety of languages including C++. The objects 42 are programming data structures of an object oriented programming language, such as C++.

The computer system 30 also includes a direct access storage device (DASD) interface 48 that is connected to the system bus 36 and also is connected to a DASD 50. Those skilled in the art will appreciate that the DASD 50 can receive and read computer program products 52 from, for example, integrated circuit chips, and also machine-readable storage devices such as magnetic media disks, on which are recorded program instructions whose execution implements the framework of the present invention. The machine-readable storage devices also can comprise, for example, media such as optical disks. The computer system 30 also includes a network interface 54 that permits communication between the CPU 32 and other computer systems 56 over a network 58. The other computer systems 56 can comprise, for example, computer systems similar in construction to the exemplary computer system 30. In that way, the computer system 30 can receive data into the main memory 38 over the network 58 after communication between the computer systems has been established by well-known methods that will be understood by those skilled in the art without further explanation.

It is important to note that, while the present invention has been (and will continue to be) described in the context of a fully functional computer system, those skilled in the art will appreciate that the mechanisms of the present invention are capable of being, distributed as a program product in a variety of forms, and that the present invention applies equally regardless of the particular type of signal bearing media used to actually carry out the distribution. Examples of signal bearing media include: recordable-type media such as floppy disks and CD ROMs and transmission-type media such as digital and analog communication links.

System Processing
Start-up Processing Steps

Figure 9:
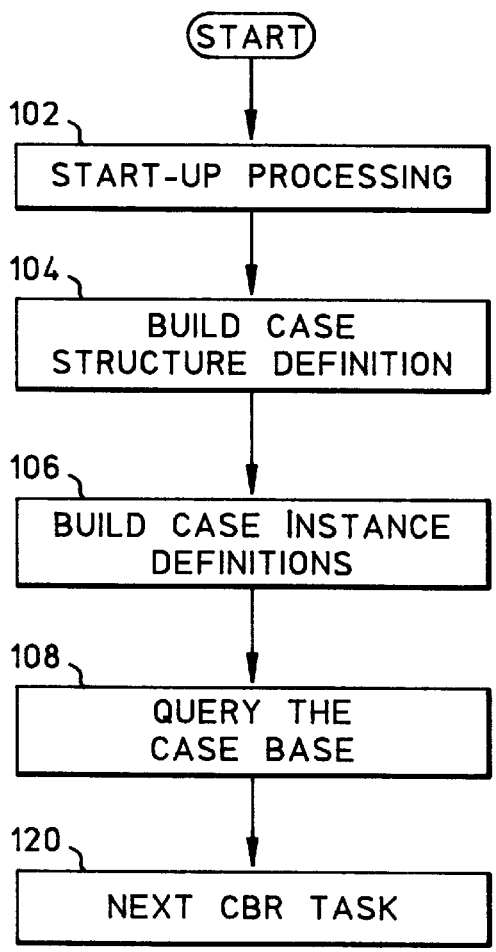
FIG. 9 is a flow diagram that illustrates the processing steps performed by the framework mechanism of the computer processing system illustrated in FIG. 8.

FIG. 9 is a flow diagram that represents a typical sequence of processing steps executed by the computer system illustrated in FIG. 8 in processing a query following case-based reasoning (CBR) system generation and start-up processing. The flow diagrams that follow are supplemented by category and object-scenario diagrams described further below.

Each time the CBR system is used, start-up processing is performed that includes initialization of data objects for classes called CBR_Session, ControlFlowComponent, DataStoreComponent, PresentationComponent, and ChangeLog. In accordance with one aspect of object oriented programming conventional practice, object and class names will be written as words run together with initial capitals. As illustrated by the "ZAF" example described above, names are also written as words connected by an underscore. The objects and classes are described in greater detail below and are instantiated, or built according to the object oriented programming environment provided by the computer system illustrated in FIG. 8. The start-up processing is represented by the flow diagram box numbered 102.

The processing represented by the flow diagram box numbered 102 is further described by the following table of pseudo-code, in which line numbers are provided to indicate ordering of processing steps:

TABLE 1

Start-Up Processing.

| | |
|---|---|
| 1 | Construct/Initialize CBR_SessionComponent; |
| 2 | Construct/Initialize ControlFlowComponent; |
| 3 | Construct/Initialize DataStoreComponent; |
| 4 | Construct/Initialize PresentationComponent; |
| 5 | Construct ChangeLog; |
| 6 | Execute main control flow; |

TABLE 1-continued

Start-Up Processing.

| | |
|---|---|
| 7 | Display menu of user options such as: |
| 8 | Single Query, |
| 9 | Build CaseDefinition, |
| 10 | Build CaseInstance; |
| 11 | Reduce Changes ChangeLog; |
| 12 | Insert ChangeLog DataStoreComponent; |
| 13 | Insert CBR_Session DataStoreComponent; |

In the preferred embodiment, the CBR system is implemented in an object oriented programming environment. Therefore, the processing represented by the FIG. 9 flow diagram box numbered 102 (and described in the pseudo-code of Table 1) comprises establishing the necessary processing environment. Such processing includes constructing and initializing a CBR_SessionComponent object to control processing in the CBR system and determine the environment required by the user for additional processing, as represented by line 1 of Table 1. The information received from the CBR_SessionComponent guides construction of a ControlFlowComponent object, a DataStoreComponent object, and a PresentationComponent object, as indicated by lines 2–4 of Table 1. A ChangeLog object also is constructed, as represented by line 5, to store system selections and changes by the user.

CBR System Input—Query Processing, Case Definitions, Search Patterns

After the system environment is established, the user can invoke various CBR system options, specifying query processing, building case definitions, or building case instances. Preferably, the user selects and defines such options in the main control flow through the user interface, by selecting menu options shown on the user display screen. These exemplary options are specified in lines 6–10 of Table 1. Those skilled in the art will appreciate that associated object oriented "destruct" operations (not listed in the pseudo-code) will be performed at the conclusion of CBR system operations to delete the objects that were constructed and/or initialized. Before any destruct operations, the CBR system changes initiated by the user are recorded in the ChangeLog object, as represented by line 11 of Table 1. The recorded changes comprise processed information that might be required in a future system operation and therefore are saved in a format for retrieval using the DataStoreComponent, as indicated by line 12. The information in the CBR_Session object also is saved for retrieval at the next system operation, as represented by line 13.

As part of CBR processing, users may build case structure definitions, which specify how case instance descriptions will be stored. The data objects comprising each case structure are built, again according to the object oriented programming environment provided by the computer system illustrated in FIG. 8. The case structure definition processing includes parsing definitions, which are necessary to define how similar cases are recognized and problem descriptions will be analyzed. This processing is represented by the flow diagram box numbered 104. The flow diagram box numbered 106 indicates that the case instance (case base) definitions are received and built next. In the preferred embodiment, the case instance objects follow the structure and behaviors specified by the case structure definition. It should be noted, however, that the case instance descriptions need not comprise object oriented data. In terms of programming languages, the case instance definitions are metadata for the case instance objects.

In the next step of system processing, indicated by the flow diagram box numbered 108, the system receives a problem description (query) from a CBR system user and builds a query, which is used to query the case base. The processing of the flow diagram box numbered 108 includes evaluating the query by retrieving the closest matching case (or cases) from the case base. This is described in greater detail below. After evaluation, the CBR system receives the next CBR task, such as a next search query, at the flow diagram box numbered 120. The next task could be, for example, to build additional search queries, case definitions, or case instances.

The remaining flow diagrams provide further detail descriptions of the processing steps generally described in connection with FIG. 9.

Case Structure Definition Processing

Figure 10:
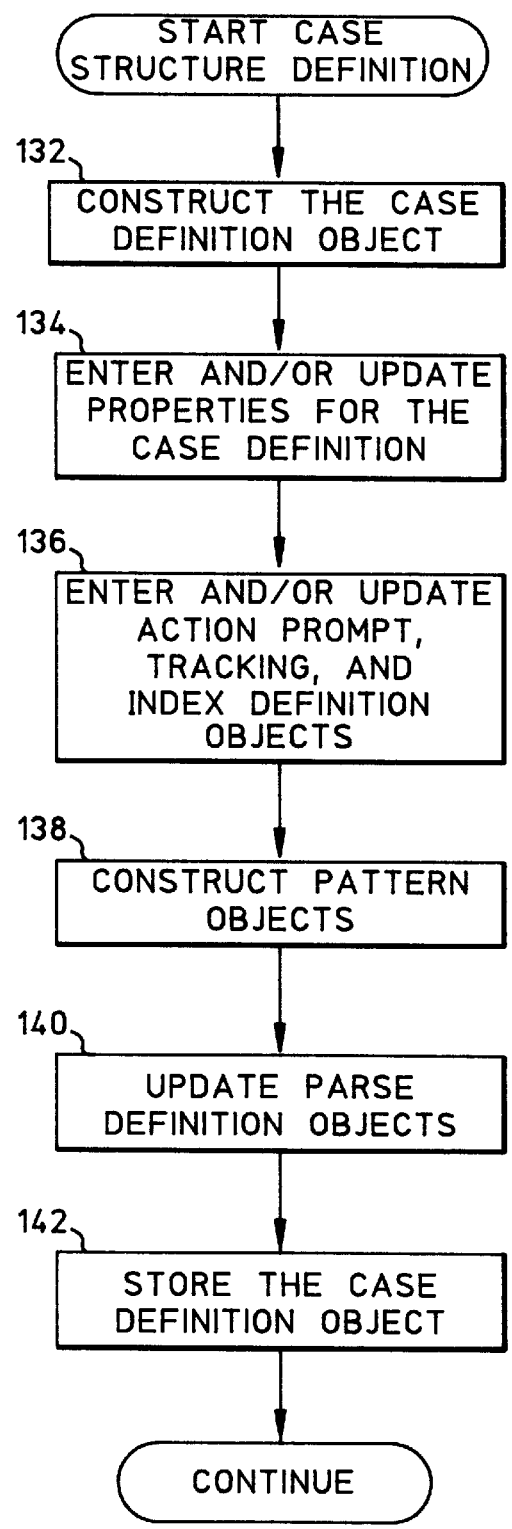
FIG. 10 is a low diagram that illustrates the processing steps performed by the extended framework mechanism of the computer processing system in executing the build case structure definition step of FIG. 9.

FIG. 10 is a flow diagram that represents the processing steps executed by the computer system illustrated in FIG. 8 in performing the case structure definition processing of the FIG. 9 flow diagram box numbered 104. The case structure definition processing provides the means for a user to define a new case structure for use by the extended framework system and to modify existing case structures. A case structure definition is a definition, or specification, of the attributes, properties, and relationships between the objects of the case base. Thus, the case structure definition informs the CBR system how the data comprising the case base will be organized and stored.

The FIG. 10 flow diagram box numbered 132 indicates that the first step in the case structure definition processing is to create and/or retrieve and document the case definition. In the object oriented programming environment, such processing includes constructing a CaseDefinition object. That is, the processing represented by the flow diagram box numbered 132 is to receive input from a user that indicates the case description data structure in terms of the data objects comprising that data structure. The received input can be a previous description or a selection of a previously defined description. Receiving the data structure from the user permits greater flexibility in the details of the extended (CBR) system and does not unduly restrict the framework user.

The processing represented by the FIG. 10 flow diagram box numbered 132 includes constructing the CaseDefinition object and displaying a user interface screen that permits the framework user to build various elements (comprising data objects) of the CaseDefinition. A CaseSet object is then constructed, which includes a determine ( ) method that permits the user to select the CaseSet to be associated with the newly defined CaseDefinition. In particular, all existing CaseSet objects are retrieved by the DataStoreComponent object and the list of case sets is displayed to the framework user for selection.

The case structure definition processing next includes constructing a ParseDefinition object for the selected CaseSet. The ParseDefinition can be retrieved by the DataStoreComponent object. In processing described further below, the user is provided with the option of changing the parsing definition again, before the parsing definition is stored by the DataStoreComponent object. If a user has entered data for an initial problem description for the CaseDefinition object, then parsing methods of the ParseDefinition class are executed to parse the Description object into searchable components.

The option to retrieve a case definition (in contrast to creating one) as indicated in the flow diagram box means that a framework user is free to use previously defined case descriptions, thereby reducing the work involved in creating new CBR applications. The documentation of the case definition can take a variety of forms, depending on the choice of the framework provider. See, for example, the section entitled "Notation" on representing object oriented data structures, located at the end of this Specification.

Case Properties, Values, and Weights Entry and Updating

The next case definition processing step in FIG. 10, represented by the flow diagram box numbered 134, is to enter and/or update the properties for the case definition from the prior processing step. Again, the framework user is free to specify the case description properties, thereby providing maximum flexibility to the framework user and avoiding undue restriction. The processing represented by the flow diagram box numbered 134 permits the framework user to define Properties class attributes associated with the CaseDefinition object. The Properties define what data is permitted for defining CaseInstance objects that are used with a selected CaseSet. The processing is repeated for each property that is associated with the CaseDefinition object.

Figures 11, 12:
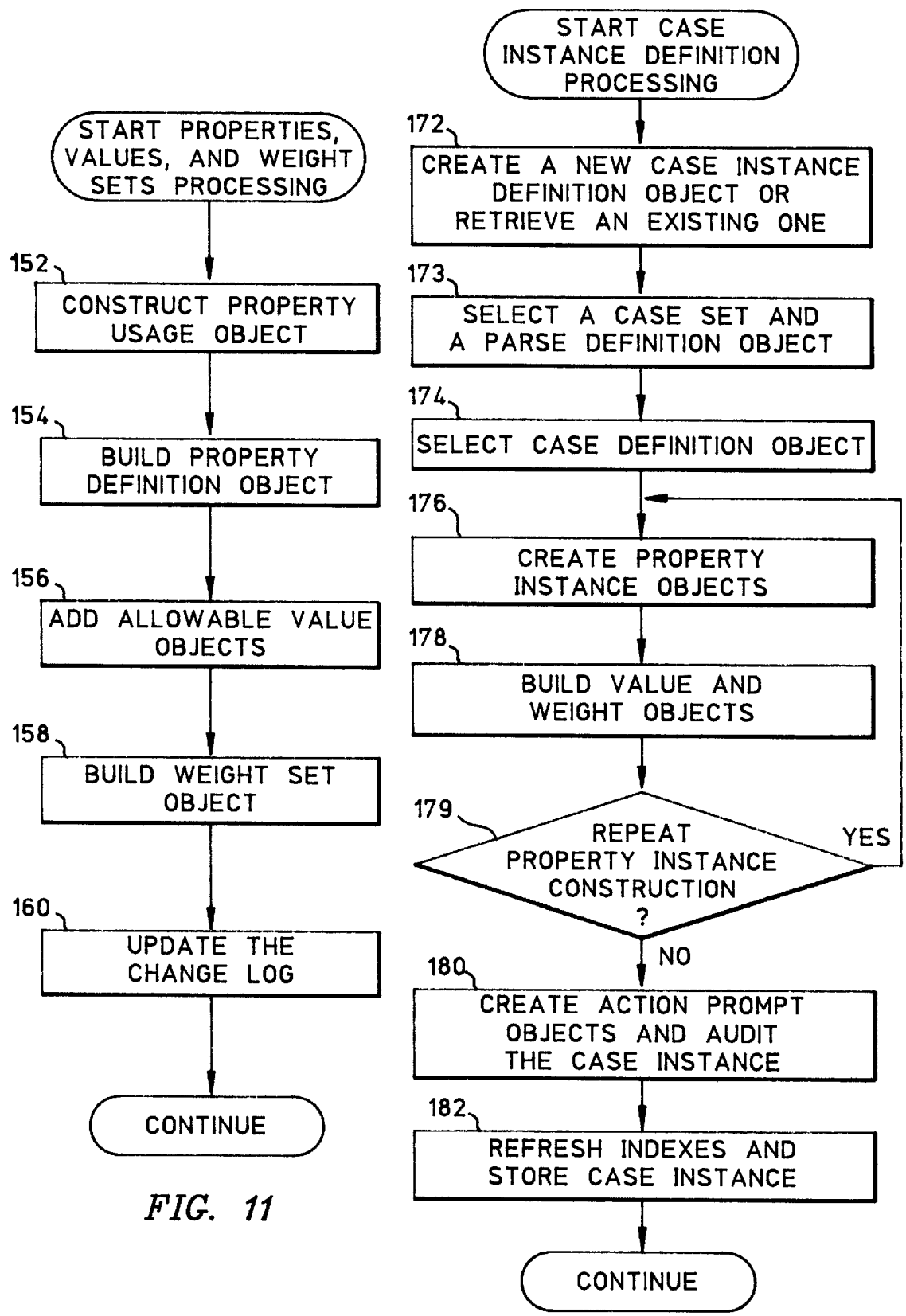
FIG. 11 is a flow diagram that illustrates the processing steps performed by the extended framework mechanism of the computer processing system in executing the construct properties, values, and weight set processing step of FIG. 10.
FIG. 12 is a flow diagram that illustrates the processing steps performed by the extended framework mechanism of the computer processing system in executing the build case instance definitions processing step of FIG. 9.

FIG. 11 is a flow diagram that represents processing steps executed by the computer system in performing the case definition properties update processing step. That is, FIG. 11 represents the processing executed in the FIG. 10 flow diagram box numbered 134.

The processing represented by the flow diagram box numbered 152 of FIG. 11 includes constructing a PropertyUsage object that permits the framework user to input property information. The processing further includes building a PropertyDefinition object, represented by the flow diagram box numbered 154. This involves the user selecting (using a determine( ) method of the PropertyUsage object) which property definition to include. The allowable property definitions for the selected case set are retrieved by the DataStoreComponent and are shown to the user for selection. If a new PropertyDefinition object is being built, appropriate input prompt information is displayed to the user so the information can be received. Such prompting is implemented by the user interface according to the framework user.

The properties processing permits the user to add allowable values, which are associated with the PropertyDefinition object being, added to the new case definition. This is represented by the FIG. 11 flow diagram box numbered 156. A value can be either a simple value or a compound value, and each case is constructed and displayed for input from the user as the user selects and/or adds to the values.

Finally, the user defines the allowable weighting. Accordingly, a WeightSet object is built and displayed, comprising chosen weight definitions, represented by the FIG. 11 flow diagram box numbered 158. Weight values are later associated with properties of case instances, as described below, and are used by the query engine to select the closest match to the current problem. As with the case structure itself, the weight structure may be received from the framework user to thereby permit greater flexibility in the details of the extended (CBR) system and not unduly restrict the framework user. As new definitions for properties, values, and weights are created or changed, the processing updates the change log (that is, creates ChangeLog objects) to reflect the changes. This is represented by the FIG. 11 flow diagram box numbered 160. This completes the properties definition processing.

Action Prompt, Tracking, and Index Definitions

Returning to FIG. 10, the next processing step of the case structure definition processing is represented by the flow diagram box numbered 136, which is to enter and/or update action prompt, tracking, and index definitions. The processing represented by the flow diagram box numbered 136 includes constructing an ActionPromptDefinition object, a TrackingDefinition object, and an IndexDefinition object. The construction of such objects can be accomplished in any order. Each CaseDefinition can have more than one of each of such object elements.

Using the DataStoreComponent object and its methods, the framework user associates action prompt definitions to the case definition. An ActionPromptDefinition object is constructed and displayed to the user to permit the user to input information. Accordingly, a list of permissible definitions for the chosen case set is retrieved and displayed to the user for selection, or the user can decide to build a new ActionPromptDefinition object. Any updates or creations are added to the ChangeLog object. Similar processing would be followed for the creation and/or building of the tracking definitions and index definitions to be added to the case definition.

Search Pattern Construction

The next processing step is represented by the FIG. 10 flow diagram box numbered 138, which indicates that the framework constructs Pattern objects that are associated with the CaseDefinition data object. The processing, includes constructing a Pattern data object. The Pattern object is displayed to the framework user to permit the user to input pattern information. A Pattern object consists of one or many single PropertyInstance objects and/or CompoundpropertyValue objects. As these objects are added, each is constructed and displayed to the user for input of the information. The appropriate objects are built and values are added, comprising either simple or compound values. The Pattern limits, or constrains, the combinations of property values that can be defined in case instances of the case definition.

Case Set Parsing Definitions

The next processing step is represented by the FIG. 10 flow diagram box numbered 140, which indicates that the framework user updates Parse definitions that are associated with the case set into which the new case definition will be added. The processing includes permitting the user to select a parse definition, such as by displaying a parse definition screen for selection of the parse definition. The selected parse definition is checked for any errors or data structure incompatibilities. As noted above, in the preferred embodiment, changes to the CBR system are recorded in a change log history. The change history can be used for example for providing an audit trail, failure recovery, or undo of edit operations.

Completion of Case Definition, Storing the Case Definition

The next processing step is represented by the FIG. 10 flow diagram box numbered 142, which indicates that the framework stores the case structure definition. The store processing includes inserting all of the defined objects in the appropriate data store and destructing each one of the objects not needed after storing. The destruction completes the CaseDefinition processing.

Case Instance Definition Processing; Case Set and Parsing Selection

FIG. 12 is a flow diagram that represents the processing steps executed by the computer system of FIG. 8 in performing the case instance definition processing of the FIG. 9 flow diagram box numbered 106. The case instance definition processing provides the means for a user to define new problem description-solution pairs, called history cases, for inclusion in the case base and to perform maintenance on existing cases. Each problem description-solution pair, or case instance, has a data structure specified by the case structure defined in the prior processing step (FIG. 9). Similar processing would be used to update case instances by first retrieving them and then updating them via the user interface.

FIG. 12 shows that the first processing step performed in defining case instances is to create a new case instance definition or retrieve an existing definition, as represented by the flow diagram box numbered 172. That is, the framework must determine the data structure of the incoming data. The CaseInstance data object is first constructed according to the object-oriented programming environment of the computer system. After the CaseInstance object is constructed, the user determines the CaseSet to be used. This is accomplished when the user enters data that is used to search for a specific CaseSet from a retrieved list of CaseSet objects to contain the current CaseInstance object. A CaseSet object collects CaseInstances, which conform to the structure of the case definitions associated with the CaseSet object. This can be used to logically separate cases for search purposes.

After the case set is selected, the next step in the processing of the flow diagram box numbered 172 is for the appropriate ParseDefinition objects to be retrieved. This processing permits the user to select the type of parsing that will be used. The user may select tri-string or token parsing either individually or together, as desired, to parse the input data (problem description or query). The tri-string parse will break down the input data in successive three-character groups. This type of parsing permits some so-called "fuzzy" matching and tolerance for incorrectly spelled words in the input data. The token parse breaks down each word in the input data into a "base" or token word, essentially stripping predetermined prefix and suffix combinations from the individual words. Common synonyms also can be handled by the token parse.

Selection of Case Definition

The next processing step, represented by the flow diagram box numbered 174, is to select the case definition that will control the structure of the new case instance. The "select Case Definition" processing of the flow diagram box numbered 174 includes interactions necessary for the selection of a CaseDefinition object and the assignment of property and value information to the defined case. The stored CaseDefinition objects are first retrieved to permit the user to select which CaseDefinition object should be used. Next, the objects necessary for populating the CaseDefinition objects with the proper data attributes are constructed. The attributes include objects called PropertyDefinition, ActionPrompt, IndexDefinition, TrackingDefinition, and Incident, which are created and retrieved by the DataStoreComponent. These are described further below.

Property Instance/Incident Processing

The next processing step, represented by the FIG. 12 flow diagram box numbered 176, is to create a PropertInstance data object. The "create Property Instance" processing creates the PropertyInstance data objects for the previously selected CaseInstance based on either the data from an Incident object or by creating new PropertInstance objects from user input data. In creating the property instance objects, a list of Incident objects may be first retrieved to permit selection of a stored Incident object as the source for building a CaseInstance object. As noted previously, the DataStoreComponent is the mechanism through which a user can retrieve stored data such as for selection of a stored Incident object.

A "convert-to-case" method identifies all known Property Instance/Value pairs from the Incident and creates objects for such pairs for the newly selected CaseInstance. These PropertyInstance and Value objects can then be modified if necessary for the CaseInstance object. Additional PropertyInstance objects can then be selected from a list of all PropertyDefinition objects that are valid for the current CaseDefinition object. Again, selection of stored objects will be accomplished through the DataStoreComponent. The user may access additional PropertyDefinition objects if necessary, using the DataStoreComponent. Similarly, new PropertyDefinition objects can be stored into persistent storage using the DataStoreComponent. Lastly, the flow diagram box 176 processing finishes with update of the ChangeLog to reflect all changes made by the user.

Build Values for the Property Instance

The next processing step, represented by the FIG. 12 flow diagram box numbered 178, is to build Value objects for the PropertyInstance objects and assign weights to the properties of those Value objects. The "build Values" processing permits building the Value objects associated with the PropertyInstance objects, constructing the WeightInstance objects, and inferring additional PatternValue objects. First, the values allowed for the current selected CaseDefinition object are listed for selection by the user. This controls the structure and values of property instances, and indicates if users can also add new properties to the case instance and case definition. If the user decides to add a new Value object, then the user selects between the SimpleValue and CompoundValue object types. A SimpleValue is a unitary value type, while a CompoundValue is a combination of one or more SimpleValues. If Value objects are added or changed, they are reflected in the ChangeLog.

The WeightDefinition objects are retrieved from storage (from the appropriate data objects, using the DataStoreComponent) for user selection. If the user creates a new WeightDefinition object, the new object is stored and the ChangeLog is updated. After the new PropertyInstance, Value, and Weight objects are created or selected, the processing to infer Value Pattern objects will enhance the CaseInstance object with additional PropertyInstance objects and/or Value objects that can be determined based on the case definition structure and constraints. In this way, the infer process checks the query against further constraints that might be possible to extract from the case definition. This completes the processing of the flow diagram box numbered 178.

Next, as represented by the decision box numbered 179, the CBR system checks to determine if additional property instances are needed. That is, an "infer" operation will determine if the values and weights provide sufficient constraints on the defined case instances to quickly lead to a solution set. For example, if case instance properties that are important (as indicated by ranking data) have not been specified by the user, the system will attempt to enhance the case instance definition by repeating the property instance and value/weight building steps represented by the flow diagram boxes numbered 176 and 178. Thus, if needed, such constraint processing is repeated by looping back (a negative outcome from the decision box 179).

With the processing represented by the FIG. 12 flow diagram box numbered 178, the framework user can enter and/or update the values and weights for each property associated with a case instance. This involves storing the case instances into the case base. It should be appreciated that loading the case base need not be done one by one for each case instance. Rather, a data file can be prepared and stored at an appropriate computer data base location. That is, the case instances can be loaded in their entirety. The data file, comprising multiple case instance objects or indexes, can be retrieved using the DataStoreComponent and loaded. In this way, the "build values" processing need not be repeated at every invocation of the CBR system.

Value and Weight Processing

The last processing steps of the property instance processing are for entering and/or updating the weight values for each of the properties associated with the case instances. The weight values are applied via the weight structure to assign rank values to the problem descriptions in the case base and thereby permit the query engine to identify and select the case history instance that most closely matches the current problem.

Thus, after the values processing of the flow diagram box numbered 178, the next case instance definition processing is represented by the FIG. 12 flow diagram box numbered 180, which is to create ActionPrompt and Audit objects and to audit the case instance that has been built. In the action prompt/audit processing, ActionPrompt objects are first constructed and then are retrieved to permit user selection of existing ActionPrompt objects or user creation of new ActionPrompt objects. If new objects are created, they are inserted into the appropriate DataStoreComponent objects of the data storage and the ChangeLog object is updated to reflect the addition. After the construction of the ActionPrompt objects, a series of Audit methods are performed to ensure valid PropertyUsage attributes for the selected CaseDefinition, PropertyValue attributes for the PropertyUsage, ActionPrompt, WeightDefinition and WeightSet, and PatternCase objects.

The next processing step, represented by the FIG. 12 flow diagram box numbered 182, is to create refresh indexes and store the CaseInstance. The box 182 processing includes refreshing the IndexDefinition objects by constructing Index objects and IndexEntry objects. The IndexDefinition objects must be refreshed whenever the referenced items are changed or new items added. After the refresh, each element of the newly created CaseInstance objects are stored in the data base with an insert operation. Next, the processing of the flow diagram box 182 stores the PropertyInstance and associated Value and WeightInstance objects.

The flow diagram box 182 processing also stores the ActionPromptInstance, IndexInstance, and IndexEntryInstance objects for each CaseInstance in the data base. Finally, the "build Case Instance" processing of box 182 includes destructing each one of the objects not needed after the data storage. This concludes the ease instance definition processing. After completing the case instance definition, processing continues with the FIG. 9 flow diagram box numbered 108.

Evaluating the CBR Query

Figure 13:
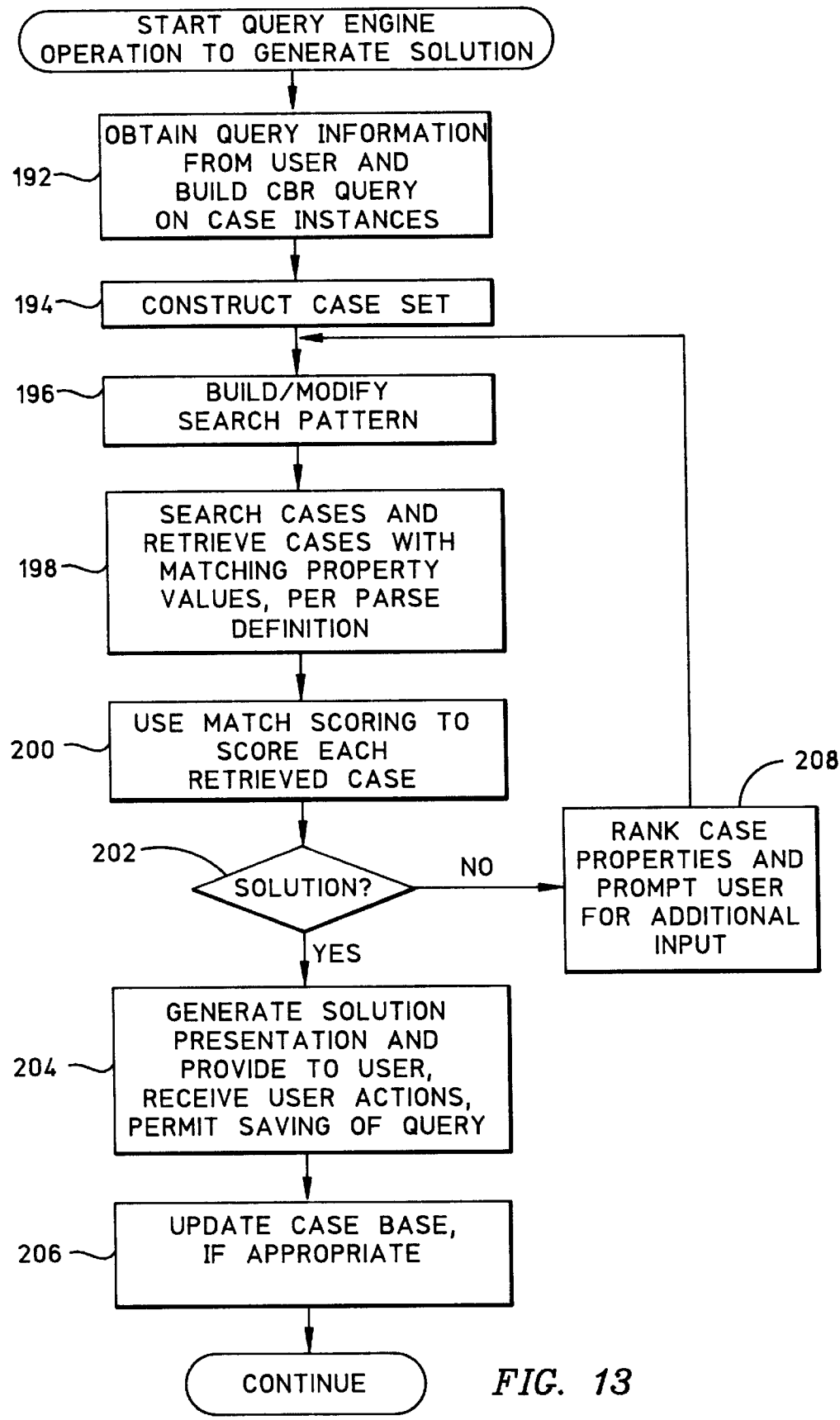
FIG. 13 is a flow diagram that illustrates the processing steps performed by the extended framework mechanism of the computer processing system illustrated in FIG. 8 in producing a solution to a query.

FIG. 13 is a flow diagram that represents the processing steps executed by the computer system illustrated in FIG. 8 in operating the query engine to generate a solution to a received current problem. That is, FIG. 13 represents the processing carried out in the FIG. 9 flow diagram box numbered 108 that specifies the step of querying the case base, including evaluating the CBR query by retrieving the case instance set that most closely matches the current problem.

The first step in matching the closest case instance set, as represented by the FIG. 11 flow diagram box numbered 192, is to obtain the query information from the CBR system user and build a CBR query on the case instances. In the preferred embodiment, the user query is represented by a CBR Query object. Next, the system constructs a case set that contains the case instances (the data descriptions) against which a received query will be searched. This step is represented by the flow diagram box numbered 194. After the user provides the query and the query is transformed into a query object, the user builds a search pattern, which further defines and specifies what the query is searching for. The search pattern, for example, can specify sets of cases with which query matches will be tested. The search pattern processing is represented by the FIG. 9 flow diagram box numbered 196.

The next processing step, represented by the FIG. 13 flow diagram box numbered 198, is to search the case base and retrieve the case history instances with property values that match the property values of the current problem, in accordance with a parse definition defined previously. The flow diagram box numbered 200 indicates that the next processing step is to use match scoring to score each of the retrieved cases and thereby determine the closest matches to the current problem. The match score is a measure of the number of property values shared in common between a query and a case instance. In this way, the match score indicates the similarity of the query to a case instance description.

Checking for a Solution After Query Scoring

At the decision box numbered 202, the system checks for a solution by calculating an evaluation score. If the score indicates a sufficiently close match, then the retrieved case or cases are designated a solution or solutions. If there is one or more solution, an affirmative outcome at the decision box 202, then the next processing step is for the CBR system to generate a solution presentation and provide it to the user, who then can continue with further actions and processing, if desired. This step is indicated by the flow diagram box numbered 204. The PresentationComponent is the mechanism through which data (such as the solution cases) is provided to the user. The solution can be provided, for example, in the form of one or more screen displays of the solution cases.

The further user actions can include submitting a new query, saving the current query, or saving the query as an incident. The CBR system then updates the case base, if appropriate, as indicated by the flow diagram box numbered 206. The DataStoreComponent is the mechanism through which data is stored or retrieved from persistent storage of the system, such as DASD files. This completes the CBR system processing for the received query.

If no solution was found, a negative outcome at the decision box numbered 202, then the CBR system ranks the properties by computing a property values score to guide the user in providing additional information. The user may execute prompts to aid in this. This processing is represented by the flow diagram box numbered 208. The property values score permits the user to determine which additional information would be of the most benefit in finding a solution. The PresentationComponent is the mechanism through which additional priority values are obtained from the user.

Ranking of the properties, as described further below, is carried out to determine the relative importance of properties specified in the case structure definitions so as to identify the properties that contribute the most to solution scoring and therefore move the system most rapidly to finding a solution. The processing of the ranking step (box 208) includes system prompting that asks the user to provide additional property values. After property ranking, processing returns to the flow diagram box numbered 196 to modify the search pattern, if desired. Thus, the steps represented by the boxes numbered 196, 198, and 200 can be repeated as necessary until a query solution is identified.

Dynamic Weighting

Conventionally, many case based reasoning systems carry out query evaluation match scoring that will effectively penalize (or fail to penalize) attributes or categories that are unspecified in either a query or in a case instance. The system user has no control over such processing, as it is part of the evaluation scoring methodology selected by the system designer.

In performing match scoring, represented by the FIG. 13 flow diagram box numbered 200, the preferred embodiment permits the user to control whether or not cases and search queries with unspecified properties will be "penalized" by providing dynamic case property weighting and scaled query weights to affect the evaluation score. Case property weighting permits the user to assign differential weights to specified properties of cases to emphasize or minimize particular properties of cases. Scaled query weights permit a user to control the extent to which properties specified in a query are used in scoring.

It should be noted that the dynamic weighting can be implemented independently of the object oriented aspects of the preferred embodiment. Thus, although the description of dynamic weighting in the preferred embodiment will assume an object oriented implementation, in keeping with the design of the preferred embodiment, the features of the dynamic weighting and the processing described further below can be implemented in a procedural programming environment. Those skilled in the art will be able to readily construct a procedural implementation of the dynamic weighting based on the following explanation.

Case instances are stored as sets of property/value pairs and each property is assigned an importance rank value relative to the other properties of the case when the case is stored. That is, value ranking is assigned at the time the case is added to the case base. In accordance with the present invention, at the time a query is evaluated and a score is computed, the rank values are normalized, so that unspecified properties in a query that ordinarily would result in a lower match score instead can be compared in relative terms. Normalizing the values avoids penalizing less precisely defined cases in the data base, as explained below.

Generally, case-based reasoning systems (and some document retrieval systems) use weighted matching techniques to find the cases in a history (case instance) data base that are the most similar, and therefore the closest match, to a set of specified search criteria. This technique penalizes history cases in the data base that are more completely defined than others, because for many queries a large percentage of the properties will be unspecified.

For example, a query might specify a set of five different properties of a case instance (the total number of properties available to define a case instance is specified by the case structure definition). If a case in the data base (a history case) does not have data concerning one of the properties, the evaluation score for that case can be reduced relative to other history cases that have the property defined because a simple summation of property-value multiplication products will result in a zero for the missing property. The score for the case with the unspecified property might be lower than another completely specified case, even if the completely specified case is not as close a match on the four remaining properties. Thus, it might be desirable to avoid penalizing extra case properties. In accordance with the invention, if unspecified properties should not penalize a case, then weights for that property are normalized across the weights of the other properties.

Many weighted matching techniques also penalize a history case if properties are specified in the query that are not defined for the case. The users making queries typically have no control over the manner in which unspecified properties are handled. Some systems attempt to address the problem by requiring those who define cases to provide weights to be associated with each property to allow for unmatched property values, matched property values, or unspecified properties. Such weights are static and cannot be adjusted for specific searches. This approach is not satisfactory, because the weights are static, cannot be changed by the user, and make case definition complicated.

Dynamic Weighting of Properties

The present invention permits dynamic weighting so that each property of a history case is assigned an importance ranking relative to the other properties of the case when the case is stored into the case base. The weights are then accounted for in the match scoring evaluation processing of the query in two ways. First, if the query is one in which unspecified properties should result in lower scoring of a history case, then a standard normalization of the property rankings is used as the weighting factor for each property in the case definition. Second, if unspecified properties should not penalize scoring, then only the history case properties specified in the query will be normalized in accordance with their ranking and computed as the case is scored. This permits properties to be indicated as "mandatory" for scoring by simply making the relative ranking of the property sufficiently large that the solution case set threshold is not reached without that property being present in the history case. In particular, match scoring in accordance with the invention is performed according to the following formula:

$$MS = qf * \sum_m dnqw + cf * \sum_m dncw; \text{ where}$$

| | |
|---|---|
| $MS$ | is the computed match score for a case; |
| $qf$ | is a query weighting usage factor; |
| $dnqw$ | is a dynamically normalized query weight for a property; |
| $\sum_m dnqw$ | is the sum of the normalized query weight set values where case instance property values match query pattern property values; |
| $cf$ | is a case weighting usage factor; |
| $dncw$ | is a dynamically normalized case weight for a property; |
| $\sum_m dncw$ | is the sum of the normalized case weight values where case instance property values match query pattern property values. |

Each query includes a scaling factor that indicates the relative importance of query weights as compared to case weights as the match scores are calculated. A case usage factor (cf) of 1 and query usage factor (qf) of 0 indicates that query weights are to be ignored. A query usage factor (qf) of 1 where the case usage factor (cf) is 0 indicates that case weights should be ignored. Combinations of values between these extremes permit scaled use of the case and query usage weights and gives users the ability to combine the knowledge of case base developers with their user knowledge of what is important to specific queries. The case factors can be received in an interactive manner from the display and keyboard input devices illustrated in FIG. 8 or can be received as larger data transfers, such as a data file from the direct access storage device or network shown. Similarly, the query factors can be received at the time the query is received.

For each query search, the sum of the query weighting usage factor and the case weighting usage factor will be 1, so that:

$qf+cf=1$.

For each case being scored, the query weighting and case weighting are normalized, so that the sum of all the query weights (and case weights), without regard to matching against case instance property values, will be 1:

$\Sigma dnqw=1$ and $\Sigma dncw=1$.

If desired, the technique described above can be extended so that a different usage factor is received for each property. Such property usage factors provide users with greater control over the relative importance of properties when cases are scored. That is, the user is not forced to accept the decision of the case base developer as to the relative importance of the properties. The property usage factors are employed by multiplying the usage factor for each property by the weight factor for each property. It also should be noted that techniques for matching and scoring multiple value properties can be integrated with the multiple property usage factor described above. In such a circumstance, a property match value is first computed and then is multiplied by the weighting and usage factors to derive the match score.

Dynamic Weighting Examples

EXAMPLE A

The dynamic weighting of case properties and query properties will be better understood with reference to examples of weighting calculations. In the first example that follows, summarized below in the table entitled Example A, a history-only query analysis (case factor=1) is used with a weighting in which there is no penalty associated with either query or case properties that are unspecified. Other examples follow and are discussed in turn, covering cases where unspecified properties are penalized and not penalized, and where the query factor is zero (case factor=1) and non-zero (case factor=0.75).

Example A. Penalize Neither Extra Query Nor Extra Case Properties.

| Query Factor = 0 Query | | | | Case Factor = 1 Cases | | | |
|---|---|---|---|---|---|---|---|
| Prop. | Value | Ranking | ID | Prop. | Value | Ranking | Weight |
| A | Test1 | 1 | 1 | A | Test1 | 1 | .1 |
| B | Test2 | 3 | | B | Test2 | 2 | .2 |
| C | no | 1 | | C | no | 4 | .4 |
| D | yes | 4 | | D | yes | 1 | .1 |
| E | Test3 | 1 | | E | Test3 | 2 | .2 |
| | | | 2 | A | NoTest1 | 1 | .1 |
| | | | | B | Test2 | 5 | .5 |
| | | | | C | no | 2 | .2 |
| | | | | D | no | 2 | .2 |
| | | | 3 | A | Test1 | 2 | .25 |
| | | | | B | Test2 | 2 | .25 |
| | | | | C | no | 1 | .125 |
| | | | | D | yes | 1 | .125 |
| | | | | E | Test3 | 2 | .25 |
| | | | | F | Test4 | 2 | * |
| MS1 = (.1 + .2 + .4 + .1 + .2) | | | | * (1) = | | | 1.0 |
| MS2 = (0 + .5 + .2 + 0) | | | | * (1) = | | | 0.7 |
| MS3 = (.25 + .25 + .125 + .125 + .25) | | | | * (1) = | | | 1.0 |

Example A illustrates dynamic adjustment of case weights so properties specified in the query, but not specified in a history case, will not result in a lower evaluation score for that case. This performance is achieved by ignoring the unspecified properties when the normalized weights are calculated. Note, in particular, the processing for the history case with ID=3. For Case 3, Property F is unspecified. The match score calculated for Case 3, listed at the bottom of Example A, ignores the unspecified value from the calculation. Because only case weights are being used for ranking, no dynamic adjustments are required for the extra query property that is present when compared against Case 2.

EXAMPLE B

The next example, Example B, illustrates a query in which unspecified properties are penalized:

Example B. Penalize Both Extra Query And Extra Case Properties.

Query Factor = 0    Case Factor = 1

| Query | | | | Cases | | | |
|---|---|---|---|---|---|---|---|
| Prop. | Value | Ranking | ID | Prop. | Value | Ranking | Weight |
| A | Test1 | 1 | 1 | A | Test1 | 1 | .1 |
| B | Test2 | 3 | | B | Test2 | 2 | .2 |
| C | no | 1 | | C | no | 4 | .4 |
| D | yes | 4 | | D | yes | 1 | .1 |
| E | Test3 | 1 | | E | Test3 | 2 | .2 |
| | | | 2 | A | NoTest | 1 | .091 |
| | | | | B | Test2 | 5 | .454 |
| | | | | C | no | 2 | .182 |
| | | | | D | no | 2 | .182 |
| | | | | E | * | 1 | .091 |
| | | | 3 | A | Test1 | 2 | .2 |
| | | | | B | Test2 | 2 | .2 |
| | | | | C | no | 1 | .1 |
| | | | | D | yes | 1 | .1 |
| | | | | E | Test3 | 2 | .2 |
| | | | | F | Test4 | 2 | .2 |

MS1 = (.1 + .2 + .4 + .1 + .2)   * (1) =   1.0
MS2 = (0 + .454 + .182 + 0)   * (1) =   0.636
MS3 = (.2 + .2 + .1 + .1 + .2 + 0)   * (1) =   0.8

Example B illustrates dynamic adjustment of case weights so that either properties specified in the query but not defined in a history case, or properties specified in a history case but not in the query, result in a lower evaluation match score. For the case of Example B, this performance is achieved by including the query specified relative ranking for Property E in the dynamic calculation of the weights. Note that, because only case wights are used in the scoring, no adjustment is made to the query weights to allow for the extra property specified in Case 3. Thus, the scoring for Case 3 is effectively penalized for the unspecified property F by treating that property as an unmatched value.

EXAMPLE C

Example C below is an example of the case where no penalty is associated with extra properties in either the query or in history cases:

Example C. Penalize Neither Extra Query Nor Extra Case Properties.

Query Factor = 0.25    Case Factor = 0.75

| Query | | | | Cases | | | |
|---|---|---|---|---|---|---|---|
| Prop. | Value | Ranking | Weight | ID | Prop. | Value | Ranking | Weight |

| | | (1,3) | (2) | | | | | |
| A | Test1 | 1 | .1 .111 | 1 | A | Test1 | 1 | .1 |
| B | Test2 | 3 | .3 .333 | | B | Test2 | 2 | .2 |

Example C. Penalize Neither Extra Query Nor Extra Case Properties.

Query Factor = 0.25    Case Factor = 0.75

| Query | | | | Cases | | | |
|---|---|---|---|---|---|---|---|
| Prop. | Value | Ranking | Weight | ID | Prop. | Value | Ranking | Weight |
| C | no | 1 | .1 .111 | | C | no | 4 | .4 |
| D | yes | 4 | .4 .444 | | D | yes | 1 | .1 |
| E | Test3 | 1 | .1 * | | E | Test3 | 2 | .2 |
| | | | | 2 | A | NoTest | 1 | .1 |
| | | | | | B | Test2 | 5 | .5 |
| | | | | | C | no | 2 | .2 |
| | | | | | D | no | 2 | .2 |
| | | | | 3 | A | Test1 | 2 | .25 |
| | | | | | B | Test2 | 2 | .25 |
| | | | | | C | no | 1 | .125 |
| | | | | | D | yes | 1 | .125 |
| | | | | | E | Test3 | 2 | .25 |
| | | | | | F | Test4 | 2 | * |

MS1 = (.1 + .3 + .1 + .4 + .1)   * (.25) +
      (.1 + .2 + .4 + .1 + .2)   * (.75) =   1.0
M82 = (0 + .333 + .111 + 0 + 0)  * (.25) +
      (0 + .5 + .2 + 0 + 0)      * (.75) =   0.625
MS3 = (.1 + .3 + .1 + .4 + .1)   * (.25) +
      (.25 + .25 + .125 + .125 + .25) * (.75) =   1.0

Example C illustrates dynamic adjustment of case weights so properties specified in the query but not present in a history case does not result in a lower evaluation match score. This performance is achieved ignoring an unspecified property when the normalized weights are calculated. Thus, in Case 3, the unspecified Property F is ignored in the match scoring shown at the bottom of the Example C text. Similarly, because query weights are used for scoring, such weights must be dynamically adjusted when comparing against Case 2 by not including the unspecified Property E in the normalization calculation.

EXAMPLE D

Example D below is the case where a penalty is associated with extra properties in both the query and in a history case:

Example D. Penalize Both Extra Query And Extra Case Properties.

Query Factor = 0.25    Case Factor = 0.75

| Query | | | | Cases | | | |
|---|---|---|---|---|---|---|---|
| Prop. | Value | Ranking | Weight | ID | Prop. | Value | Ranking | Weight |
| | | (1,3) | (2) | | | | | |
| A | Test1 | 1 | .1 .111 | 1 | A | Test1 | 1 | .1 |
| B | Test2 | 3 | .3 .333 | | B | Test2 | 2 | .2 |
| C | no | 1 | .1 .111 | | C | no | 4 | .4 |
| D | yes | 4 | .4 .444 | | D | yes | 1 | .1 |
| E | Test3 | 1 | .1 * | | E | Test3 | 2 | .2 |
| | | | | 2 | A | NoTest | 1 | .1 |
| | | | | | B | Test2 | 5 | .5 |
| | | | | | C | no | 2 | .2 |
| | | | | | D | no | 2 | .2 |
| | | | | 3 | A | Test1 | 2 | .25 |
| | | | | | B | Test2 | 2 | .25 |
| | | | | | C | no | 1 | .125 |
| | | | | | D | yes | .125 | |
| | | | | | E | Test3 | 2 | .25 |
| | | | | | F | Test4 | 2 | * |

MS1 = (.1 + .3 + .1 + .4 + .1)   * (.25) +
      (.1 + .2 + .4 + .1 + .2)   * (.75) =   1.0
MS2 = (0 + .333 + .111 + 0 + 0)  * (.25) +
      (0 + .5 + .2 + 0 + 0)      * (.75) =   0.625

-continued

Example D. Penalize Both Extra Query And Extra Case Properties.

| Query Factor = 0.25 Query | | | Case Factor = 0.75 Cases | | | |
|---|---|---|---|---|---|---|
| Prop. | Value | Ranking Weight | ID | Prop. Value | Ranking | Weight |
| MS3 = | (.1 + .3 + .1 + .4 + .1) (.25 + .25 + .125 + .125 + .25) | | | * (.25) + * (.75) = | | 1.0 |

Example D illustrates dynamic adjustment of case weights so that either properties specified in the query but not defined in a history case, or properties specified in a history case but not in the query, result in a lower evaluation match score. In Example D, this performance is achieved by including the query-specified relative ranking for Property E in the dynamic calculation of the weights for Case 2. It should be noted that, because the query weights are included in the match scoring, the query weights must be adjusted for the extra property in Case 3. This is done by including the case-specified relative ranking for Property F in the dynamic calculation of the weights.

Dynamic Weighting With Delta Factor To Reduce Query Evaluation Time

Dynamic weighting and calculation of match scores can potentially increase the time needed to evaluate a query. Such slowed processing can be minimized if property weight values are retained and if the structure of a present case is checked against previously evaluated cases. If two cases are similar in structure, then the previous property weight values can be used, making it unnecessary to calculate the property weight values again for each case. Alternatively, dynamic weight processing can be made more efficient by calculating a "delta" factor using either the weighting factors or relative ranking data rather than dynamically adjusting the property weighting factors for each match scoring. The delta factor is expressed in terms of ranking values and is defined by:

$$\text{delta factor} = 1 + \frac{\sum(\text{ignored ranking values}) - \sum(\text{additional ranking values})}{\sum(\text{ranking values}) - \sum(\text{ignored ranking values}) + \sum(\text{additional ranking values})}$$

The match score is calculated using the delta factor by first calculating a raw match score without dynamic adjustments (property weights can be pre-calculated at definition time). Next, the calculated raw score is multiplied by the delta factor to adjust for dynamic property weighting. Such an approach avoids the need to recalculate the property weighting factors as each match is scored. If scaled query weighting is also being used, then a delta factor is calculated for both the query and case terms in the final match score. In the preferred embodiment, the ranking values are scalar numbers that specify a relative ranking (that is, 1, 2, 3, . . . ). Alternatively, the ranking values can be raw ranking multiplier data values comprising weight factors. If weight factors are used instead of scalar ranking numbers, then the delta factor is calculated according to the equation above with the ranking terms replaced with weight factors.

EXAMPLE E

The dynamic weight adjustment with delta factor will be better understood with reference to the following examples.

In Example E below, there is no penalty associated with either query or case properties that are unspecified. The delta factor is calculated to have a value of 1.25, as follows:

delta factor=1+[2/(10−2)]=1.25, which is then applied to Case 3 because the property F is ignored. Thus, dynamic weight adjustment increases the evaluation matching score that otherwise would be obtained.

Example E. Delta Factor: Penalize Neither Extra Query Nor Extra Case Properties.

| Query Factor = 0 Query | | | | Case Factor = 1 Cases | | | |
|---|---|---|---|---|---|---|---|
| Prop. | Value | Ranking | ID | Prop. | Value | Ranking | Weight |
| A | Test1 | 1 | 1 | A | Test1 | 1 | .1 |
| B | Test2 | 3 | | B | Test2 | 2 | .2 |
| C | no | 1 | | C | no | 4 | .4 |
| D | yes | 4 | | D | yes | 1 | .1 |
| E | Test3 | 1 | | E | Test3 | 2 | .2 |
| | | | 2 | A | NoTest | 1 | .1 |
| | | | | B | Test2 | 5 | .5 |
| | | | | C | no | 2 | .2 |
| | | | | D | no | 2 | .2 |
| | | | 3 | A | Test1 | 2 | .2 |
| | | | | B | Test2 | 2 | .2 |
| | | | | C | no | 1 | .1 |
| | | | | D | yes | 1 | .1 |
| | | | | E | Test3 | 2 | .2 |
| | | | | F | Test4 | 2 | .2 |
| MS1 = (.1 + .2 + .4 + .1 + .2) | | | | * (1) = | 1.0 | | |
| MS2 = (0 + .5 + .2 + 0) | | | | * (1) = | 0.7 | | |
| MS3 = (.2 + .2 + .1 + .1 + 0) | | | | * (1) = | .8 * (1.25) = 1.0 | | |

EXAMPLE F

In Example F below, a penalty is associated with both query and case properties that are unspecified. The delta factor is calculated to have a value of 0.909, as follows:

delta factor=1+[−1/(10+1)]=0.909, which is then applied to Case 2 because of unspecified properties. Thus, dynamic weight adjustment decreases the evaluation matching score that otherwise would be obtained for Case 2.

Example F. Delta Factor: Penalize Both Extra Query And Extra Case Properties.

| Query Factor = 0 Query | | | | Case Factor = 1 Cases | | | |
|---|---|---|---|---|---|---|---|
| Prop. | Value | Ranking | ID | Prop. | Value | Ranking | Weight |
| A | Test1 | 1 | 1 | A | Test1 | 1 | .1 |
| B | Test2 | 3 | | B | Test2 | 2 | .2 |
| C | no | 1 | | C | no | 4 | .4 |
| D | yes | 4 | | D | yes | 1 | .1 |
| E | Test3 | 1 | | B | Test3 | 2 | .2 |
| | | | 2 | A | NoTest | 1 | .1 |
| | | | | B | Test2 | 5 | .5 |
| | | | | C | no | 2 | .2 |
| | | | | D | no | 2 | .2 |
| | | | 3 | A | Test1 | 2 | .2 |
| | | | | B | Test2 | 2 | .2 |
| | | | | C | no | 1 | .1 |
| | | | | D | yes | 1 | .1 |

-continued

Example F. Delta Factor: Penalize Both Extra Query And Extra Case Properties.

| Query Factor = 0 Query | | | Case Factor = 1 Cases | | | |
|---|---|---|---|---|---|---|
| Prop. | Value | Ranking | ID | Prop. | Value | Ranking | Weight |
| | | | E | Test3 | | 2 | .2 |
| | | | F | Test4 | | 2 | .2 |
| MS1 = (.1 + .2 + .4 + .1 + .2) | | | * | (1) = | 1.0 | | |
| MS2 = (0 + .5 + .2 + 0 + 0) | | | * | (1) = | .7 *(.909) = .636 | | |
| MS3 = (.2 + .2 + .1 + .1 + 0) | | | * | (1) = | .8 | | |

The evaluation time of some queries will be improved with dynamic property weighting, despite the dynamic calculations needed. For example, if cases contain many properties that are not relevant to the search, then matching of these property values can be eliminated by not specifying the properties in the query and indicating that unspecified case properties should not penalize the matching scores (that is the case weighting usage factor is set to 0). This eliminates unnecessary calculating steps and reduces evaluation time. Another approach for eliminating unnecessary matching is to scale the total use of query weights and set the rankings and weight factors for unnecessary properties to 0. This reduces the actual property value matching to only those properties that are necessary to identify the desired candidate cases.

The methods described above in conjunction with the FIG. 13 flow diagram box numbered 200 improve the efficiency of the match scoring step and improve the efficiency of the CBR system constructed in accordance with the invention.

The Object Oriented Implementation of the Preferred Embodiment

The present invention provides an object oriented framework. The operation of the CBR system developed using the framework can be understood with reference to the procedural flow diagrams of FIGS. 9, 10, 11, 12, and 13. Persons skilled in the art, however, will appreciate that the framework objects, their relationships, and their processing also can be precisely and completely described in terms of object oriented programming representations. Therefore, the framework of the preferred embodiment will next be described in terms of category diagrams and object diagrams similar to those described above in conjunction with FIGS. 1 through 7 for the zoo keeper example.

Figure 14:
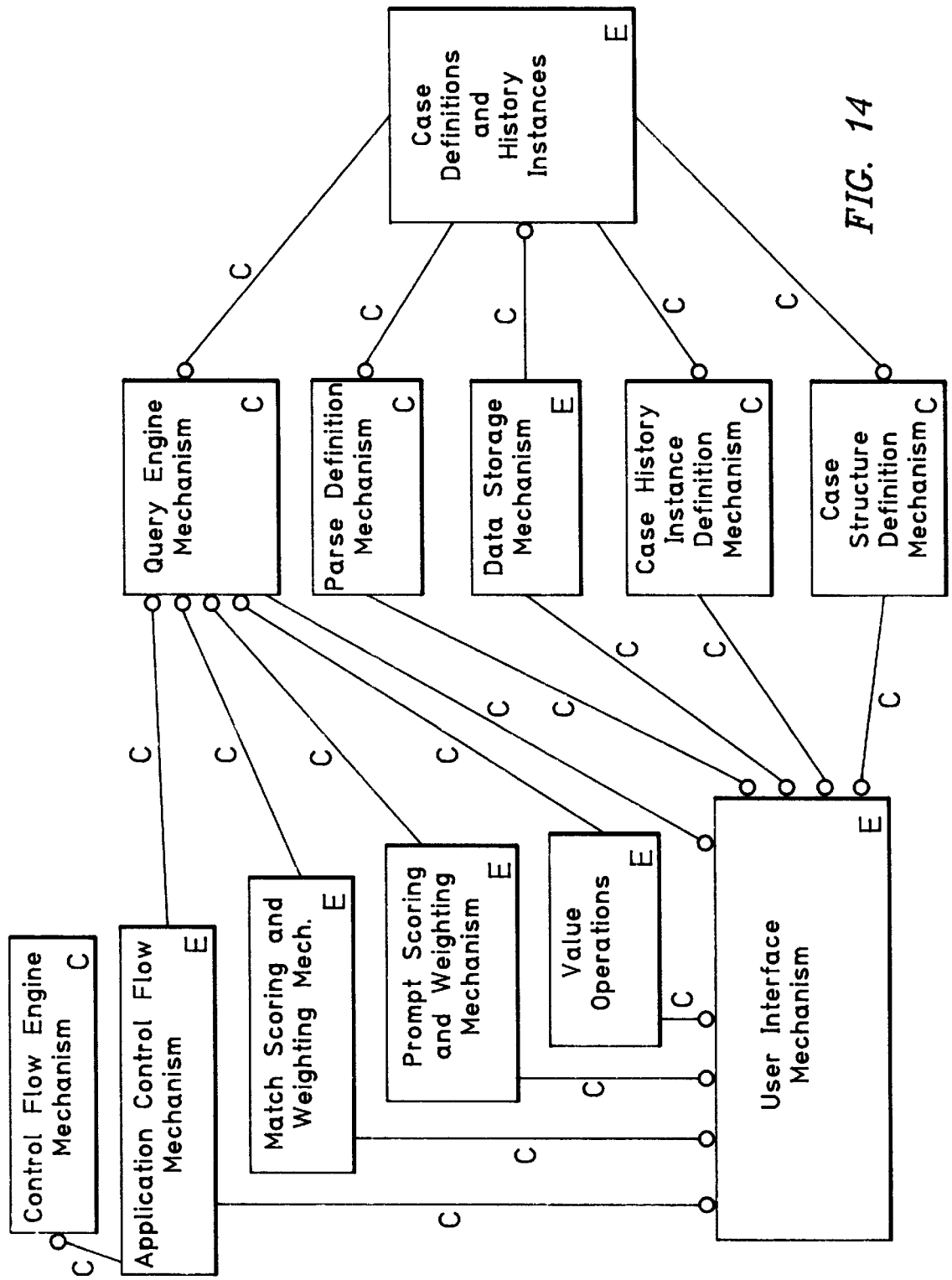
FIG. 14 is a category diagram representation of the framework mechanism of the computer processing system illustrated in FIG. 8.

FIG. 14 is a category diagram for the framework implemented in the computer system of FIG. 8. Those skilled in the art will appreciate that the categories illustrated in FIG. 14 correspond to object oriented programming (OOP) objects that encapsulate data attributes and behaviors, and are stored in the memory 38 illustrated in the block diagram of FIG. 8. Such objects can be implemented, for example, in a computer system operating environment that supports the C++ programming language.

The framework includes five primary components, or mechanisms, that are indicated as being "core" mechanisms and therefore will not change with framework extensions. These core mechanisms are shown as comprising a Query Engine mechanism, a Case Structure Definition mechanism, a Parse Definition mechanism, a Case History Instance Definition mechanism, and a Control Flow Engine mechanism.

The Query Engine mechanism receives the user query and applies it to the case base. The Case Structure Definition mechanism contains the data structure that defines the way in which problem description-solution pairs are recorded. The Parse Definition mechanism contains the parsing rule set for breaking down queries into searchable components. The Case History Instance Definition mechanism contains the problem description-solution pairs that comprise the case base (the case instances), which have a structure specified by the case structure definition. The Control Flow Engine mechanism executes control logic that implements the order of processing desired by a user. That is, the CBR system user can specify an Application Control Flow object to provide a desired order and manner of executing the CBR system, and the Control Flow Engine will see to it that the specified Application Control Flow is implemented.

The framework also includes seven extensible mechanisms. Being extensible, the objects, attributes, and behaviors comprising such mechanisms will be freely modified by the framework user. The extensible mechanisms comprise an Application Control Flow mechanism, a Match Scoring Weighting mechanism, a Property Scoring Weighting mechanism, a Value Operations mechanism, a User Interface mechanism, which also will be referred to generally as the user interface, and a Case Definitions History Instances mechanism.

The Application Control Flow mechanism, as mentioned above, determines how a user can navigate through the CBR system features, in conjunction with execution by the Control Flow Engine. The Match Scoring Weighting mechanism specifies how the Query Engine mechanism will score items recorded in the case base against a received query. The Property Scoring Weighting mechanism interprets the relative importance of properties that will lead to a solution if input by the user. The Value Operations mechanism assigns received object attributes and values to the corresponding data structures. The Case Definitions History Instances mechanism contains the problem description-solution pairs; that is, the case base. This mechanism is extensible because it is populated according to the particular case base being used by the framework user. Finally, the user interface maintains input and output flow to and from the CBR system user.

CBR Session Class

Figure 15:
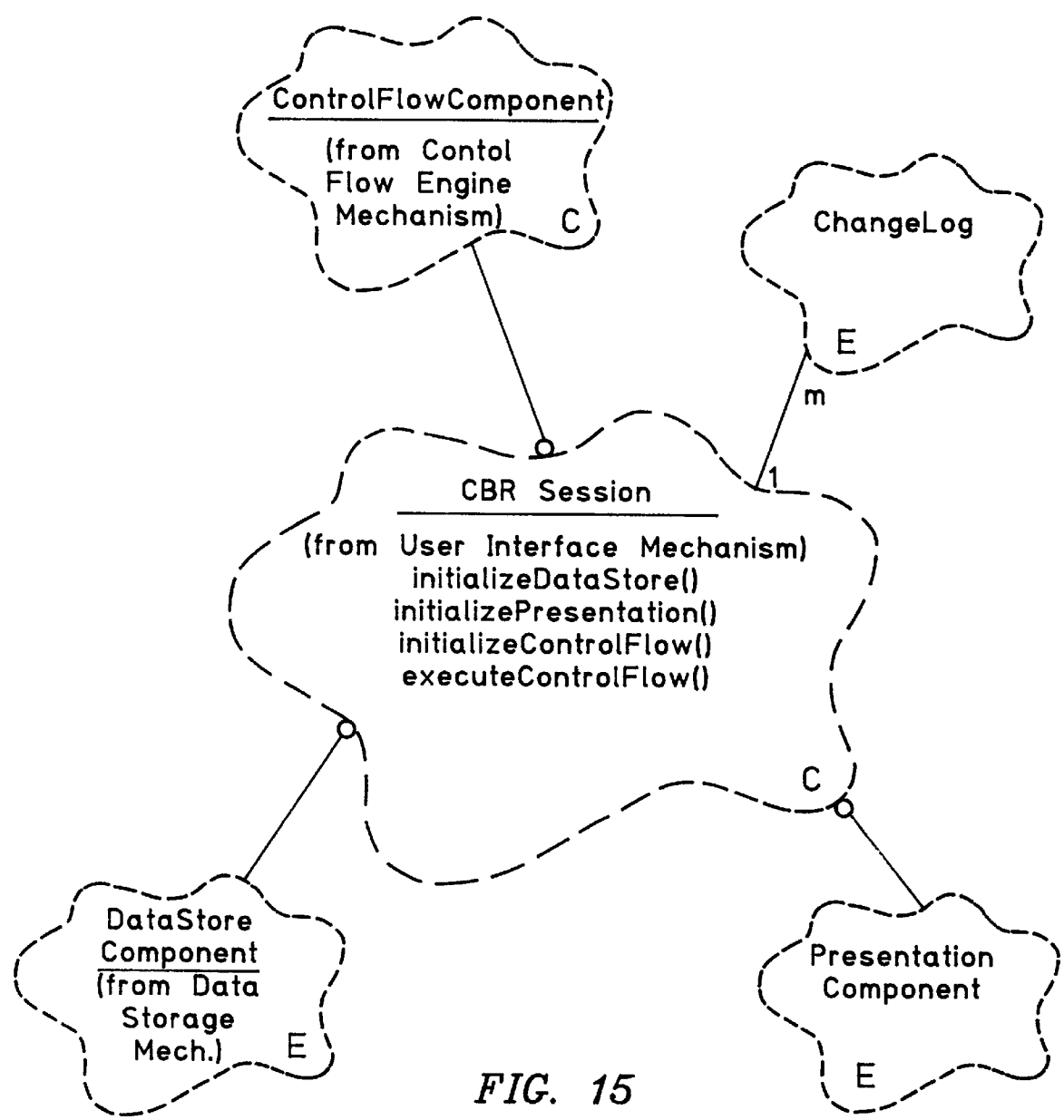
FIG. 15 is a class diagram representation of the CBR Session category implemented by the computer processing system illustrated in FIG. 8.

FIG. 15 is a class diagram that illustrates the characteristics of the class called CBR Session. Each use of the framework causes instantiation of a CBR Session object. The class cloud for CBR Session indicates that it is "from" the User Interface Mechanism, meaning that the CBR Session class is part of the user interface category. The "C" in the class cloud indicates that it is a core class whose objects and object relationships cannot be changed by the user. The class cloud also shows that the CBR Session class includes operations or methods called initializeDataStore( ), initializePresentation( ) initializeControlFlow( ), and execute( ). The method called initializeDataStore( ) instantiates the objects that are necessary for further CBR system processing. The initializePresentation( ) method performs similar functions for the presentation screens that will be displayed to the user. The initializeControlFlow( ) method instantiates the ControlFlowComponent objects necessary for the control flow class, finally, the execute( ) method manages processing for a single CBR Session of the system.

FIG. 15 shows that the CBR Session class has a "uses" relationship with classes called DataStoreComponent, PresentationComponent, and ControlFlowComponent. That is, an object of the CBR Session class uses objects of the data store class, presentation class, and the control flow class. Finally, FIG. 15 shows that the CBR Session class has an association relationship with the ChangeLog class. An association relationship indicates that objects of the ChangeLog class record or track the session-related objects that are modified during the execution of the CBR Session class. The association relationship includes an indication of cardinality, wherein a single CBR Session object will have an association with multiple ChangeLog objects.

CBR Base Class

Figure 16:
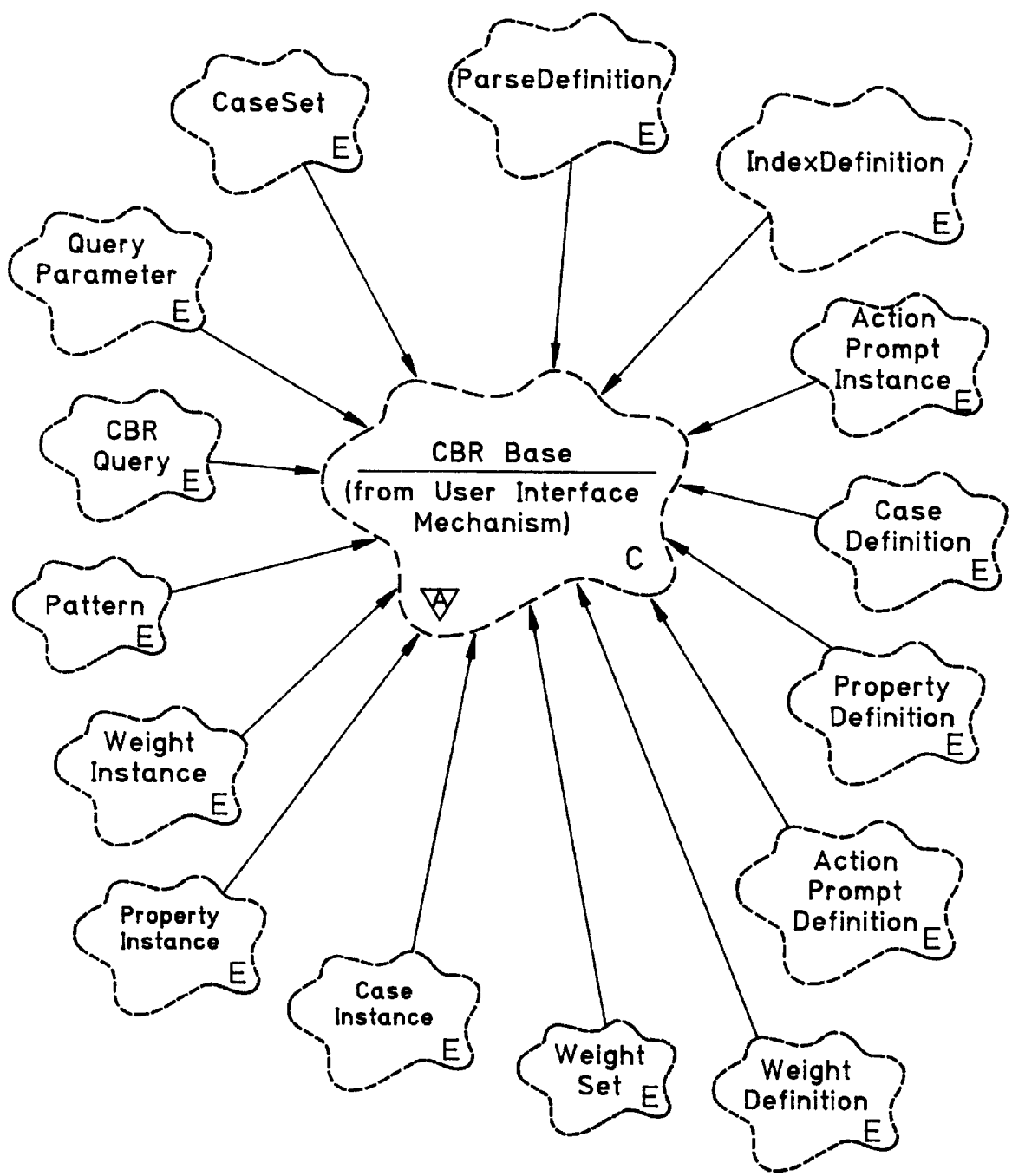
FIG. 16 is a class diagram representation of the CBR Base category implemented by the computer processing system illustrated in FIG. 8.

FIG. 16 shows the object class CBR Base, indicated as being from the User Interface Mechanism, with an inheritance relationship to multiple classes. Thus, the CBR Base objects serve as a super class and thereby define the structure and behavior of the inheriting subclass. The inheriting subclasses can further define their own specific methods or attributes in addition to those specified by the super class. The subclasses illustrated in FIG. 16 include those of CaseSet, QueryParameter, CBRQuery, Pattern, WeightInstance, PropertyInstance, CaseInstance, WeightSet, WeightDefinition, ActionPromptDefinition, PropertyDefinition, CaseDefinition, ActionPromptInstance, IndexDefinition, and ParseDefinition.

Case Structure Definition Classes

Figure 17:
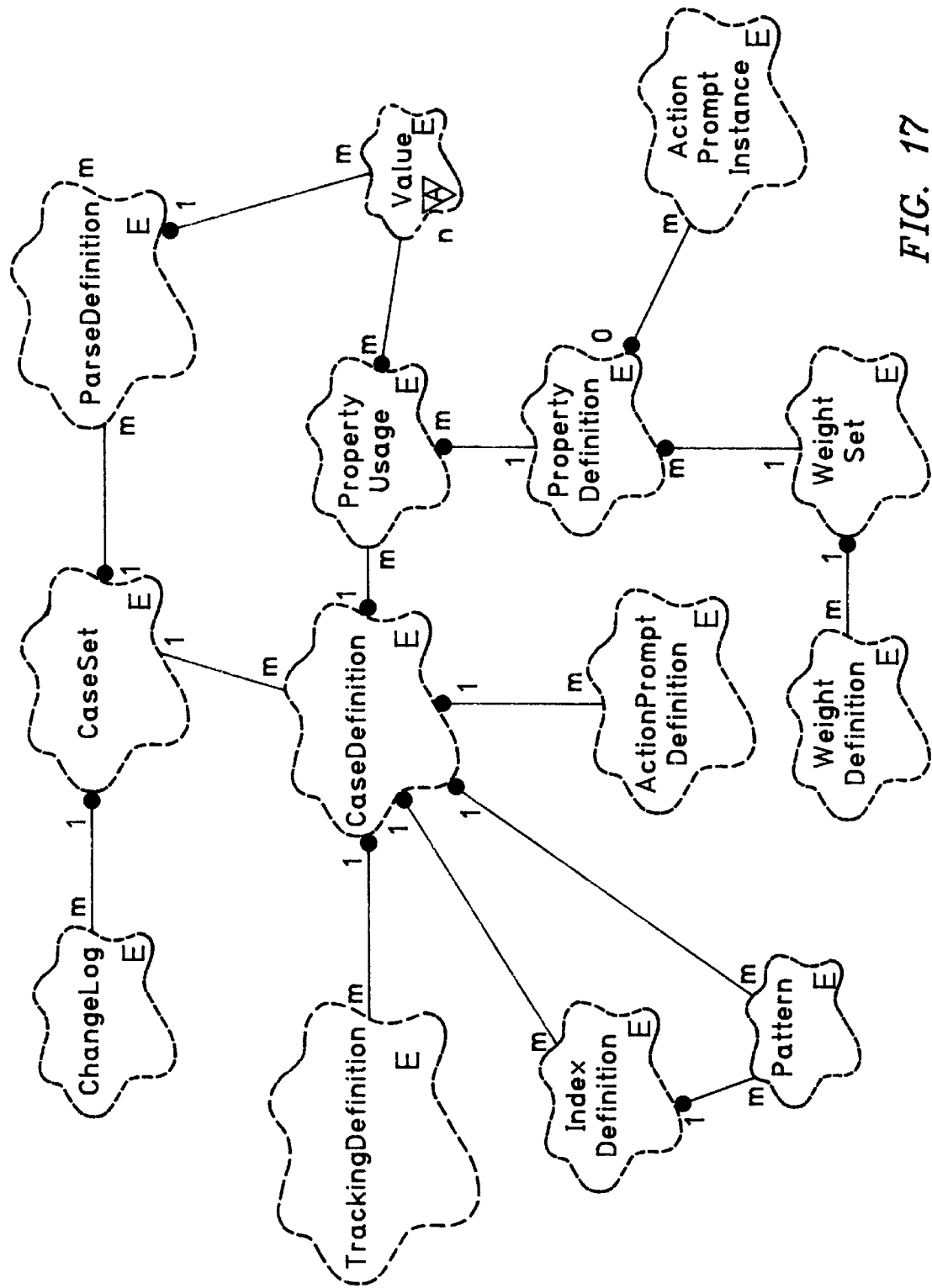
FIG. 17 is a class diagram representation of classes related to a case structure definition for the CBR system as implemented by the computer processing system illustrated in FIG. 8.

FIG. 17 is a class diagram that illustrates the classes related to the case structure definition. The CaseDefinition class is shown having "has" relationships with multiple classes. Thus the CaseDefinition class represents an aggregate class that contains objects from the classes TrackingDefinition, IndexDefinition, Pattern, ActionPromptDefinition, PropertyUsage, and CaseSet. Cardinality is indicated to show that a single CaseDefinition object contains many of the latter objects, with the exception of the CaseSet relationship. Many CaseDefinition objects will be contained in a single CaseSet, or case base, and therefore the cardinality indicated is for multiple CaseDefinition objects and a single CaseSet object. The other class relationships shown in FIG. 17, such as the relationship of Value to Parse Definition and Property Usage classes, will be described below.

Case Definition Methods

Figure 18:
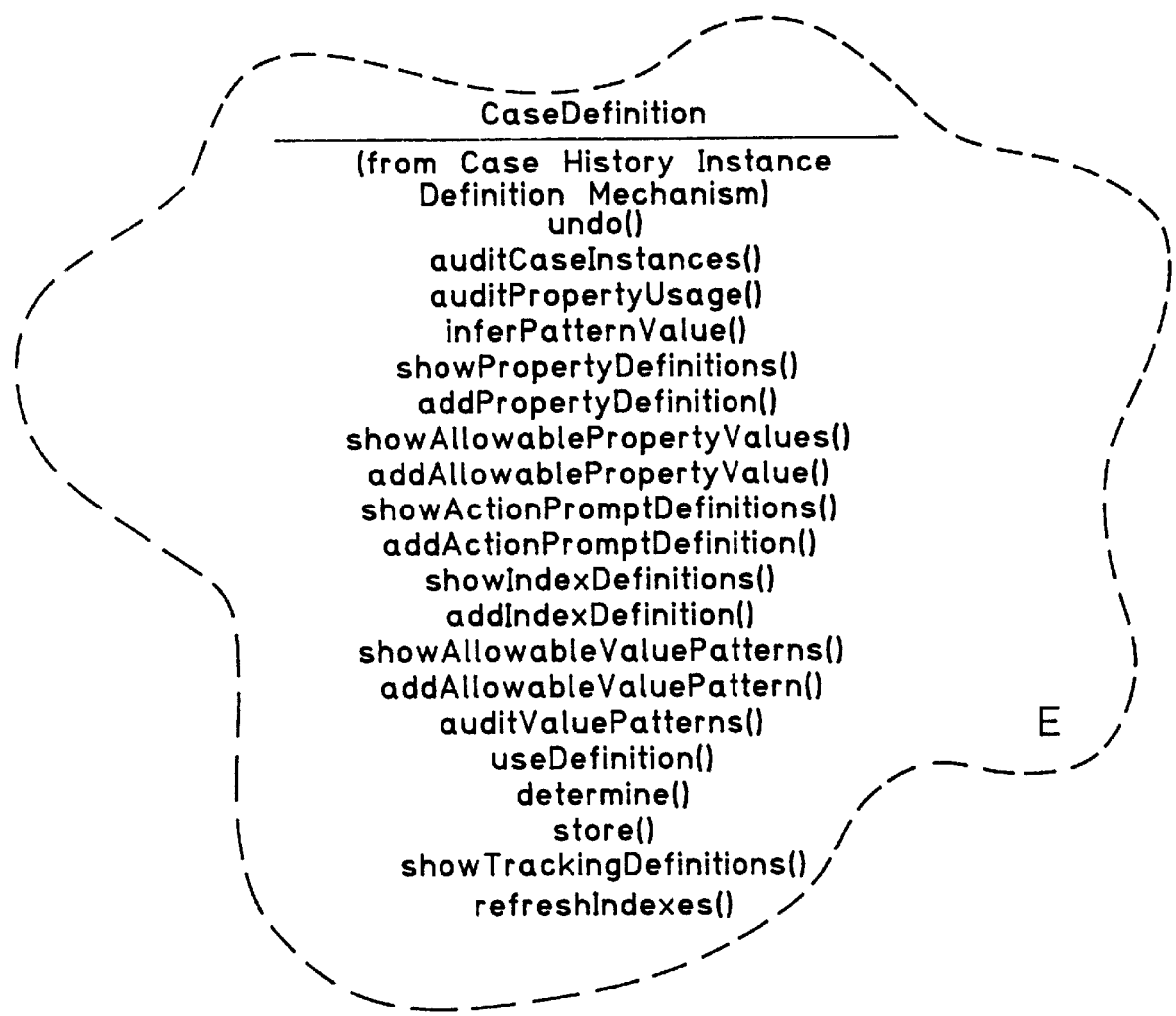
FIG. 18 is a class diagram representation that shows the functions implemented by the CaseDefinition category shown in FIG. 17.

FIG. 18 illustrates the CaseDefinition class in greater detail and shows that it includes many methods. The CaseDefinition class methods include undo( ), which deletes a CaseDefinition or a portion of a CaseDefinition, auditCaseInstances( ), which generates an audit of one or more CaseInstance objects associated with the corresponding CaseDefinition object, and auditPropertyUsage( ), which generates an audit of properties for a CaseInstance object in relation to a CaseDefinition object. The CaseDefinition methods further include inferPatternValue( ), which infers new data to add values to a pattern object based on constraint patterns associated with the definition, showPropertyDefinitions( ), which retrieves and displays PropertyDefinition objects that currently exist either within the corresponding CaseDefinition or within all of the instantiated CaseDefinition objects; and addPropertyDefinition( ), which adds new PropertyDefinition objects associated with a current CaseDefinition.

Other CaseDefinition methods include showAllowablePropertyValues( ), which retrieves and displays allowable PropertyValues for all properties currently existing in a CaseDefinition object or in all of the CaseDefinition objects of a CaseSet class. Additional methods include addAllowablePropertyValue( ), which adds property values to a CaseDefinition, and showActionPromptDefinitions( ), which retrieves and displays ActionPromptDefinitions that exist for a particular CaseDefinition class.

Additional CaseDefinition methods include addActionPromptDefinition( ), which adds new ActionPromptDefinitions associated with a current CaseDefinition class, showIndextDefinitions( ) which retrieves and displays IndexDefinitions, and addIndexDefinition( ), which adds new IndexDefinitions associated with a current CaseDefinition. Other methods are showAllowableValuePatterns( ), which retrieves and displays AllowableValuePatterns that are current for a CaseDefinition, and addAllowableValuePattern( ), which adds a new AllowableValuePattern associated with a current CaseDefinition.

Finally, the CaseDefinition class also includes methods called auditValuePatterns( ), which generates an audit of the property value combinations with respect to allowable patterns for a CaseDefinition, useDefinition( ), which determines the suitability (that is, correctness) of a CaseDefinition, determine( ), which retrieves and shows or displays a list of CaseDefinitions to permit selection of a desired CaseDefinition, store( ), which stores all CaseDefinition objects into the database of the CBR system, showTrackingDefinitions( ), which retrieves and displays tracking definitions to permit user selection, and refreshIndexes( ), which updates indexes when new case objects are added to the case base.

CaseDefinition Related Classes

Figure 19:
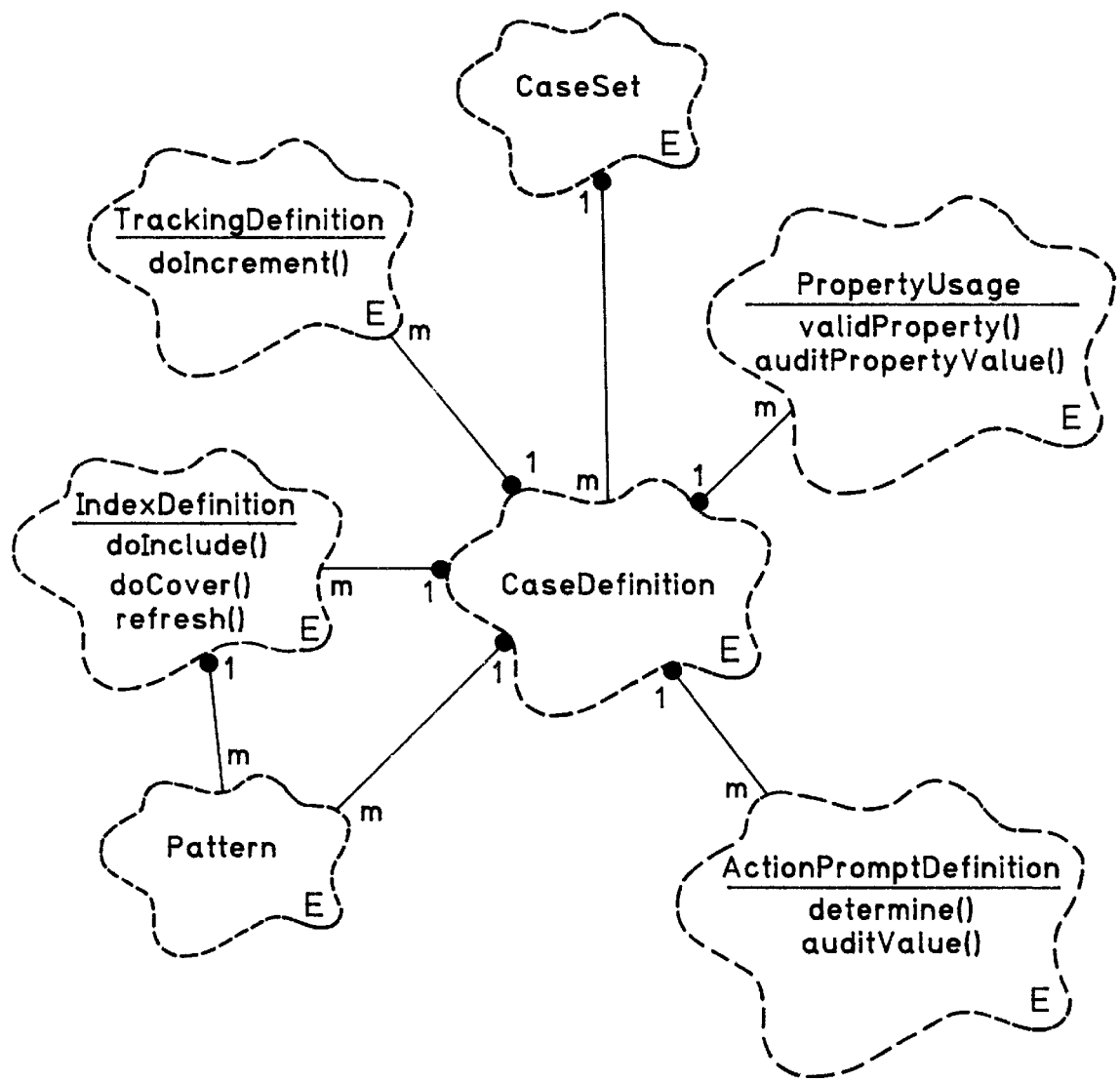
FIG. 19 is a class diagram representation of the CaseDefinition category and related classes implemented by the computer processing system illustrated in FIG. 8.

FIG. 19 shows the objects and methods of the various classes of which the CaseDefinition class is comprised. The PropertyUsage class includes a method called validProperty( ), which ensures that a property selected by a user to be included in a query evaluation is valid for the related CaseDefinition. The PropertyUsage class also includes a method called auditPropertyvalue( ), which ensures that the property value selected for audit is valid for the property in the CaseDefinition. In either case, if the property is not valid (that is, is undefined), then the CBR system user is provided with an error warning through the user interface. Typically, the CBR system user will be alerted by a warning message on a screen display device.

FIG. 19 shows that the TrackingDefinition class includes a method called doIncrement( ). This method increments a count that indicates when a specified condition is satisfied. That is, a particular CaseInstance property might be the subject of a tracking definition so that every CaseInstance object having the specified property being tracked results in the TrackingDefinition object count being incremented.

Another class shown in FIG. 19 is IndexDefinition, which includes a method called doInclude( ). The doInclude( ) method determines if a property should be included in an Index. Another IndexDefinition method is called DoCover( ), which determines if an IndexDefinition will be useful by containing the output of the doInclude( ) method if a property is indicated as to be included. The last IndexDefinition method is called refresh( ), which updates a case definition index when new indexes are added to a CaseDefinition object.

FIG. 19 also shows the ActionPromptDefinition class having methods called determine( ) and auditValue( ). The determine( ) method shows the user the action prompts that have been defined. Action prompts are specified by a user to initiate system actions desired by the user. The auditValue( ) method compares an ActionPromptInstance object against the set of ActionPromptDefinition objects for the CaseDefinition and confirms their validity.

Property Definition Class and Related Methods

Figure 20:
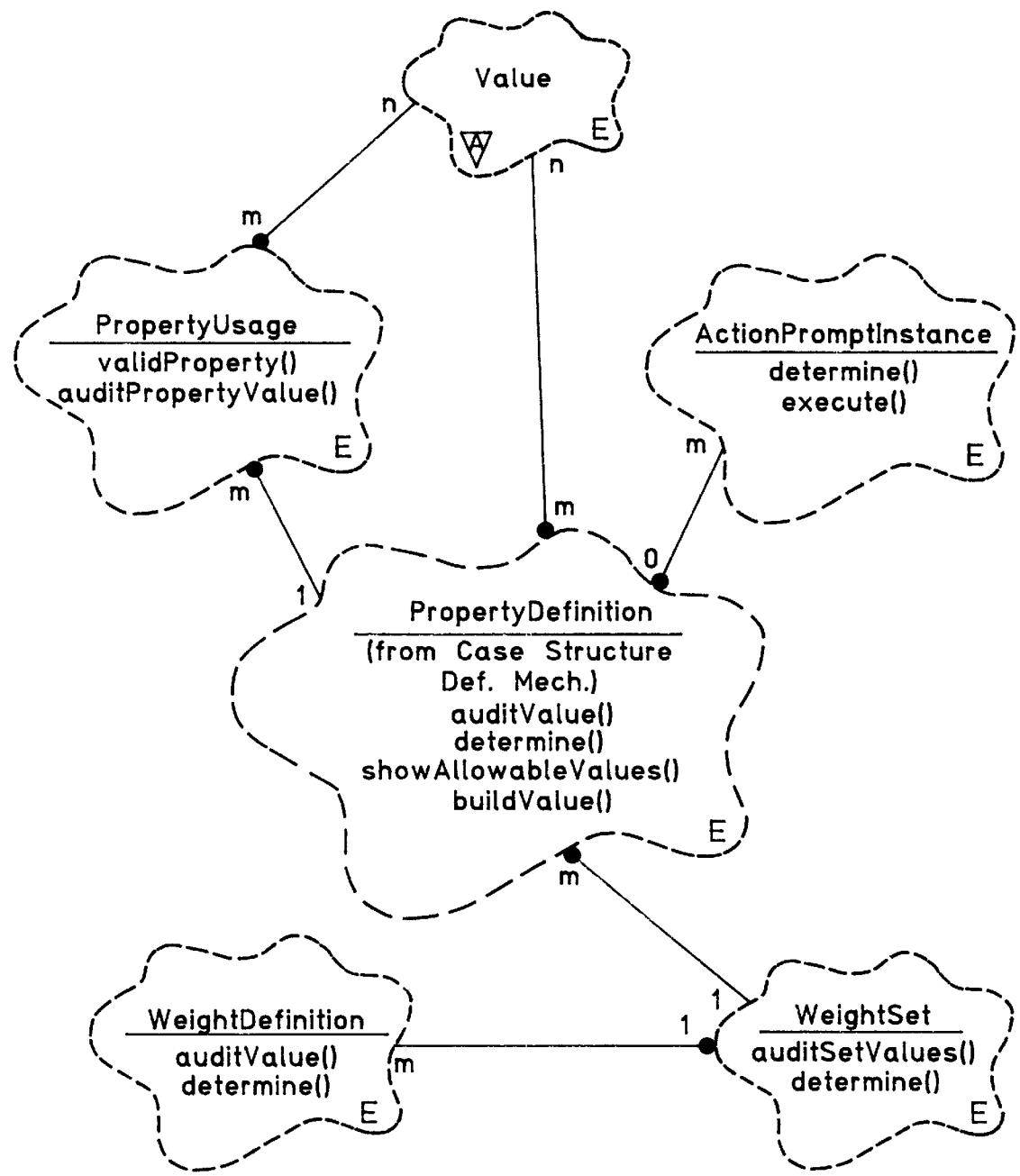
FIG. 20 is a class diagram representation of the PropertyDefinition category and related classes implemented by the computer processing system illustrated in FIG. 8.

FIG. 20 shows the methods of the various objects related to the PropertyDefinition class. FIG. 20 shows that the PropertyDefinition class is an aggregate class made up of members comprising a class called Value, a class called ActionPromptInstance and a class called WeightSet. The WeightSet class in turn is shown being an aggregate class made-up of WeightDefinition class members. The relationships are further specified by the indicated cardinality relationships.

The PropertyUsage class is shown in FIG. 20 having a "has" relationship with a class called Value and the PropertylDefinition class. The Value class is indicated as being an abstract base class by the upper-case block "A" within a triangle. An abstract class is a class for which no instances may be created, the abstract class being a class of classes. The aggregate relationship illustrated in FIG. 20 for the PropertyUsage class indicates that the PropertyUsage class comprises an aggregate class that is made up of Value classes and PropertyDefinition classes. The relationships shown in FIG. 20 are further specified by the cardinality provisions indicated.

FIG. 20 further shows that the ActionPromptInstance class includes two methods, one called determine( ), which retrieves and shows to the user a list of ActionPromptInstances to permit selection by the user of a desired ActionPromptInstance, and execute( ), which verifies a user's prompt level approval and executes the associated action that was prompted according to the type and selection parameter received from the user. FIG. 20 also shows that the PropertyDefinition class includes methods called auditValue( ), determine( ), showAllowableValues( ), and buildValue( ). The auditValue( ) method generates an audit of the input value received against the allowable values for the associated PropertyDefinition. The determine( ) method checks a Value specified by a user against the list of allowable Values for the PropertyDefinition and provides an error indication if an invalid selection is made by the user. The showAllowableValues( ) method displays to the user the Value objects that can be assumed by the PropertyDefinition. The buildValue( ) method is the means by which the user can add to, delete, or otherwise change the Values that can be assumed by the PropertyDefinition.

FIG. 20 shows that the WeightDefinition class also includes an auditValue( ) method, which performs a function for the WeightDefinition similar to that performed by the auditValue( ) method for the PropertyDefinition, and determine( ), which performs a function for WeightDefinition similar to that performed by the determines method for the PropertyDefinition. Finally, the WeightSet class is shown in FIG. 20 as having an auditSetValues( ) method, which generates an audit of an input value or values against the allowable values for the associated defined WeightDefinition in the WeightSet corresponding to the PropertyDefinition.

CaseSet Class and Related Methods

Figure 21:
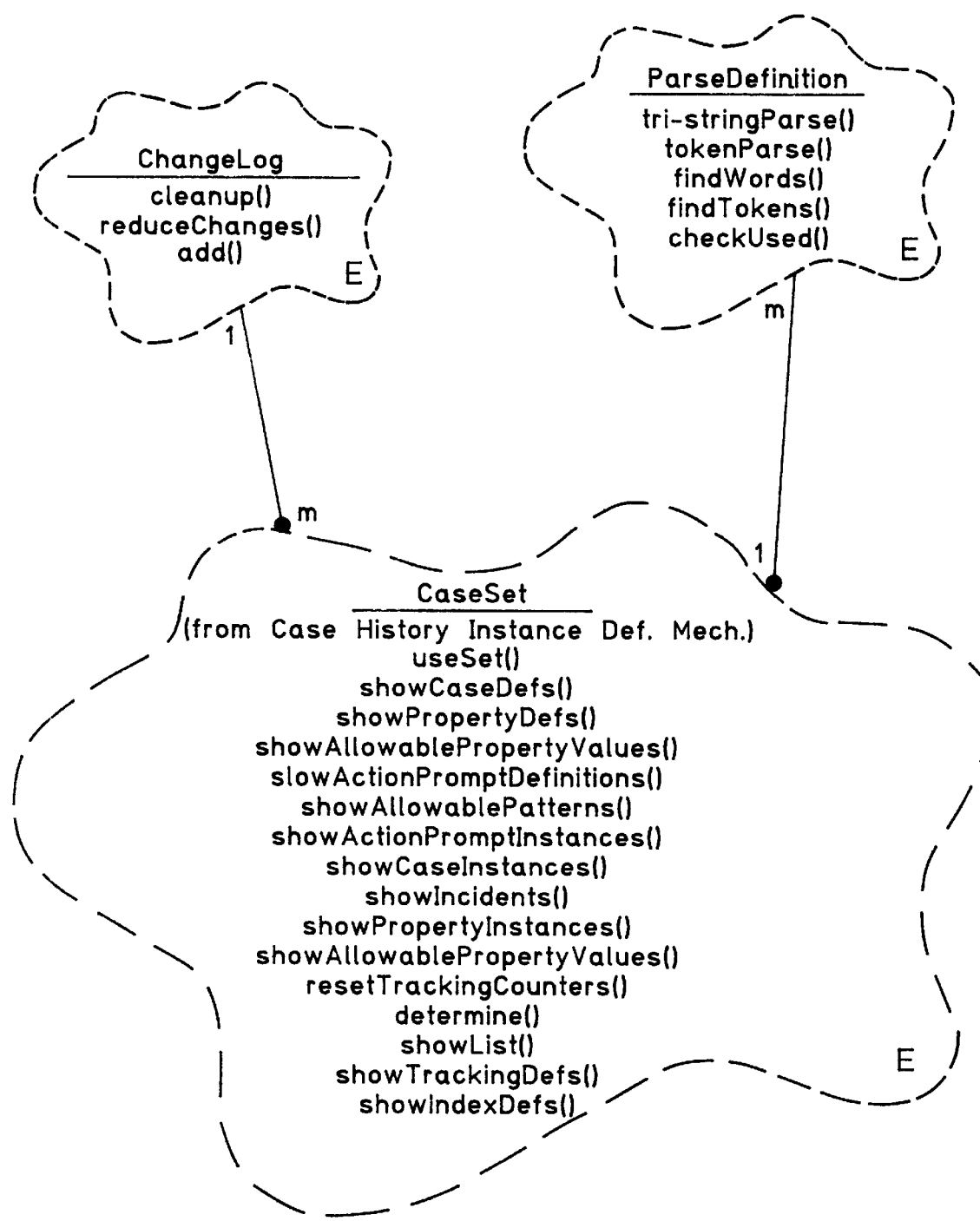
FIG. 21 is a class diagram representation of the CaseSet category and related classes implemented by the computer processing system illustrated in FIG. 8.

FIG. 21 is a class diagram that illustrates the objects that make up the CaseSet class of the framework. FIG. 21 shows that the CaseSet class is an aggregate class having members from the ChangeLog class and the ParseDefinition class. The CaseSet class partitions case definitions, instances, and queries into sets and permits retention of information common to the group. To perform these functions, the CaseSet class includes a number of "show" methods that result in the retrieval and display of named attributes for associated CaseDefinition objects. These show methods include showCaseDefs( ), which retrieves and displays the case definition objects that currently exist within the associated CaseSet, and showPropertyDefs( ), which retrieves and displays property definitions that currently exist with all of the CaseDefinitions for the associated CaseSet.

Other CaseSet "show" methods are called showAllowablePropertyValues( ), showActionPromptDefinitions( ), showIncidents( ), showAllowablePatterns( ), showActioPromptInstances( ), showCaseInstances( ), showPropertyInstances( ), ShowAllowablePropertyValues( ), showTrackingDefs( ), showIndexDefs( ), and showlist( ). Each of these "show" methods results in the retrieval and display of the named CaseDefinition attributes.

Another CaseSet method is called useSet( ), which calculates the suitability of a particular CaseSet for a current incident or query. The CaseSet class also includes a method called resetTrackingCounters( ), which resets or initializes counters that indicate case set processing, and determine( ), which retrieves all CaseSet instances for the CaseDefinition being processed.

FIG. 21 also shows the ChangeLog class, which includes methods called cleanup( ), reduceChanges( ), and add( ). The ChangeLog class records changes that have been made to either transitory or persistent class data. The ChangeLog is used for audit trail, failure recovery, and "undo" of edit operations. The cleanup( ) method maintains a ChangeLog for a selected CaseSet based log retention attributes, which typically will be set by the framework designer. The reduceChanges( ) method reduces a set of ChangeLog entries that are retrieved from a trace of all the steps taken for a particular CaseSet through last previously taken step, identified for writing into the ChangeLog class. This step occurs at the end of the CBR session. The add( ) method creates an instantiation of the ChangeLog class.

FIG. 21 also shows the ParseDefinition class, which records the data needed for parsing of case descriptions using the tri-string and token parsing methods. The ParseDefinition class includes methods called tri-stringParse( ), tokenParse( ), findWords( ), findTokens( ), and checkUsed( ). The tri-stringParse( ) method parses the associated text into all permutations of three character groups. The tokenParse( ) method locates and identifies words as tokens in the CBR data base, that is, the tokenParse( ) method replaces a string of words with tokens. The findWords( ) method of the ParseDefinition class finds all words associated with a particular token, the findTokens( ) method locates tokens for all words resulting from a token parse, and the checkUsed( ) method checks to determine where a token has been applied within a case description. With these ParseDefinition methods, tokens can be used to equate synonyms or to translate words into other languages.

Case History Instance and Related Classes

Figure 22:
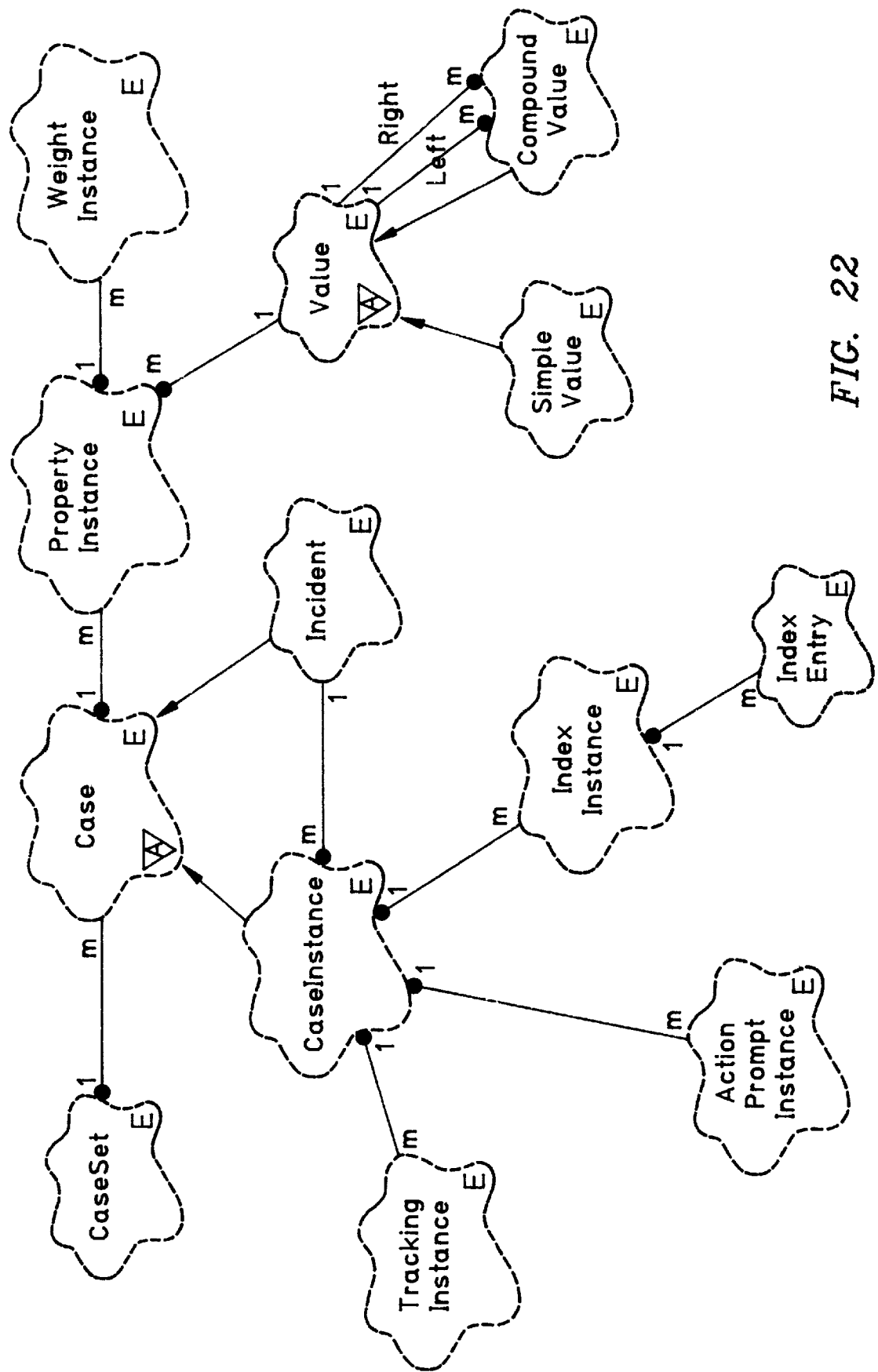
FIG. 22 is a class diagram representation of classes related to a case history instance as implemented by the computer processing system illustrated in FIG. 8.

FIG. 22 is a class diagram that illustrates the classes related to the CaseInstance class that contains objects related to the case history instance definition. The CaseInstance class is shown having "has" relationships with multiple classes. Thus, the CaseInstance class represents an aggregate class that contains objects from the classes called TrackingInstance, ActionPromptInstance, and IndexInstance. FIG. 22 shows that a CaseSet is comprised of Case objects, whose structure and attributes are specified by CaseInstance objects and Incident objects. FIG. 22 further shows that a Case is made up of many PropertyInstance objects, which in turn are an aggregate of WeightInstance objects and Value objects. Finally, FIG. 22 shows that the Value class is made up of SimpleValue objects and CompoundValue objects.

Figure 23:
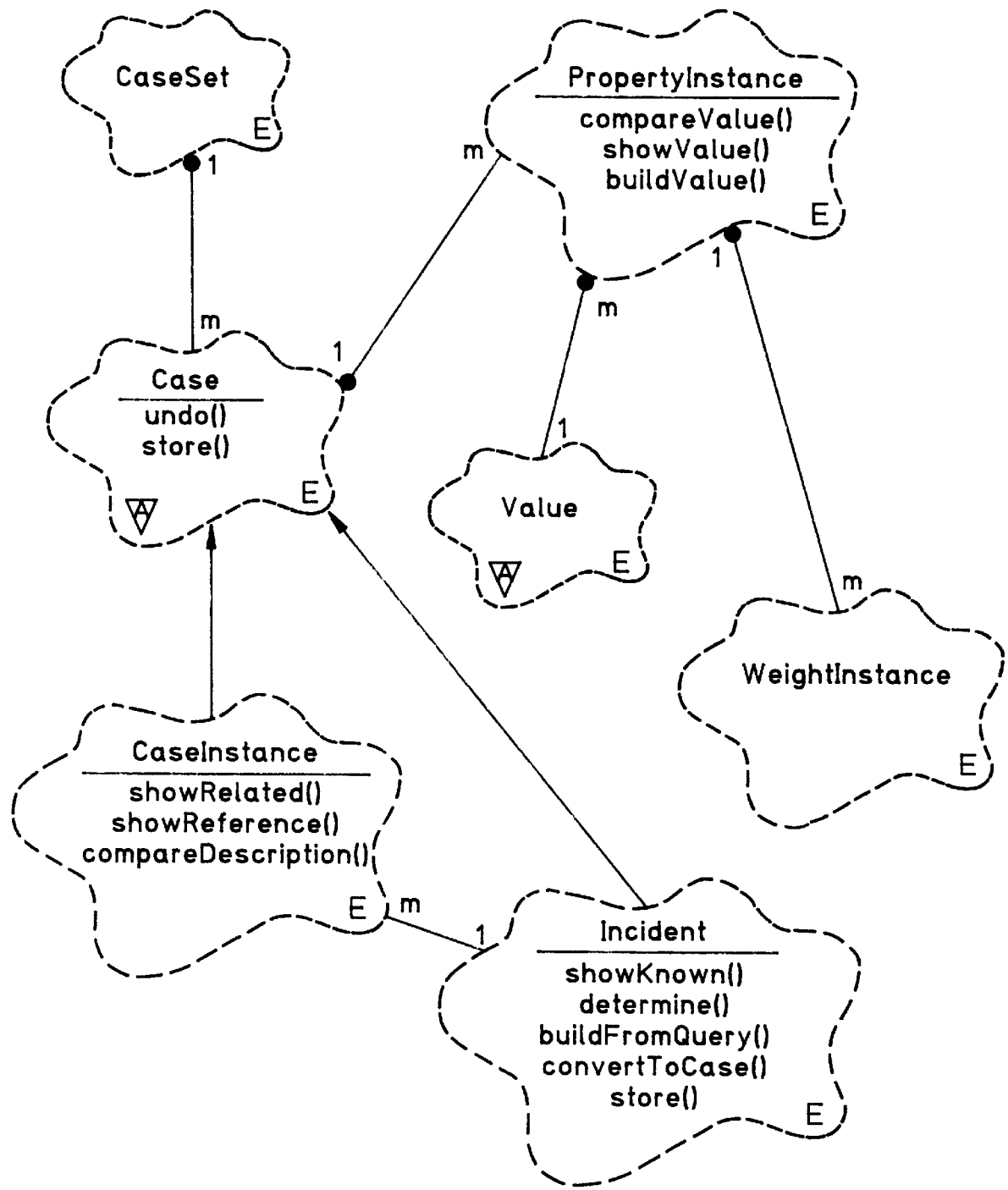

FIG. 23 is a class diagram that illustrates the Case class and related objects and their methods. FIG. 23 shows that the Case class includes two methods, called undo( ) and store( ). The Case class is indicated as an abstract base class, which again means that no instantiations of this class will exist. The Case class provides the common base for CaseInstances, which are the data that are examined by queries, or for incidences, which are recorded but are not fully populated for examination by queries. The Case class is illustrated as having multiple PropertyInstance classes. The CaseSet is comprised of many Case classes. FIG. 23 also shows that the classes called CaseInstance and Incident inherit from the Case class and therefore their structure and behavior must conform to that specified by the Case class. The undo( ) method of the Case class is an undo of the last set of changes received from the framework user. The store( ) method stores all CaseInstance or Incident objects into the CBR data base.

The CaseInstance contains a history case or problem description-solution. If a CaseInstance object is active, meaning that it has been instantiated, then it can be returned in response to a query. The CaseInstance, because it inherits from the Case, must conform to the structure and rules of the associated CaseDefinition. The methods of the CaseInstance are described further below in relation to the FIG. 25 description. The Incident class records a set of property values that have not yet been formalized into a history case. The information in an Incident is not available via a query. The showKnown( ) method of the Incident class finds and displays CaseInstances that refer to the associated incident. The determine( )method retrieves and displays incidents. The buildFromQuery( ) method builds an incident by transforming query data, the convertToCase( ) builds a case from properties and data that are contained in the associated Incident, and the store( ) method stores all Incident objects into the CBR data base.

The PropertyInstance class is an instance of a property that is associated with a CaseInstance object. The structure and behavior of the PropertyInstance objects conform to the PropertyDefinition of the CBR base (see FIG. 16). FIG. 23 shows that the PropertyInstance class has a method called compareValue( ), which compares a property input to the collection of stored cases in the CBR data base. The showValue( ) method retrieves and displays a property value and the buildValue( ) method assembles a PropertyInstance value structure and associates it with the property collection class. Finally, the PropertyInstance class includes a determine( ) method that retrieves and shows a list of PropertyInstances from which the user will make a selection. FIG. 23 shows that the PropertyInstance class includes objects of a WeightInstance class and of a Value class, the latter comprising an abstract base class.

Figure 24:
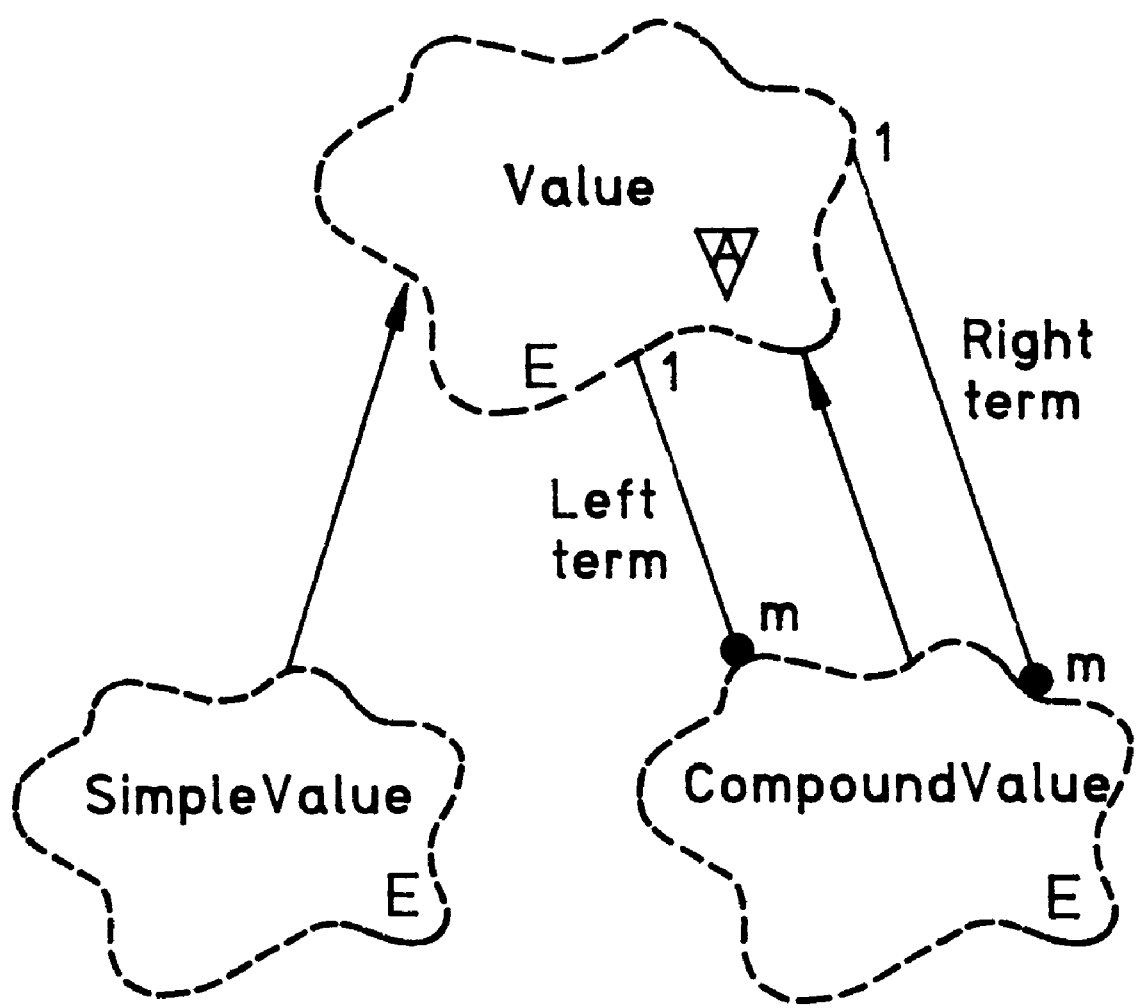
FIG. 24 is a class diagram representation of the Value category and related classes implemented by the computer processing system illustrated in FIG. 8.

FIG. 24 illustrates the object structure of the Value class. The Value class, as noted above, is an abstract base class and provides a common base for SimpleValues and Boolean combinations of Values. The SimpleValue class is a collection of objects that simply contain data values, which also can comprise text from a problem description-solution pair or query. The CompoundValue class is a collection of objects that groups SimpleValues into Boolean combinations of SimpleValues or other CompoundValues. The CompoundValue class, for example, can implement Boolean operations such as AND, OR, and exclusive-or (XOR). Thus, the CompoundValue includes a collection of left terms and right terms, as indicated in FIG. 24, which are joined by the particular Boolean operator.

Property, Tracking, Index, and Action Prompt Definition Methods

Figure 25:
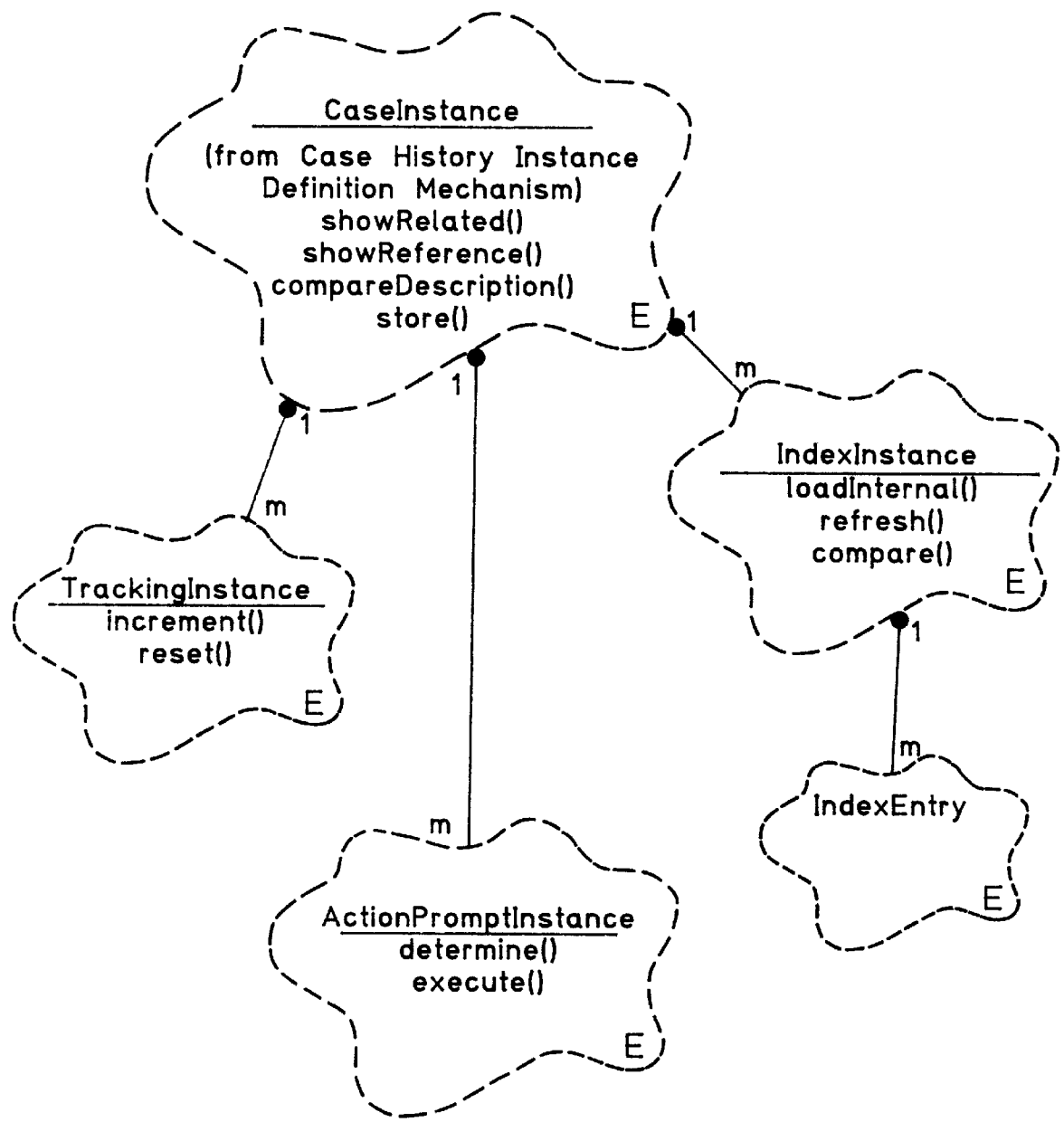
FIG. 25 is a class diagram representation of the CaseInstance category and related classes implemented by the computer processing system illustrated in FIG. 8.

FIG. 25 illustrates the objects that make up the case instance class of the framework and related classes. FIG. 25 shows the CaseInstance class with a "has" relationship to the classes called TrackingInstance, ActionPromptInstance, and IndexInstance. The CaseInstance class is shown having methods called showRelated( ), which retrieves and displays related cases, showReference( ), which retrieves and displays referenced incident objects, compareDescription( ), which compares a received description against descriptions in the case base, and store( ), which stores all case instance objects associated with the class into the data base of the CBR system. The ActionPromptInstance class methods called determine( ) and executes were defined previously in the discussion for FIG. 20.

FIG. 25 shows the IndexInstance class with a "has" relationship to the IndexEntry class. The IndexEntry class contains the actual data, or attributes, comprising the index instances. The IndexInstance class of objects includes methods called loadInternal( ), which loads index entries into the CBR system data base, refresh( ), which updates and maintains IndexInstance objects, and compare( ), which matches patterns against index entries and returns identifiers of partially matching CaseInstance objects. Finally, the TrackingInstance class includes methods called increments( ), which increments counters that are associated with a CaseInstance object to indicate comparison conditions such as when a score is greater than a threshold value or when a case is selected for use in a query. The other method of the TrackingInstance class is called reset( ), which initializes particular counters to zero.

Case Query Classes and Methods

Figure 26:
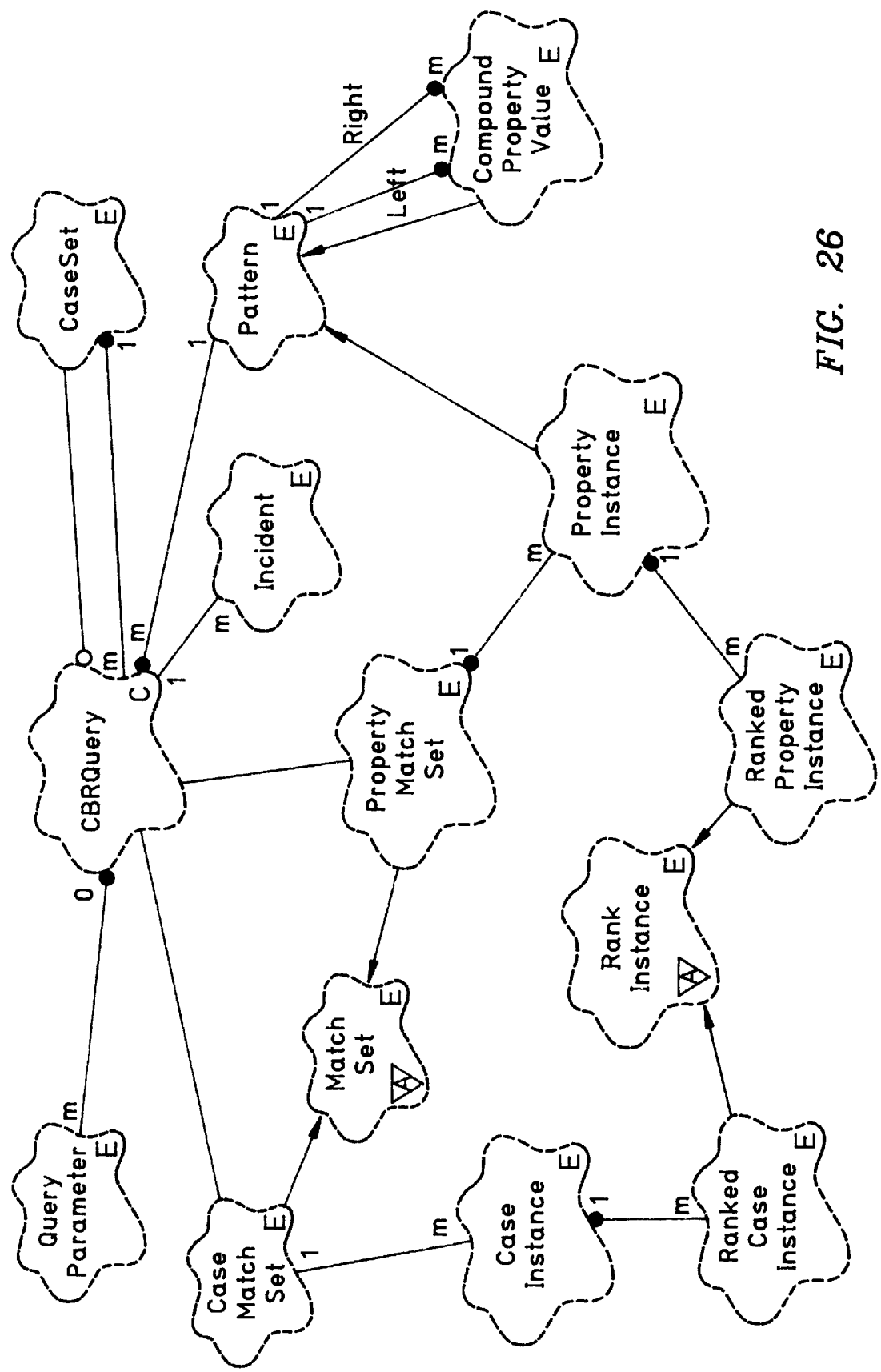
FIG. 26 is a class diagram representation of classes related to a case query as implemented by the computer processing system illustrated in FIG. 8.

FIG. 26 is a class diagram that illustrates the classes related to the case query classes. FIG. 26 shows a CBRQuery class being related to classes called CaseMatchSet, PropertyMatchSet, Incident, and CaseSet. FIG. 26 also shows the CBRQuery class with a "has" relationship to the QueryParameter class and the Pattern class. The classes of RankedCaseInstance and PropertyRankedInstance are shown related to the RankInstance class, and these ranked instance classes are shown related to the CaseInstance and PropertyInstance classes, respectively. The PropertyInstance class is, in turn, related to the PropertyMatchSet class, which, along with the CaseMatchSet, is related to the CBRQuery class.

In particular. FIG. 26 shows that the CaseMatchSet and PropertyMatchSet classes inherit from the MatchSet class, and therefore their structure and behavior conform to the specifications of the MatchSet. That is, the MatchSet class is an abstract base class that serves as a template for CaseMatchSet and PropertyMatchSet objects. Similarly, the CaseRank class and RankedPropertyInstance class inherit from the RankInstance class, which is an abstract base class, and therefore their structure and behavior conform to the RankInstance class. The RankInstance class includes no methods but contains several attributes. The rank attribute is calculated to indicate how closely a CaseInstance matches a query pattern or to determine which unknown property values would most increase the rank score. The rank type indicates the ranking algorithm to use, and the status indicates a status for a CaseInstance. Examples of a case status include matched or examined, which indicate a case match or a case being examined, respectively. The CaseInstance and PropertyInstance classes were previously described in conjunction with FIG. 23.

Figure 27:
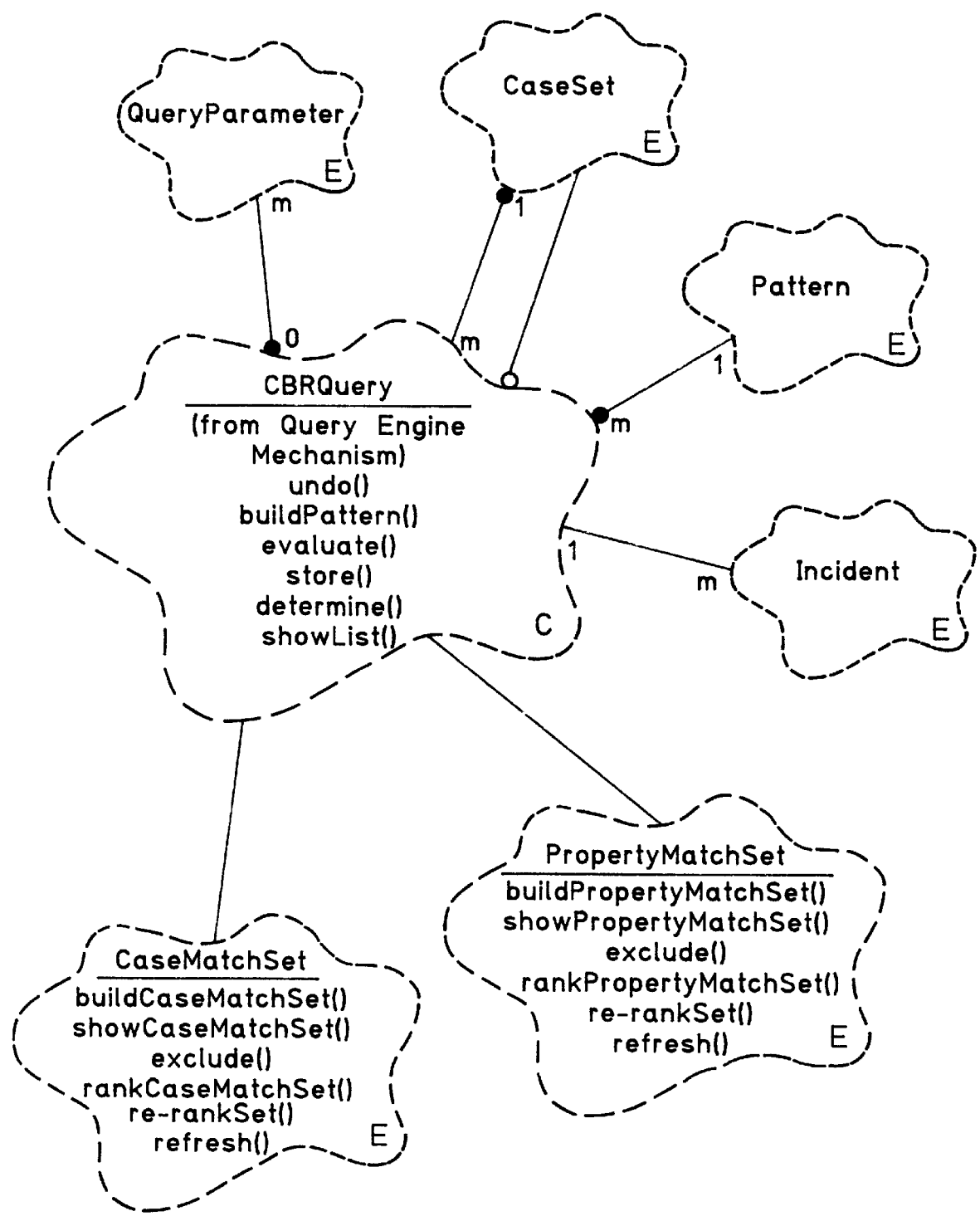
FIG. 27 is a class diagram representation of the CBRQuery category and related classes implemented by the computer processing system illustrated in FIG. 8.

FIG. 27 illustrates the object relationships and behaviors of the CBRQuery class. The CBRQuery class groups a set of information that is needed to search history cases (case instance descriptions) from the CBR data base. The CBR class may include multiple QueryParameter objects and pattern objects. The CBRQuery class has a dual relationship with the CaseSet class. A CaseSet includes multiple CBRQuery objects while a CBRQuery object uses the CaseSet class in a client-supplier relationship. The CBRQuery class has simple association relationships with the classes called Incident, PropertyMatchSet, and CaseMatchSet.

The CBRQuery method called undo( ) reverses the last received operation performed as part of building the query. The CBRQuery method called BuildPattern( ) assembles a search pattern for a query and the method called evaluate( ) searches the case histories for matches to a query pattern. The store( ) method stores all CBRQuery objects into the CBR data base, the determine( ) method retrieves and displays to the user the stored CBRQueries so one can be selected, and the showList( ) method displays a list of the stored CBRQueries.

The CaseMatchSet class is an execution time collection class that hold information while a query is being processed. The buildCaseMatchSet( ) method of the CaseMatchSet builds a set of ranked CaseInstances, the showCaseMatchSet( ) method shows a set of ranked CaseInstances, and the exclude( ) method permits the framework user to remove a case or property instance from the CaseMatchSet. The rankCaseMatchSet( ) method of the CaseMatchSet calculates an initial rank score using both the description text and the received pattern, and the re-rankSet( ) method selects records from a matched set based on additional information in the pattern and then calculates a rank score using both the description text and the pattern. Finally, the refresh( ) method rebuilds a CaseMatchSet based on changes to a Pattern that require different cases from the case base.

The PropertyMatchSet includes methods called buildPropertyMatchSet( ), which builds a set of ranked property instances, and showPropertyMatchSet( ), which shows a set of ranked property instances. The excludes method permits a user to remove a property from further consideration, the rankPropertyMatchSet( ) method calculates an initial rank score using both the description text and pattern, and the re-rankSet( ) method selects records from the property match set based on additional information in a pattern and calculates a new rank score using both description text and pattern. The refresh( ) method of the PropertyMatchSet rebuilds a PropertyMatchSet based on the changes to the pattern that require different cases from the case data base.

Figure 28:
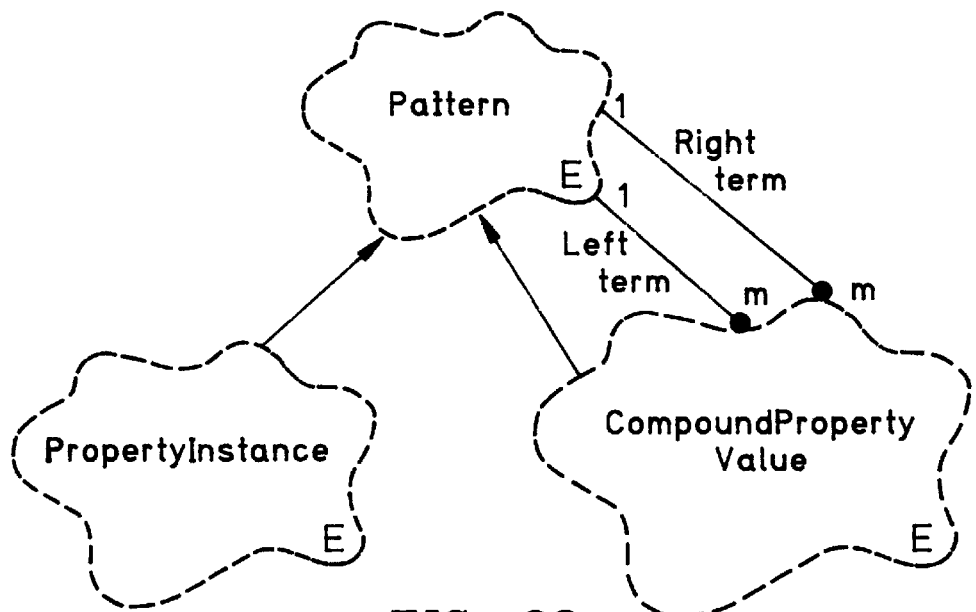
FIG. 28 is a class diagram representation of the Pattern category and related classes implemented by the computer processing system illustrated in FIG. 8.

FIG. 28 illustrates that the PropertyInstance and CompoundPropertyValue classes inherit from the Pattern class and therefore the Pattern class serves to define respective property value patterns. That is, the structure and behavior of the PropertyInstance and CompoundPropertyValue objects conform to the specifications of the Pattern class. The CompoundPropertyValue class contains property-value pairs joined by Boolean operators. The Boolean operators can comprise, for example, the AND), OR, and XOR operations.

Data Store and Control Flow

Figure 29:
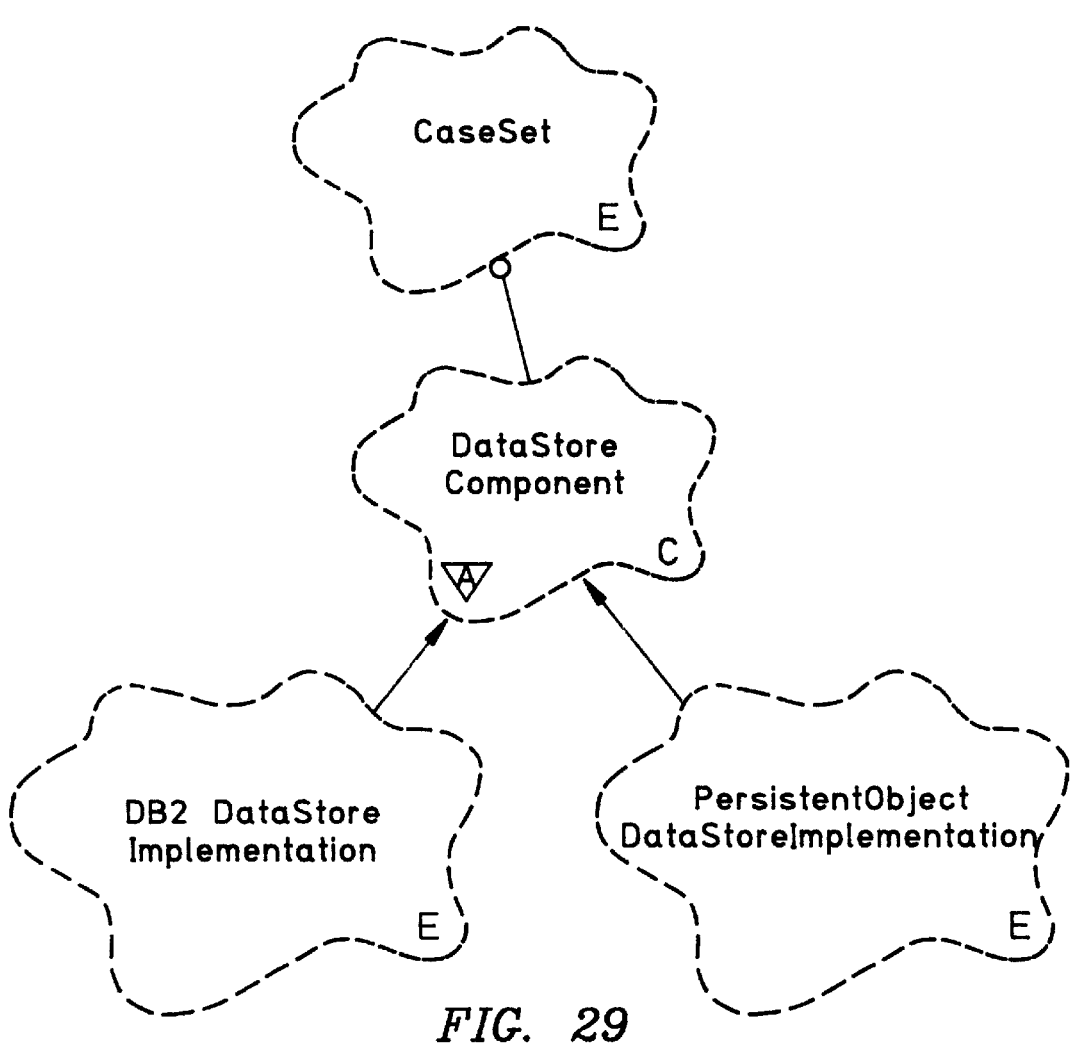
FIG. 29 is a class diagram representation of the DataStoreComponent category and related classes implemented by the computer processing, system illustrated in FIG. 8.

FIG. 29 indicates that a CaseSet object may use objects from multiple DataStoreComponent classes. FIG. 29 illustrates two exemplary extensions of the DataStoreComponent, classes called DB2_DataStoreImplementation and PersistentObjectDataStoreImplementation.

Figure 30:
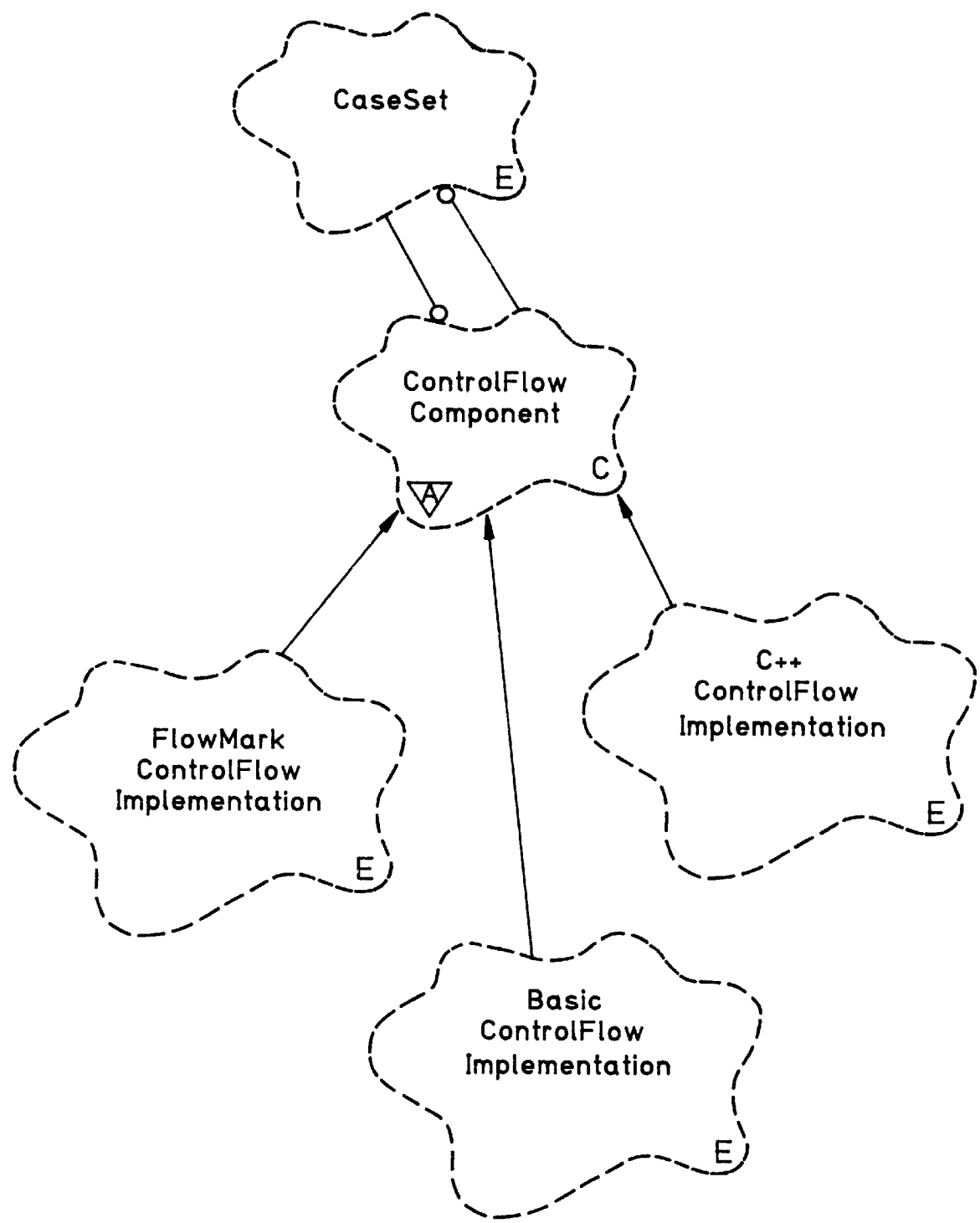
FIG. 30 is a class diagram representation of the ControlFlowComponent category and related classes implemented by the computer processing system illustrated in FIG. 8.

FIG. 30 shows several possible extensions of the ControlFlowComponent class, comprising classes called FlowMarkControlFlowImplementation, BasicControlFlowImplementation, and C++ ControlFlowImplementation. Thus, the framework user is free to use different means for controlling the flow of applications that use the CBR system. FIG. 30 indicates that a user can utilize control flow implementations that comprise FlowMark, Basic, or C++ programming language implementations. In this way a framework user can customize a framework extension to utilize a variety of operating system interface products supplied by vendors.

Presentation Component Class Diagram

Figure 31:
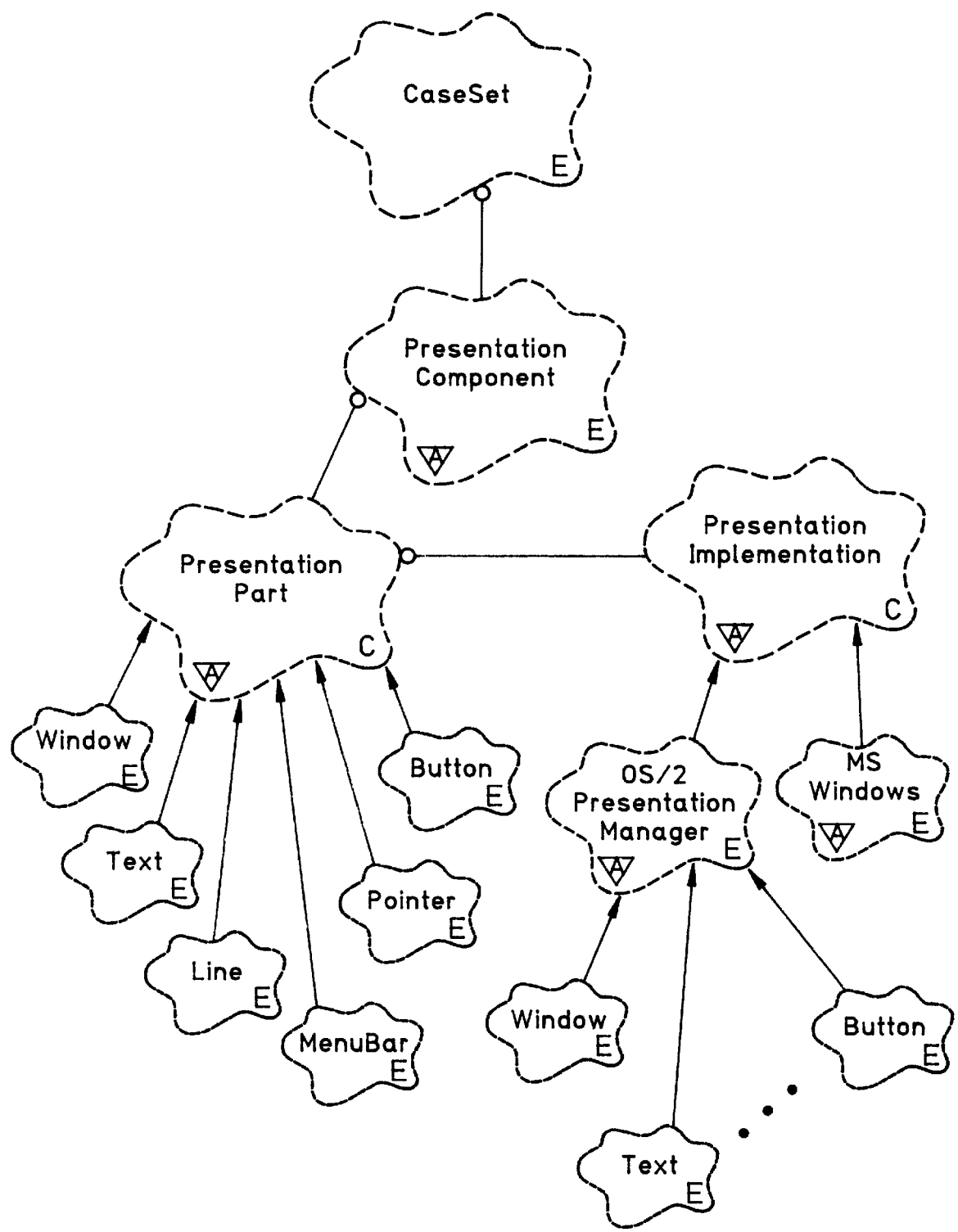
FIG. 31 is a class diagram representation of the PresentationPart category and related classes implemented by the computer processing system illustrated in FIG. 8.

FIG. 31 illustrates possible extensions of the framework in terms of the PresentationComponent class and its related classes and objects. Thus, FIG. 31 shows that the CaseSet class uses the PresentationComponent class, which in turn uses the PresentationPart class. The PresentationPart class, an abstract base class, defines certain objects comprising Window, Text, Line, MenuBar, Pointers Button, and the like. These objects are necessary to provide the presentation interface to the framework user. The PresentationPart class in turn uses the PresentationImplementation class. The PresentationImplementation class is illustrated in FIG. 31 with two possible extensions, one comprising an OS/2 PresentationManager and the other comprising a "MicroSoft" (MS) Windows class. Each of these implementations will contain the classes described for the PresentationPart class.

Scenario Diagrams

The operating steps performed by the case-based reasoning system constructed in accordance with the present invention will be better understood with reference to object scenario diagrams, which those skilled in the art will appreciate show the processing for an object oriented programming implementation having the object classes and compiled as described above.

Case Structure Definition Object Interactions

FIGS. 32 through 37 relate to case definition processing. That is, the processing steps represented by the FIG. 10 and FIG. 11 flow diagrams (most readily understood in a procedural programming context) may also be described by corresponding object-scenario diagrams that relate to the object oriented programming context, in view of the category diagrams of FIGS. 14 through 31. The operational steps represented by each object-scenario diagram are further described by tables of pseudo-code for each diagram. Line numbers for the text in the pseudo-code correspond to legends of the connecting lines in the diagrams.

Figure 32:
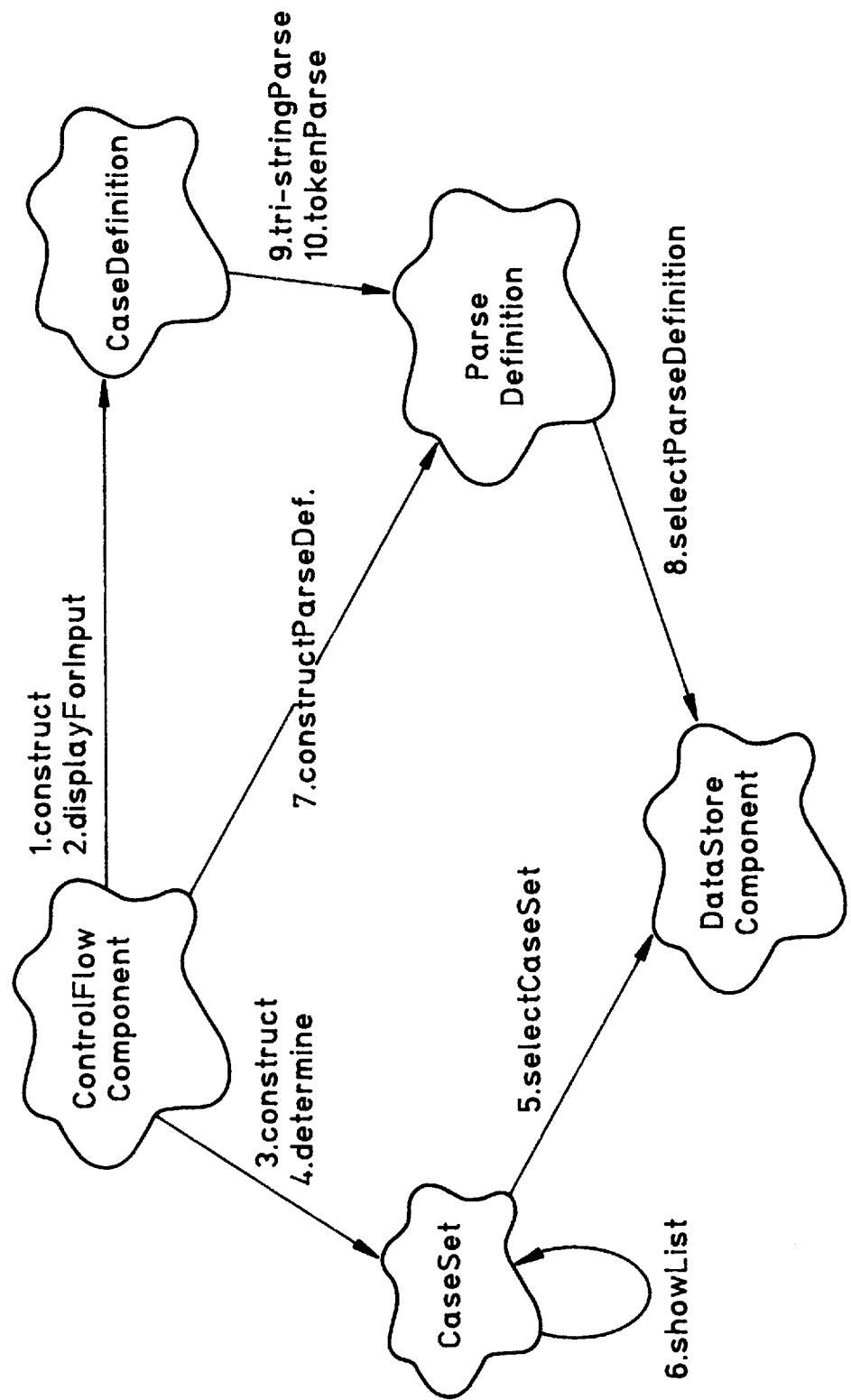
FIG. 32 is a scenario diagram representation of the processing steps executed by the host processor illustrated in FIG. 8 when a CaseDefinition is created.

More particularly, FIG. 32 is an object-scenario diagram for the framework implemented in the computer system illustrated in FIG. 8 and shows a first set of operations to construct a case definition and a parse definition. FIG. 32 assumes that the framework has already been extended so as to instantiate a CBR Session object and a ControlFlowComponent, so that the proper data structures are active and performing the necessary behaviors for the CBR system processing to proceed.

FIG. 32 shows that the case definition processing begins with construction of the CaseDefinition object, represented by "1. construct" on the connecting line from the ControlFlowComponent object cloud to the CaseDefinition object cloud. The next operation is to display a user interface screen that permits the framework user to build the various data objects of the CaseDefinition. This is represented by the legend "2. displayForInput" on the same connecting line. The connecting line labelled "3. construct" indicates that a CaseSet object is next constructed, followed by execution of the "4. determine( )" method that permits the user to select the CaseSet to be associated with the newly defined CaseDefinition. The legend "5. selectCaseSet" indicates that all existing CaseSet objects are retrieved by the DataStore- Component in object, and "6. showList" indicates that the list of case sets is displayed to the framework user for selection.

The case definition processing next includes constructing a ParseDefinition object for the selected CaseSet, represented by the legend "7. constructParseDefinition" on the connecting line from the ControlFlowComponent object cloud to the ParseDefinition object cloud. The user has the option of retrieving a desired ParseDefinition with the DataStoreComponent object, as represented by the legend "8. selectParseDefinition" on the connecting line from the ParseDefinition object cloud to the DataStoreComponent object cloud. The user also has the option of prescribing a tri-string parse and a token parse. A tri-string parse is a user-defined group of three text (alphanumeric) characters that will be used to score case instances in a query evaluation. A token parse is a single user input character that will be used to replace text in a case instance. User input of a tri-string parse is represented by "9. tri-String Parse" and input of a token parse is represented by "10. tokenParse" on the connecting line from the CaseDefinition object cloud to the ParseDefinition cloud. In processing described further below, the user is provided with the option of changing the parsing definition again, before the parsing definition is stored by the DataStoreComponent object. If a user has entered data for an initial problem description for the CaseDefinition object, then parsing methods of the ParseDefinition class are executed to parse the Description object into searchable components. Parsing is described in lines 20–23 of the Table 2 pseudo-code.

The processing represented by the FIG. 32 diagram is further described by the following pseudo-code, labelled Table 2. This pseudo-code table can be understood with relation to Table 1, which relates to start-up processing, as comprising processing steps that are executed following the execution of the Table 1 pseudo-code processing steps. The lines of pseudo-code in Table 2 are numbered consecutively, to indicate ordering of processing steps:

TABLE 2

Create the Case Definition.

| | |
|---|---|
| 1 | Construct CaseDefinition object; |
| 2 | Display for input "Case Definition"; |
| 3 | Construct CaseSet object; |
| 4 | Determine CaseSet; |
| 5 |    Select CaseSet DataStoreComponent; |
| 6 |    Show List CaseSet; |
| 7 | Construct ParseDefinition object; |
|   | If needed: |
| 8 |    Select ParseDefinition DataStoreComponent; |
|   | If needed: |
| 9 |    Input Tri-string ParseDefinition; |
|   | If needed: |
| 10 |    Input Token ParseDefinition; |

Figure 33:
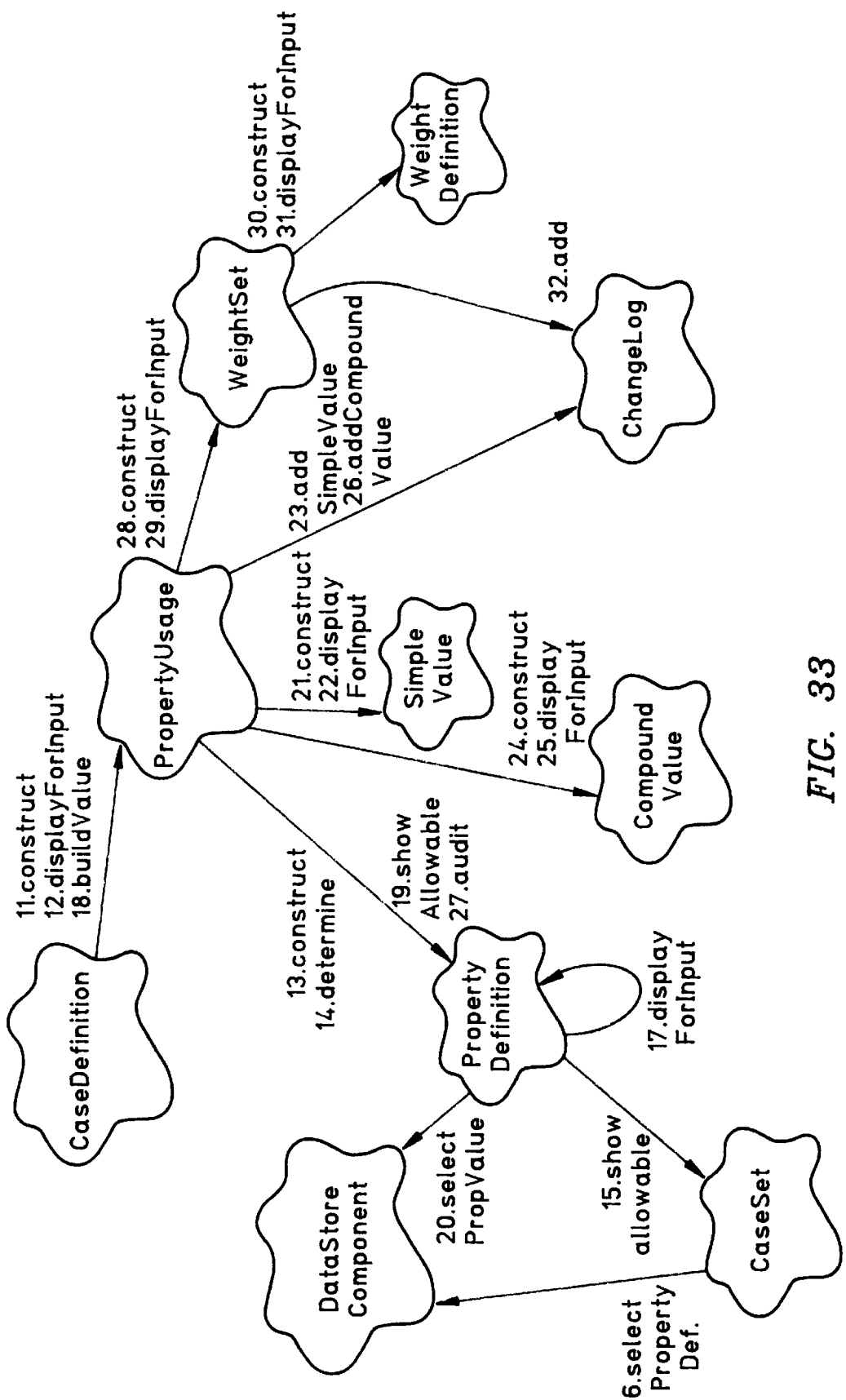
FIG. 33 is a scenario diagram representation of the processing steps executed by the host processor illustrated in FIG. 8 when Property. Value, and WeightSet objects are constructed.

The next sequence of processing steps in the build case definition processing is illustrated in FIG. 33 and relates to construction of the objects associated with a PropertyUsage. The first property usage operation performed is indicated by the legend "11. construct" on the connecting line from the CaseDefinition object cloud to the PropertyUsage object cloud, comprising construction of a PropertyUsage object in accordance with the object oriented programming environment of the preferred embodiment. FIG. 33 indicates that a property usage input prompt is displayed to the user, represented by the legend "12. displayForInput" on the same connecting line, to receive property information from the user. Next, as indicated by "13. construct", the Property-Usage object constructs a PropertyDefinition object. The legend "14. determine" represents processing that uses a determine( ) method of the PropertyUsage object to retrieve the appropriate property definition in accordance with the property usage input.

Next, the allowable property definitions for the selected case set are retrieved by the DataStoreComponent and are shown to the user for selection. This processing is represented by the legend "15. showAllowable" on the connecting line from the PropertyDefinition object cloud to the CaseSet object cloud. The user makes a selection from the allowable list and it is retrieved by the DataStoreComponent, as represented by "16. selectPropertyDef." on the connecting line from the CaseSet object cloud to the DataStoreComponent object cloud. If a new PropertyDefinition object is being built by the user, the system displays a Property Definition prompt and receives the new information, as represented by the legend "17. displayForInput" at the PropertyDefinition object cloud.

The user can add allowable values associated with the PropertyDefinition object being added. To do so, a Value object must first be built, processing that is represented by the legend "18. buildValue" on the connecting line from the CaseDefinition object cloud to the PropertyUsage object cloud. A value can be either a simple value or a compound value, and each case is constructed and displayed for input from the user as the user selects and/or adds to the values. Any existing, allowable values are displayed (represented by "19. showAllowable") and selected by the user (represented by "20. selectPropValue").

If a simple value is selected, then a SimpleValue object is constructed, a "simple value" prompt is displayed to the user for receiving the selection, and the selection is recorded into the change log. These operations are represented, respectively, by the legends "21. construct", "22. displayForInput". and "23. addSimpleValue". Similar processing in the case of a compound value is represented by "24. construct", "25. displayForInput", and "26. addCompoundValue". The PropertyUsage object ensures that only appropriate values are defined by performing an audit method, represented by the legend "27. audit" on the connecting line from the PropertyUsage object cloud to the PropertyDefinition object cloud.

The user also can define the allowable weighting. Therefore, the control flow of the CBR system causes a WeightSet object to be constructed and a user prompt displayed, as represented by "28. construct" and "29. displayForInput" on the connecting line from the PropertyUsage object cloud to the WeightSet object cloud. As noted above, weight values are associated with properties of case instances and are used by the query engine to select the closest match to the current problem. The weight definitions can be received from the user and this processing is represented by "30. construct" and "31. displayForInput". Lastly, the new weight definitions are recorded in the change log, as represented by the legend "32. add" on the connecting line from the WeightSet object cloud to the ChangeLog object cloud.

The processing represented by the FIG. 33 object-scenario diagram is further described by the following pseudo-code, labelled Table 3, which is a continuation of Table 2 and therefore includes table line numbers that are numbered consecutively from the lines of pseudo-code in Table 2, to indicate ordering of processing steps:

TABLE 3

Construct Properties, Values, Weight Sets.

| | |
|---|---|
| | Repeat as needed (Construct PropertyUsage): |
| 11 | Construct PropertyUsage; |
| 12 | Display for Input "Property Usage"; |
| 13 | Construct PropertyDefinition; |
| 14 | Determine PropertyDefinition; |
| 15 | Show AllowablePropertyDefinitions CaseSet; |
| 16 | Select PropertyDefinition DataStoreComponent |
| | If new |
| 17 | Display for input "Property Definition"; |
| | Repeat as needed (Build ValuePropertyUsage): |
| 18 | Build ValuePropertyUsage; |
| | If existing |
| 19 | ShowAllowablePropertyValuesPropertyDefinition; |
| 20 | Select PropertyValue DataStoreComponent; |
| | If needed: |
| 21 | Construct SimpleValue; |
| 22 | Display for input "Simple Value"; |
| 23 | Add ChangeLog; |
| | If needed: |
| 24 | Construct CompoundValue; |
| 25 | Display for input "Compound Value"; |
| 26 | Add ChangeLog; |
| 27 | Audit Value PropertyDefinition; |
| | End Build Value PropertyDefinition; |
| | Repeat as needed (Construct WeightSet): |
| 28 | Construct WeightSet; |
| 29 | Display for input "Weight Set"; |
| 30 | Construct WeightDefinition; |
| 31 | Display for input "Weight Definition"; |
| 32 | Add ChangeLog; |
| | End Construct WeightSet Repeat; |
| | End Construct PropertyUsage Repeat; |

The next sequence of operations to be performed by the CBR system is to construct action promts, tracking definitions, and index definitions, and index definitions for use in query evaluation processing. These operations are represented by the object-scenario diagram of FIG. 34. The first step of action prompt processing is represented by the legend "33. construct" and "34. displayForInput" on the connecting line from the CaseDefinition object cloud to the ActionPromptDefinition object cloud, indicating that an ActionPromptDefinition object is constructed and the user is prompted for the definition input. If there is an existing action prompt set, then the set is displayed to the user (represented by "35. show") and the user selects from the displayed set (represented by "36. selectActionPrompt"). The modification to the system implemented by the selection is added to the change log, as indicated by "37. add".

Next, the tracking definition is received from the user. This processing is initiated with construction of a TrackingDefinition object (represented by "38. construct"), followed by user specification of the definition (represented by "39. displayForInput"). If an existing tracking definition is specified by the user, in a manner determined by the user interface, then the existing definitions are displayed (represented by "40. show") and the user selects one using the DataStoreComponent (represented by "41. selectTrackingDef."). The modification is added to the change log, indicated by "42. add".

The user then specifies the desired index definition. The next processing is to construct an IndexDefinition object and receive user input ("43. construct" and "44. displayForInput" on the connecting line from CaseDefinition to IndexDefinition). If an existing index definition was desired, then the index definition set is displayed to the user ("45. show") and the user makes a selection, as indicated by the legend "46. selectIndexDef." on the connecting line from the CaseSet object cloud to the DataStoreComponent object cloud. Modifications are recorded into the change log at the step indicated by "47. add".

Figure 34:
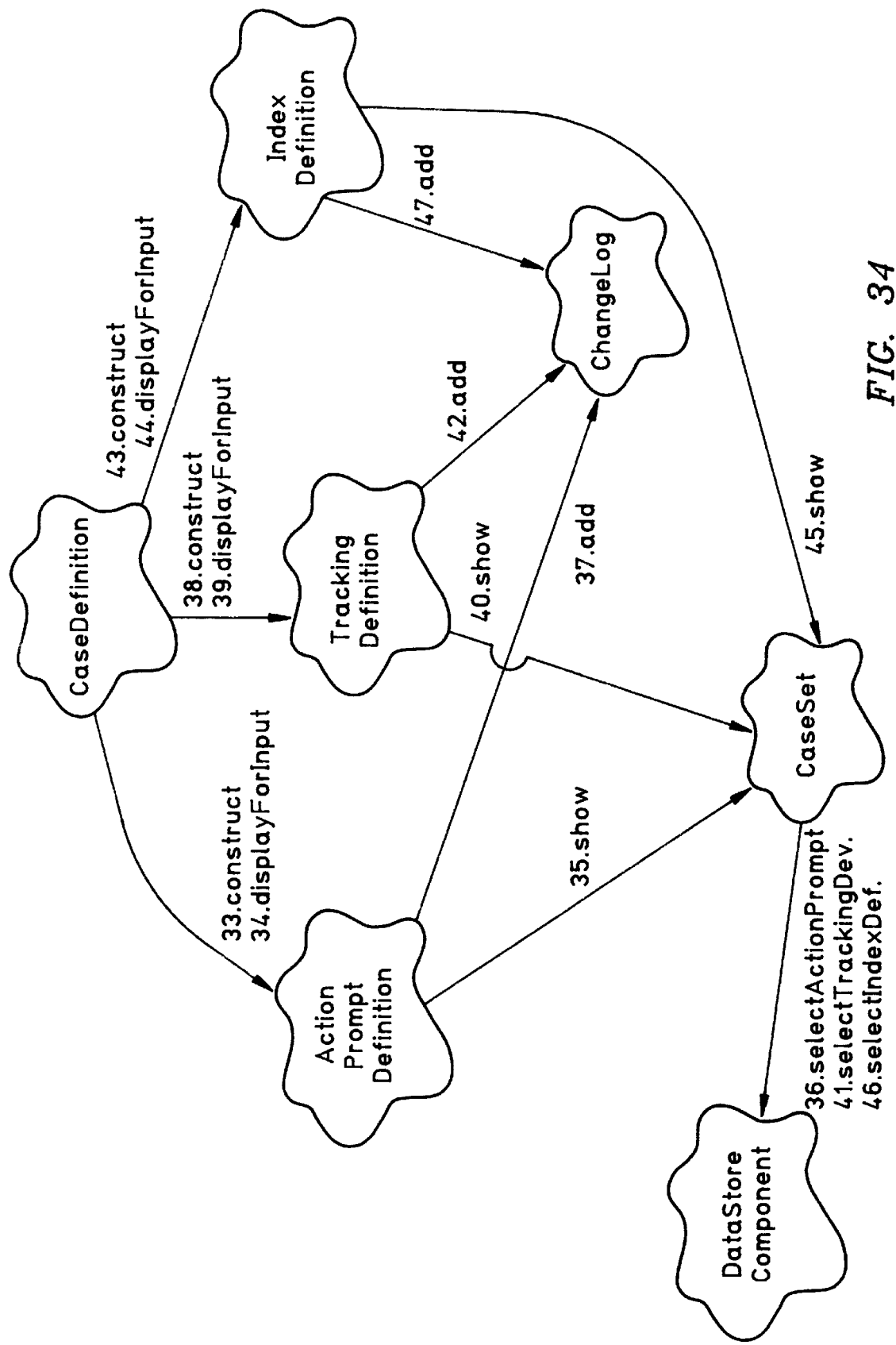
FIG. 34 is a scenario diagram representation of the processing steps executed by the host processor illustrated in FIG. 8 when ActionPrompt, Tracking, and IndexDefinition objects are constructed.

The processing represented by the FIG. 34 object-scenario diagram can be further described by the following table of pseudo-code, which is a continuation of the previous tables:

The next series of processing steps performed by the CBR system of the extended framework is to construct Pattern objects that are associated with the CaseDefinition data object. The pattern processing is represented by the FIG. 35 object-scenario diagram.

TABLE 4

Construct Action Prompts, Tracking, and Index Definitions.

| | |
|---|---|
| | Repeat as needed (Construct ActionPromptDefinition): |
| 33 | Construct ActionPromptDefinition; |
| 34 | Display for Input "Action Prompt Definition"; |
| | If existing |
| 35 | Show ActionPromptDefinitions CaseSet; |
| 36 | Select ActionPromptDefinition |
| | DataStoreComponent; |
| 37 | Add ChangeLog; |
| | End Construct Action Prompt Instance Repeat; |
| | Repeat as needed (Construct Tracking Definition): |
| 38 | Construct TrackingDefinition; |
| 39 | Display for input "Tracking Definition"; |
| | If existing |
| 40 | Show TrackingDefinition CaseSet; |
| 41 | Select TrackingDefinition |
| | DataStoreComponent; |
| 42 | Add ChangeLog; |
| | End Construct Tracking Instance Repeat; |
| | Repeat as needed (Construct Index Definition): |
| 43 | Construct IndexDefinition; |
| 44 | Display for input "Index Definition"; |
| | If existing |
| 45 | Show IndexDefinition CaseSet; |
| 46 | Select IndexDefinition |
| | DataStoreComponent; |
| 47 | Add ChangeLog; |
| | End Construct Index Instance Repeat; |

The initial step of pattern processing is to construct a Pattern object and receive a user-selected pattern, as represented by the legends "48. construct" and "49. displayForInput" on the connecting line from the CaseDefinition object cloud to the Pattern object cloud. If one or more existing patterns are available for selection by the user, then the system shows the allowable set of patterns to the user (indicated by "50. showAllowablePatterns") and the user makes a selection (indicated by "51. select"). Property values can be compound, and therefore the next processing is to construct a compound property value and display to the user a prompt to receive the user specification, represented respectively by "52. construct" and "53. displayForInput". If a CompoundPropertyValue is added, then the change is recorded ("54. add").

A Pattern object consists of one or many single SimpleValue objects and/or CompoundValue objects that are associated with PropertyInstance objects. Thus, the next processing is to construct a PropertyInstance object specified by the user ("55. construct" and "56. displayForInput"). Next, SimpleValue objects are similarly constructed ("57. construct" and "58. displayForInput"), as are CompoundValue objects ("59. construct" and "60. displayForInput"). Finally, the revised Pattern is generated by the inter method ("61. inferPatternValue"). In this way, the Pattern object limits, or constrains, the combinations of property values that can be defined in case instances of the case definition.

Figure 35:
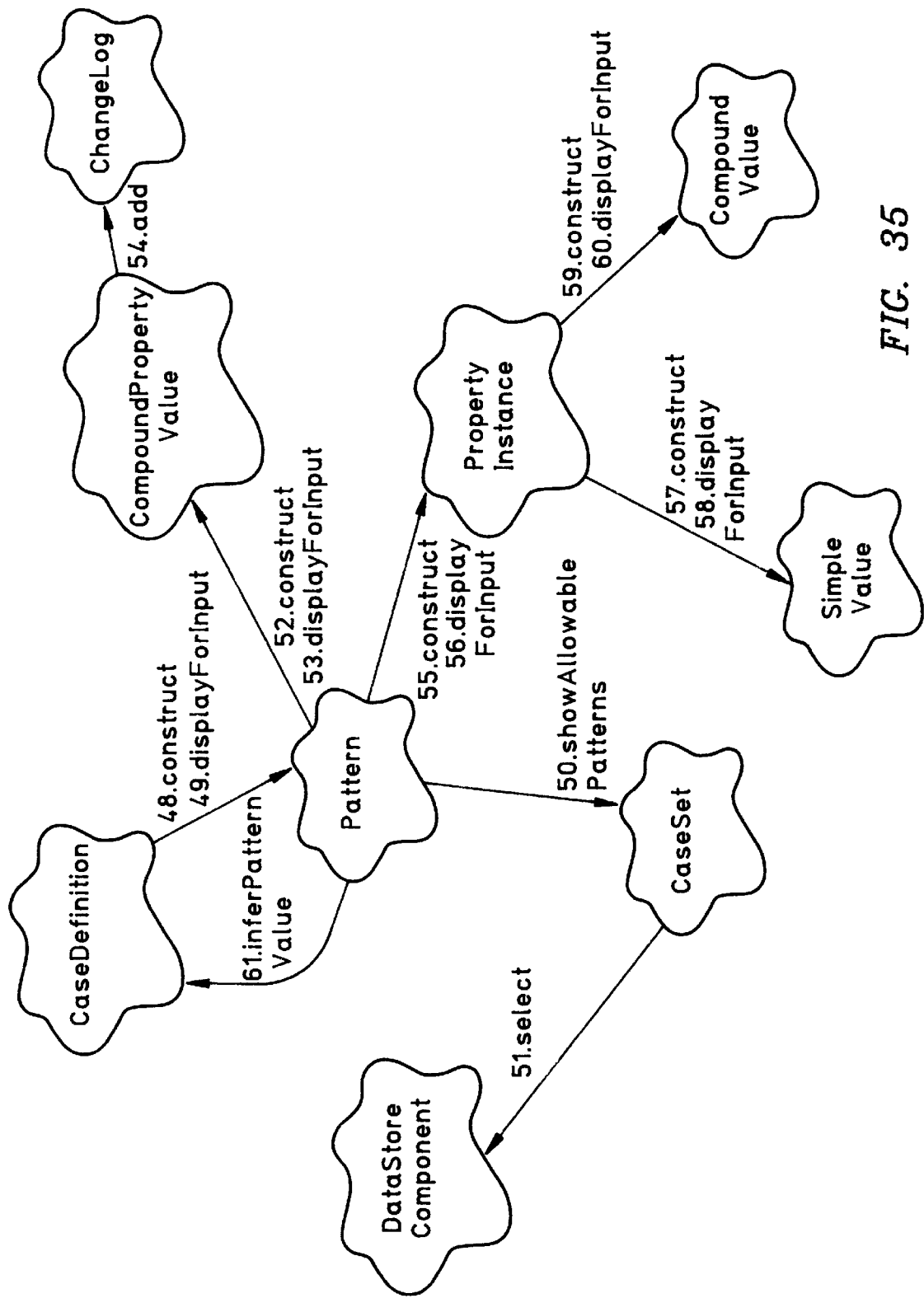
FIG. 35 is a scenario diagram representation of the processing steps executed by the host processor illustrated in FIG. 8 when Pattern objects are constructed.

The processing represented by the FIG. 35 object-scenario diagram can be further described by the following table of pseudo-code, which is a continuation of the previous tables:

TABLE 5

Construct Patterns.

| | |
|---|---|
| | Repeat as needed (Construct Patterns): |
| 48 | Construct Patterns; |
| 49 | Display for input "Pattern"; |
| | If existing |
| 50 | Show AllowablePattern CaseSet; |
| 51 | Select Pattern DataStoreComponent; |
| | If needed: |
| 52 | Construct CompoundPropertyValue; |
| 53 | Display for input "Compound Property Value"; |
| 54 | Add ChangeLog; |
| | If needed: |
| 55 | Construct PropertyInstance; |
| 56 | Display for input "Property Instance"; |
| | If needed: |
| 57 | Construct SimpleValue; |
| 58 | Display for input "Simple Value"; |
| | If needed: |
| 59 | Construct CompoundValue; |
| 60 | Display for input "Compound Value"; |
| 61 | Infer PatternValue CaseDefinition; |
| | End Construct Patterns Repeat; |

Figure 36:
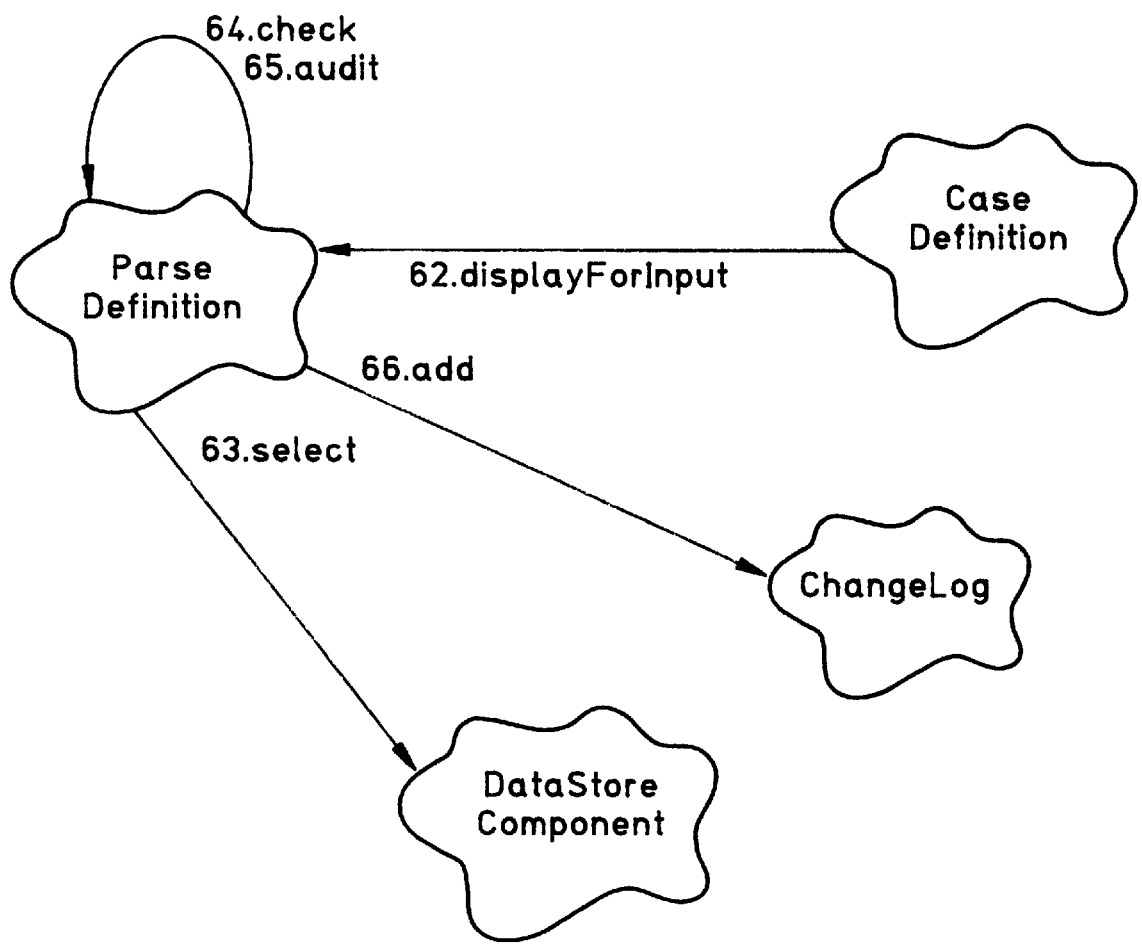
FIG. 36 is a scenario diagram representation of the processing steps executed by the host processor illustrated in FIG. 8 when a ParseDefinition object is updated.

FIG. 36 is an object-scenario diagram that represents processing associated with updating a parse definition, the next sequence of operations. The FIG. 36 processing begins with a display for user input to receive a parse definition, as indicated by the legend "62. displayForInput" on the connecting line from the CaseDefinition object cloud to the ParseDefinition object cloud. The user makes a selection ("63. select") and then the system checks to determine where the parse definition was used, or located, in the case definition ("64. check"). The parse definition is then subjected to an audit operation that ensures the words are allowable ("65. audit"). Finally, the modifications to the parse definition being used are recorded in the ChangeLog ("66. add").

The processing represented by the object-scenario diagram of FIG. 36 can be further described by the following table of pseudo-code, which is a continuation of the previous tables:

TABLE 6

Update Parse Definition.

| | |
|---|---|
| | Repeat as needed (Update Parse Definition): |
| 62 | Display for input "Parse Definition"; |
| 63 | Select ParseDefinition DataStoreComponent; |
| 64 | Check Used ParseDefinition; |
| 65 | Audit Words ParseDefinition; |
| 66 | Add ChangeLog; |
| | End Update Parse Definition Repeat; |

Figure 37:
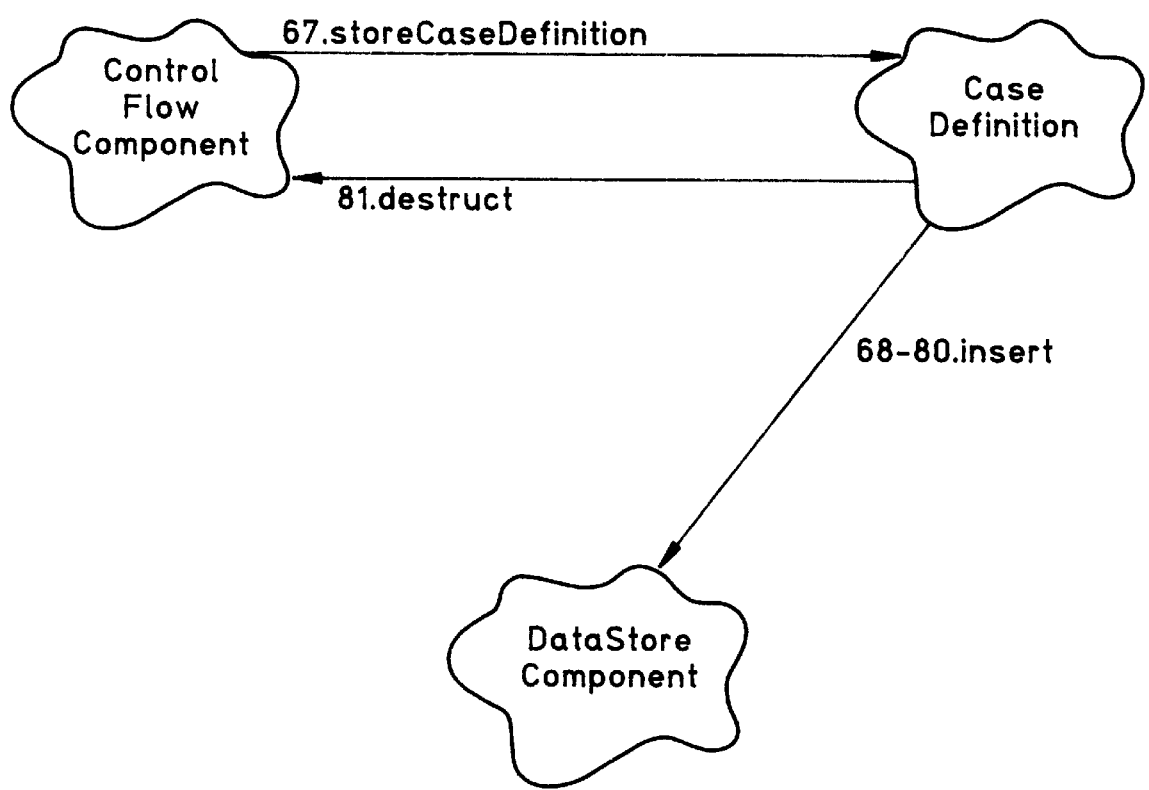
FIG. 37 is a scenario diagram representation of the processing steps executed by the host processor illustrated in FIG. 8 when a CaseDefinition object is stored.

FIG. 37 is an object-scenario diagram that illustrates the processing to store the case definition in the persistent storage of the CBR system using the DataStoreComponent. The first store operation is for the ControlFlowComponent to cause storage of the CaseDefinition, comprising all of the objects associated with the various classes of which the CaseDefinition is comprised. This operation is represented in FIG. 37 by the legend "67. storeCaseDefinition" on the connecting line from the ControlFlowComponent object cloud to the CaseDefinition object cloud. The next series of operations comprises the insertion of the objects into persistent storage using the DataStoreComponent. These steps are represented by the legend "68–80. insert" on the connecting line from the CaseDefinition cloud to the DataStoreComponent cloud. Individual operations associated with these steps are listed in Table 7 below. Finally, in accordance with object oriented programming principles, objects not needed after the storing is complete are destructed ("81. destruct").

The processing represented by the FIG. 37 object-scenario diagram can be by the following table of pseudo-code, which is a continuation of the previous table:

TABLE 7

Store Case Definition.

| | |
|---|---|
| 67 | Store CaseDefinition; |
| 68 | Insert WeightDefinition DataStoreComponent; |
| 69 | Insert PropertyDefinition DataStoreComponent; |
| 70 | Insert Values DataStoreComponent; |
| 71 | Insert ParseDefinition DataStoreComponent; |
| 72 | Insert ActionPromptDefinition DataStoreComponent; |
| 73 | Insert CaseDefinition DataStoreComponent; |
| 74 | Insert PropertyUsage DataStoreComponent; |
| 75 | Insert Values DataStoreComponent; |
| 76 | Insert WeightSet DataStoreComponent; |
| 77 | Insert ActionPrompt DataStoreComponent; |
| 78 | Insert Pattern DataStoreComponent; |
| 79 | Insert TrackingDefinition DataStoreComponent; |
| 80 | Insert IndexDefinition DataStoreComponent; |
| | End Store CaseDefinition; |
| 81 | Destruct; |
| | End Build Case Definition. |

Case Instance Object Interactions

A user fines new problem description-solution pairs, the history cases, and perform maintenance on existing cases by using the case instance definition processing. Each history case, called a case instance has a data structure specified by the case definition structure. The case definition processing was described above in conjunction with FIGS. 32–37. The case instance processing, is similar in many respects to the case definition processing, and is illustrated in FIGS. 38–43.

Figure 38:
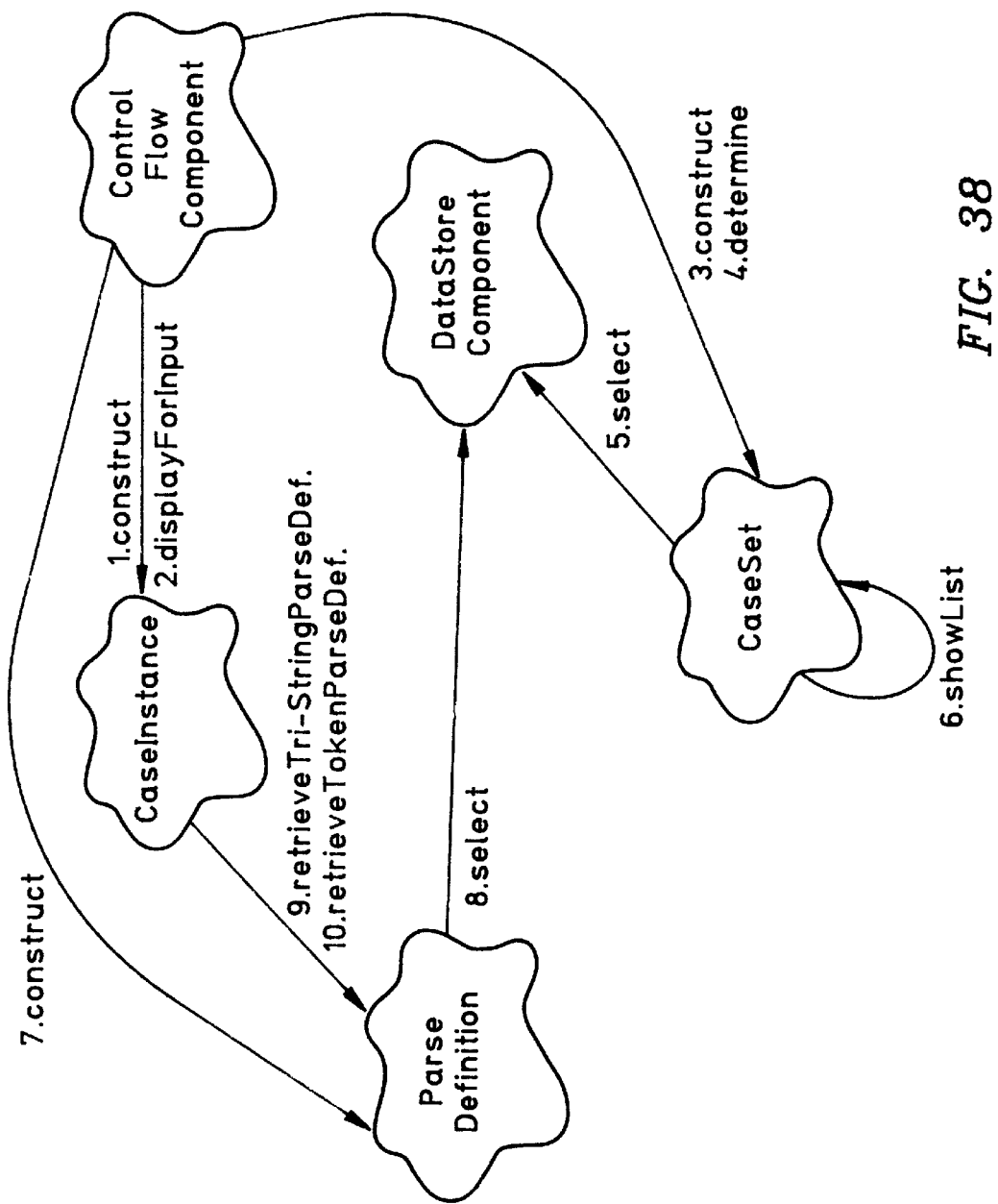
FIG. 38 is a scenario diagram representation of the processing steps executed by the host processor illustrated in FIG. 8 when a CaseInstance Definition object is created.

FIG. 38 is an object-scenario diagram that illustrates operating steps in the case instance processing. First, a CaseInstance object is constructed and the user is permitted to designate a case instance set. These steps are represented by the legends "1. construct" and "2. displayForInput" on the connecting line from the ControlFlowComponent object cloud to the CaseInstance object cloud. A CaseSet object is constructed and the allowable CaseSet objects are determined (indicated by "3. construct" and "4. determine" on the connecting line from ControlFlowComponent to CaseSet). The user next selects one of the available CaseSet objects, using the DataStoreComponent ("5. select"), from among the list of available CaseSet objects ("6. showList").

After the case set is selected, the next step in the CaseInstance processing is for the appropriate ParseDefinition objects to be retrieved. First, a ParseDefinition object must be constructed, as represented by the legend "7. construct" on the connecting line from the ControlFlowComponent object cloud to the ParseDefinition object cloud. The user then selects a ParseDefinition using the DataStoreComponent ("8. select"). The selected parse definition may be either a tri-string parse or a token parse, individually or together, as desired. The tri-string parse will break down the input data in successive three-character groups to permit "fuzzy" matching and tolerance for incorrectly spelled words in the input data and the token parse breaks down each word in the input data into a token, thereby stripping predetermined prefix and suffix combinations from the input words and handling common synonyms. The tri-string and token parse selection is represented by "9. retrieveTriStringParseDef." and by "10. retrieveTokenParseDef." respectively.

The processing of the FIG. 38 case instance definition object-scenario diagram can be further described by the following table of pseudo-code, in which pseudo-code line numbers are provided to indicate ordering of processing steps:

TABLE 8

Create Case Instance Definition.

| | |
|---|---|
| 1 | Construct CaseInstance object; |
| 2 | Display for input "Case Instance"; |
| 3 | Construct CaseSet; |
| 4 | Determine CaseSet; |
| 5 |    Select CaseSet DataStoreComponent; |
| 6 |       Show List of CaseSet; |
| 7 | Construct ParseDefinition; |
| | If needed: |
| 8 |    Select ParseDefinition DataStoreComponent; |
| | If needed: |
| 9 |       Retrieve Tri-string ParseDefinition; |
| | If needed: |
| 10 |       Retrieve Token ParseDefinition; |

Figure 39:
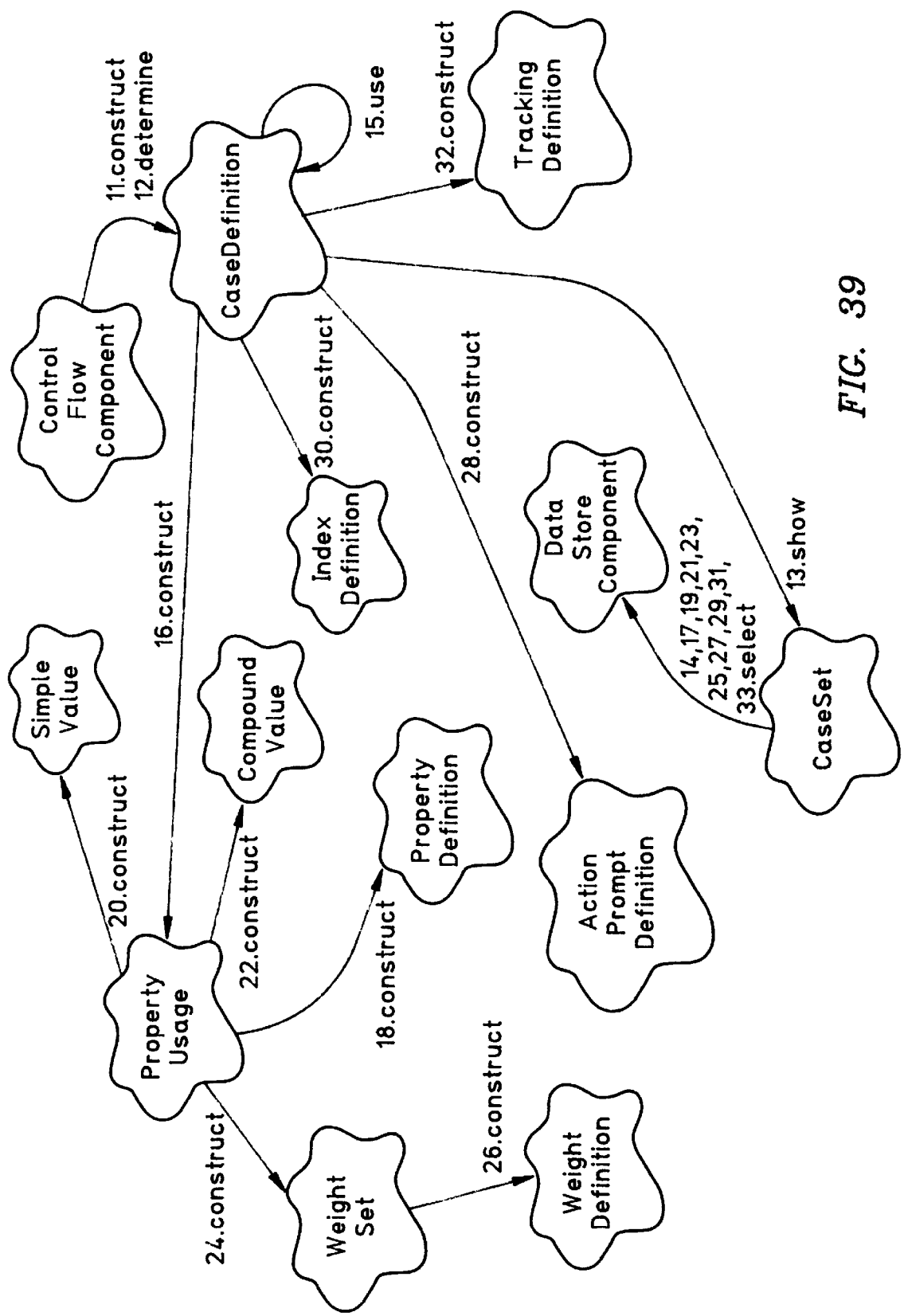
FIG. 39 is a scenario diagram representation of the processing steps executed by the host processor illustrated in FIG. 8 for selection of a CaseDefinition object.

FIG. 39 is an object-scenario diagram that illustrates selection of a case definition to control the structure of the new case instance. The first processing step is to construct a CaseDefinition object and to determine the set of allowable CaseDefinition objects as represented by the legends "11. construct" and "12. determine" on the collecting line from the ControlFlowComponent object cloud to the CaseDefinition object cloud. To permit the user to select a CaseDefinition, first the set of allowable objects from the CaseSet is shown to the user ("13. show") and then the user selects one of them using the DataStoreComponent ("14. select").

The selected CaseDefinition is used ("15. use") to construct a PropertyUsage object ("16. construct"). The user then selects a PropertyUsage object, as represented by the legend "17. select" on the connecting line from the CaseSet object cloud to the DataStoreComponent object cloud. With the selected PropertyUsage, the next step is to construct PropertyDefinition objects specified by the PropertyUsage object. This is represented by "18. construct" on the connecting line from PropertyUsage to PropertyDefinition. The user then selects a PropertyDefinition object ("19. select"). A property definition includes simple values, compound values, and weights, and therefore the next processing involves constructing and selecting a SimpleValue object ("20. construct" and "21. select"), constructing and selecting a CompoundValue object ("22. construct" and "23. select"), and constructing and selecting a WeightSet object ("24. construct" and "25. select").

As part of WeightSet processing, the CBR system constructs the corresponding WeightDefinition objects and permits the user to make a selection, represented by the legend "26. construct" on the connecting line from the WeightSet object cloud to the WeightDefinition object cloud and the legend "27. select" on the connecting line from the CaseDefinition object cloud to the DataStoreComponent object cloud.

Attributes of the CaseDefinition include action prompts, index definitions, and tracking definitions. Therefore, the next case definition processing includes constructing( ActionPromptDefinition objects ("28. construct") and selecting an ActionPromptDefinition ("29. select"). The processing also includes constructing IndexDefinition objects ("30. construct") and selecting one ("31. select"), and also constructing TrackingDefinition objects ("32. construct") and selecting one ("33. select"). This completes case definition processing.

The processing represented by the FIG. 39 object-scenario diagram can be further described by the following table of pseudo-code, which is a continuation of the previous tables of pseudo-code:

TABLE 9

Select Case Definition.

| | |
|---|---|
| 11 | Construct CaseDefinition; |
| 12 | Determine CaseDefinition; |
| 13 |    Show CaseDefinition CaseSet; |
| 14 |       Select CaseDefinition DataStoreComponent; |
| 15 | Use Selected CaseDefinition; |
| 16 | Construct PropertyUsage object; |
| 17 |    Select PropertyUsage; |
| 18 |       Construct PropertyDefinition objects; |
| 19 |          Select Property Definition; |
| 20 |             Construct SimpleValue object; |
| 21 |                Select SimpleValue; |
| 22 |             Construct CompoundValue object; |
| 23 |                Select CompoundValue; |
| 24 |             Construct WeightSet object; |
| 25 |                Select WeightSet; |
| 26 |                   Construct WeightDefinition objects; |
| 27 |                      Select WeightDefinition; |
| 28 |       Construct ActionPromptDefinition objects; |
| 29 |          Select ActionPromptDefinition; |
| 30 |       Construct IndexDefinition objects; |
| 31 |          Select IndexDefinition; |
| 32 |       Construct TrackingDefinition objects; |
| 33 |          Select TrackingDefinition; |

Figure 40:
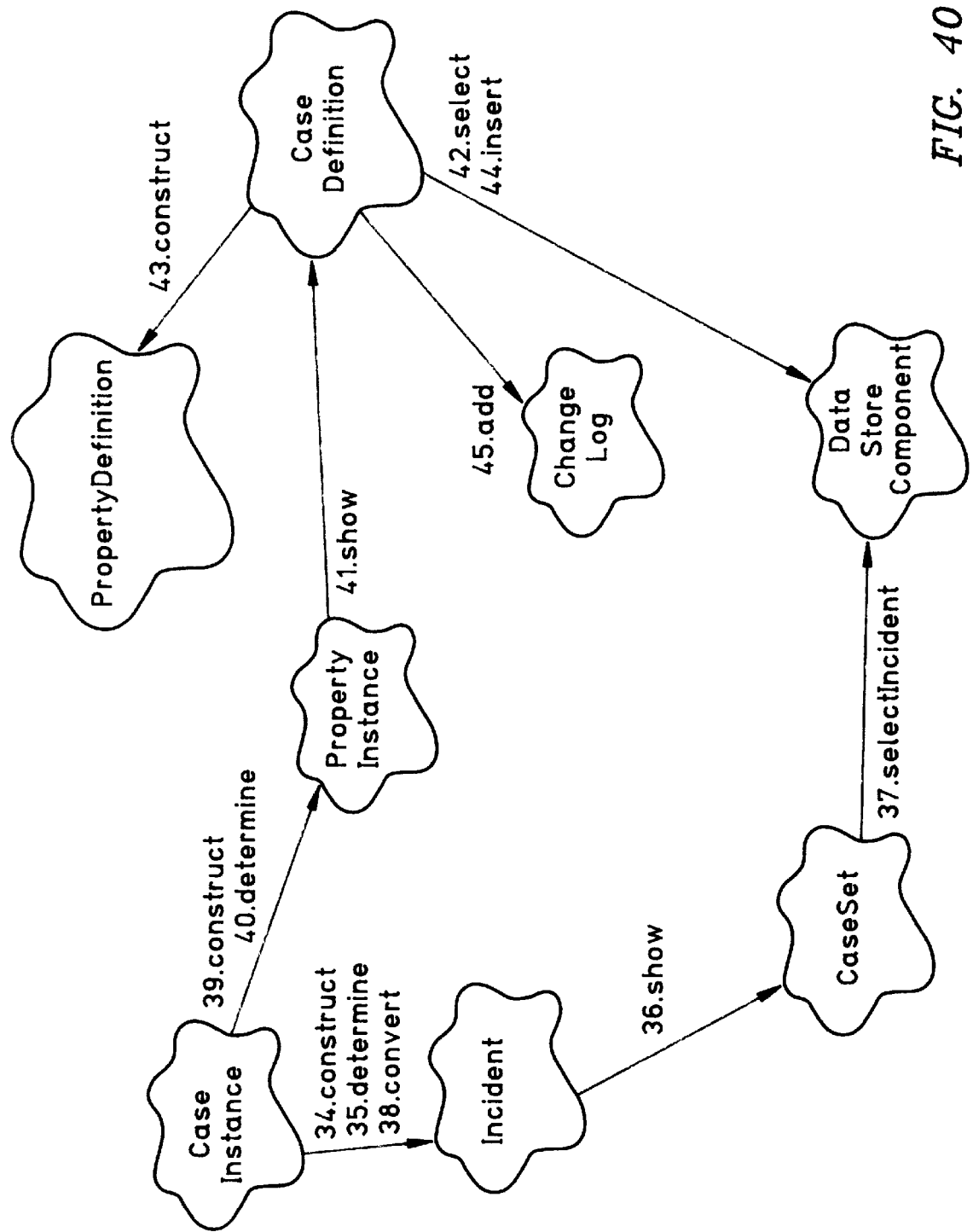
FIG. 40 is a scenario diagram representation of the processing steps executed by the host processor illustrated in FIG. 8 when a PropertyInstance object is created.

FIG. 40 is an object-scenario diagram that illustrates processing that creates the PropertyInstance objects for the previously selected CaseInstance based on either the data from an Incident object or by creating new PropertyInstance objects from user input data. A list of Incident objects may be retrieved before creating the property instance objects, to permit selection of a stored Incident object as the source for building a CaseInstance object. This processing is represented in FIG. 40 by the legend "34. construct" and "35. determine" on the connecting line from the CaseInstance object cloud to the Incident object cloud, whereupon the Incident object is created and its allowable objects are determined. The allowable Incident objects from the CaseSet are shown to the user ("36. show"), who then makes a selection using the DataStoreComponent ("37. selectIncident"). As noted previously, the DataStoreComponent is the mechanism through which a user can retrieve stored data, such as for selection of a stored Incident object.

A "convert-to-case" method (represented by "38. convert" on the connecting line from the CaseInstance object cloud to the Incident object cloud) identifies all known Property Instance/Value pairs from the Incident. The method causes PropertyInstance objects to be created ("39. construct") and the set of specified PropertyDefinition objects valid for the current CaseDefinition are determined ("40. determine"). The permissible PropertyDefinition objects based on the CaseDefinition are shown to the user ("41. show") and then are selected by the user ("42. select") using the DataStoreComponent. If the PropertyDefinition selected by the user is new, then a PropertyDefinition object is constructed ("43. construct") and inserted into the persistent storage by the DataStoreComponent ("44. insert"). The modification (new PropertyDefinition) is recorded in the change log ("45. add").

The processing represented by the object-scenario diagram of FIG. 40 can be further describe by the following table of pseudo-code, which is a continuation of the of pseudo-code:

TABLE 10

Create Property Instance.

|  |  |
|---|---|
|  | If needed: |
| 34 | Construct Incident object; |
| 35 | Determine Incident; |
| 36 | Show Incidents CaseSet; |
| 37 | Select Incident; |
| 38 | Use convert-to-CaseIncident method; |
|  | Repeat as needed: |
| 39 | Construct PropertyInstance; |
| 40 | Determine PropertyInstance; |
| 41 | Show PropertyDefinition CaseDefinition; |
| 42 | Select PropertyDefinition; |
|  | If new PropertyDefinition |
| 43 | Construct PropertyDefinition; |
| 44 | Insert PropertyDefinition; |
| 45 | Add ChangeLog; |

Figure 41:
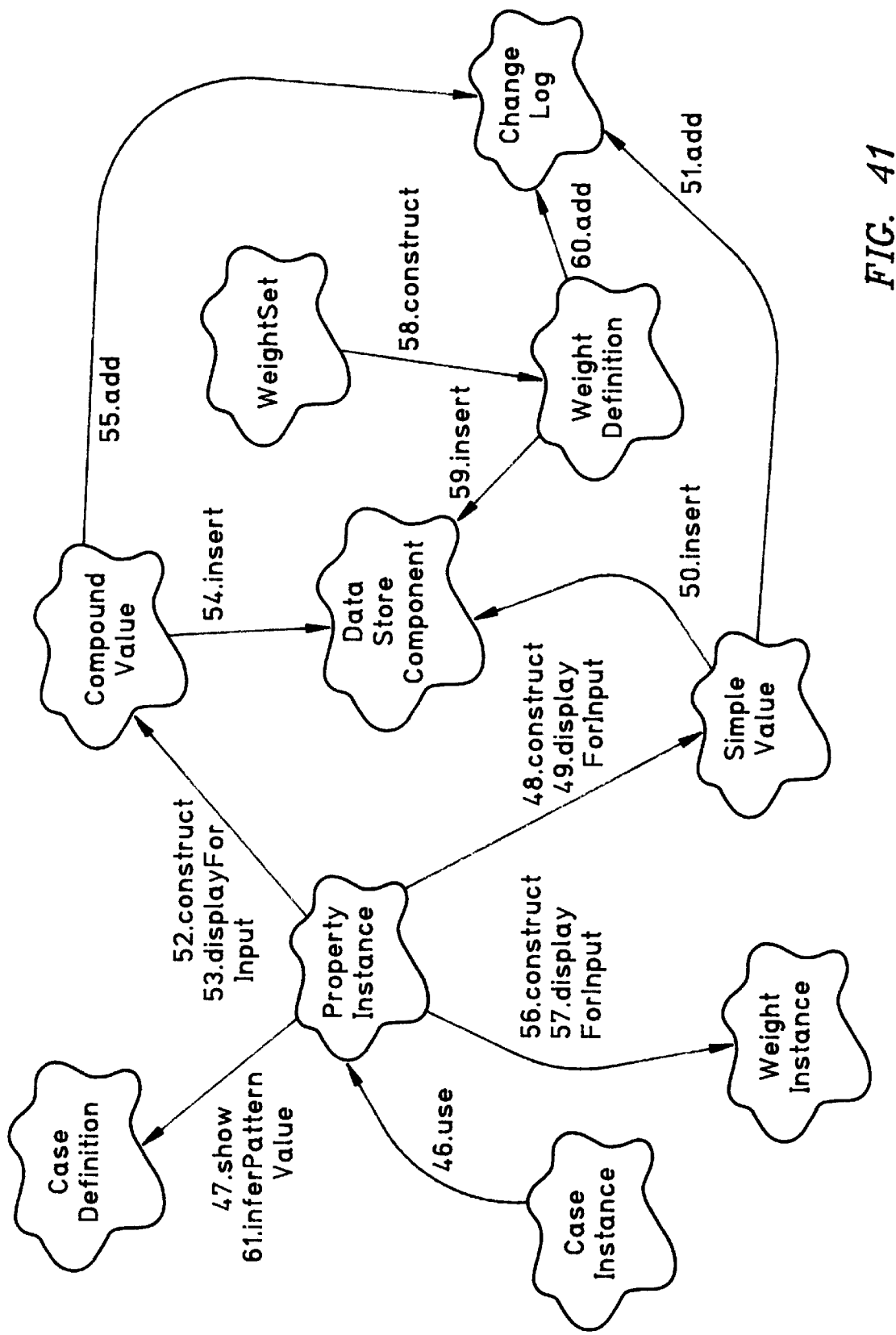
FIG. 41 is a scenario diagram representation of the processing steps executed by the host processor illustrated in FIG. 8 when PropertInstance and Value objects are built.

FIG. 41 is an object-scenario diagram that illustrates building Value objects for the PropertyInstance objects and assigning weights to the properties of those Value objects. The "build Values" processing permits building the Value objects associated with the PropertyInstance objects, constructing the WeightInstance objects, and inferring additional PatternValue objects. First, the system builds Value objects based on the PropertyInstance objects for the CaseDefinition. This processing is represented by "46. use". Next, the allowable property values allowed for the current selected CaseDefinition object are shown to the user ("47. show"). As noted above, such values can be simple values and can be compound values.

First, a SimpleValue object is constructed ("48. construct") and the user is queried for simple value input via the user interface ("49. displayForInput"). If the SimpleValue selected by the user is new, then it is inserted into the Value object using the DataStoreComponent ("50. insert"). Any such changes to the system are recorded in persistent storage (represented by "51. add" on the connecting line from the SimpleValue object cloud to the ChangeLog object cloud).

Next, a CompoundValue is constructed ("52. construct") and the user is queried for compound value input ("53. displayForInput"). If the CompoundValue selected by the user is new, then it is inserted into the Value object ("54. insert") and both it and any other changes are recorded into the ChangeLog ("55. add"). This concludes the BuildValue processing.

The PropertyInstance objects include WeightInstance and WeightDefinition objects and therefore the next portion of processing includes construction of a WeightInstance object ("56. construct") and displaying to the user a prompt to receive weight instance input ("57. displayForInput"). If the WeightInstance input from the user is new, then a new WeightDefinition object is constructed to contain it ("58. construct"). The WeightDefinition object is then stored into persistent data storage using the DataStoreComponent ("59. insert") and then the change log is updated ("60. add"). After the new PropertyInstance, Value, and Weight objects are created or selected, an "infer" processing step checks against the Pattern objects associated with the case definitions to determine if additional PropertyInstance or Value objects can be automatically generated for the query, based on the constraints specified in the CaseDefinition. In this way, the user first provides as many defining values and weights assigned to those values within the user's knowledge, and then the CBR system executes the infer process to check the query against further constraints.

The processing represented by the FIG. 41 object-scenario diagram can be further described by the following table of pseudo-code, which is a continuation of the previous tables of pseudo-code:

TABLE 11

Build Value Property Instance objects.

|  |  |
|---|---|
|  | Repeat as needed: |
| 46 | Use Build Value method on PropertyInstance; |
| 47 | Show Allowable PropertyValue CaseDefinition |
|  | If needed: |
| 48 | Construct SimpleValue; |
| 49 | Display for input "Simple Value"; |
|  | If new |
| 50 | Insert Value DataStoreComponent; |
| 51 | Add ChangeLog; |
|  | If needed: |
| 52 | Construct CompoundValue; |
| 53 | Display for input "Compound Value"; |
|  | If new |
| 54 | Insert Value DatastoreComponent; |
| 55 | Add ChangeLog; |
|  | End of Repeat Build Value PropertyInstance; |
| 56 | Construct WeightInstance; |
| 57 | Display for input "Weight Instance"; |
|  | If new |
| 58 | Construct WeightDefinition object; |
| 59 | Insert WeightDefinition DataStoreComponent; |
| 60 | Add ChangeLog; |
|  | If needed: |
| 61 | Infer PatternValue from CaseDefinition; |
|  | End Construct Property Instance Repeat (see Table 10); |

Figure 42:
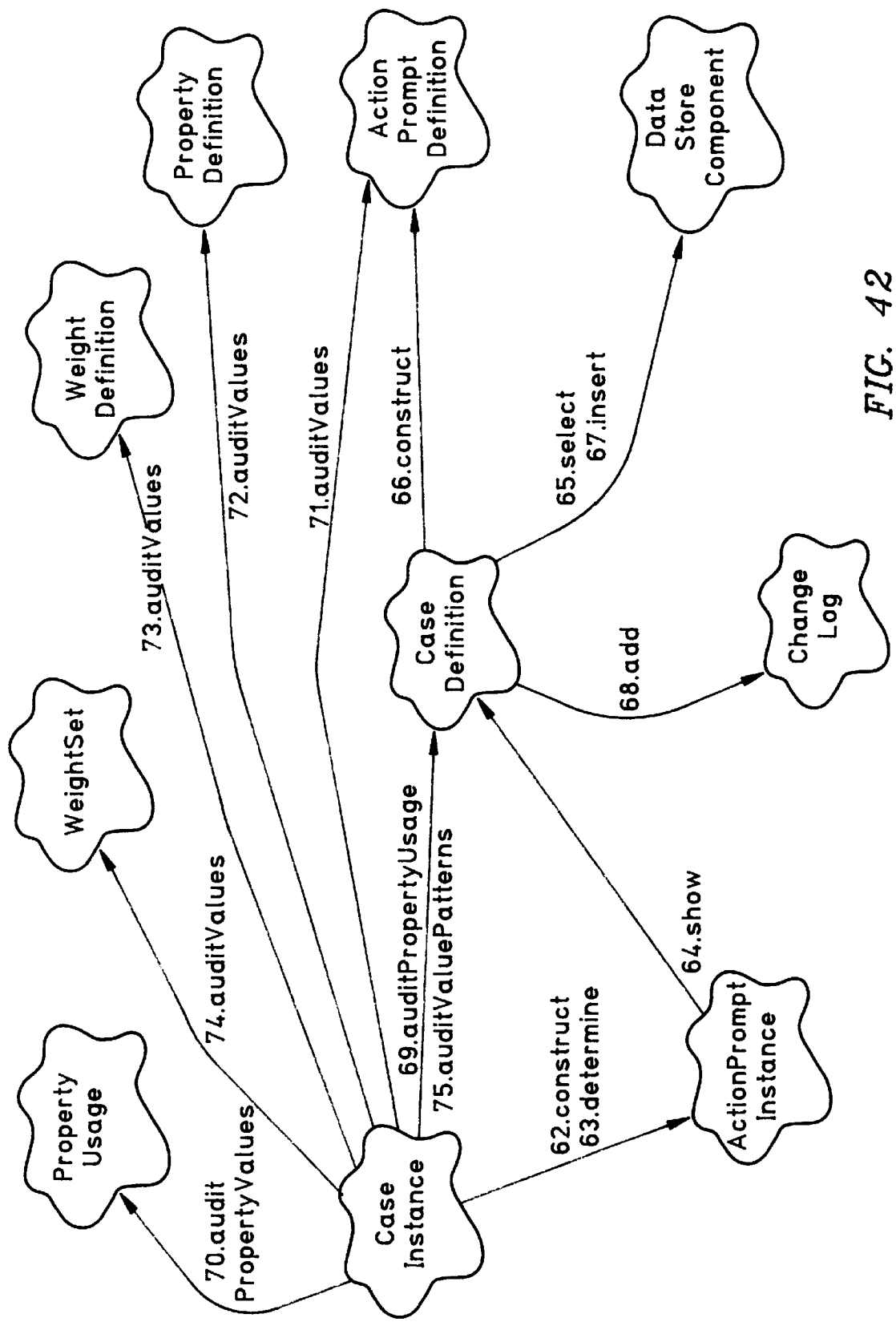
FIG. 42 is a scenario diagram representation of the processing steps executed by the host processor illustrated in FIG. 8 when ActionPrompt objects are created and Audit methods are performed.

The next sequence of case instance definition processing is to create ActionPrompt and Audit objects and to audit the case instance that has been built. FIG. 42 is an object-scenario diagram that illustrates such processing.

In the action prompt/audit processing, ActionPrompt objects are first constructed ("62. construct") and allowable ActionPrompt objects are determined ("63. determine"). The ActionPrompt objects available from the CaseDefinition are shown to the user ("64. show"), who then makes a selection ("65. select"). The selected ActionPrompt objects are then constructed using the ActionPromptDefinition ("66. construct") and are inserted into persistent storage using the DataStoreComponent in ("67. insert"). Modifications are inserted into the ChangeLog ("68. add").

A series of Audit methods are performed to ensure valid property definition components. An audit call is made on the PropertyUsage attributes for the selected CaseDefinition ("69. auditPropertyUsage"), an audit is called on PropertyValue attributes for the PropertyUsage ("70. auditPropertyValues"), and an audit is called on ActionPrompt for the ActionPromptDefinition ("71. auditValues"). An audit also is called on the PropertyDefinition for the CaseInstance ("72. auditValues"), an audit is called on the WeightDefinition attributes ("73. auditValues"), an audit is called on the WeightSet ("74. auditValues"), and an audit is called on the PatternCase objects ("75. auditValuePatterns").

The processing represented by the FIG. 42 object-scenario diagram can be further described by the following table of pseudo-code, which is a continuation of the previous table of pseudo-code:

TABLE 12

Create Action Prompts and Audits.

|    |    |
|----|----|
|    | Repeat as needed: |
| 62 | Construct ActionPromptInstance object; |
| 63 | Determine ActionPromptInstance; |
| 64 | Show ActionPromptDefinitions CaseDefinition; |
| 65 | Select ActionPromptDefinition DataStoreComponent; |
|    | If new |
| 66 | Construct ActionPromptDefinition; |
| 67 | Insert ActionPromptDefinition DataStoreComponent; |
| 68 | Add ChangeLog; |
|    | End Construct Action Prompt Instance Repeat; |
| 69 | Audit PropertyUsage CaseDefinition; |
| 70 | Audit PropertyValues PropertyUsage; |
| 71 | Audit Values ActionPromptDefinition; |
| 72 | Audit Values PropertyDefinition; |
| 73 | Audit Values WeightDefinition; |
| 74 | Audit Set Values WeightSet; |
| 75 | Audit Value Patterns CaseDefinition; |

Figure 43:
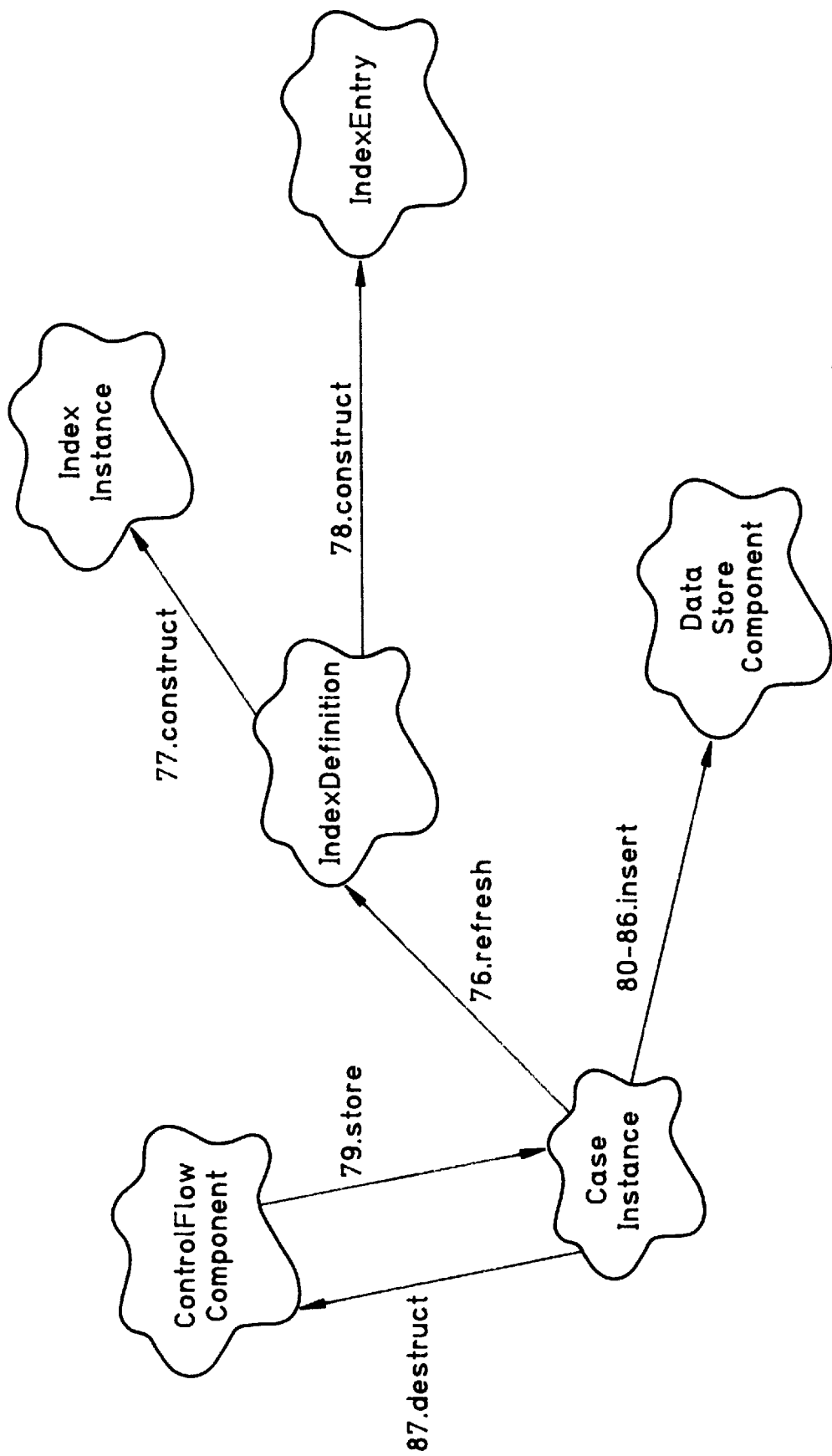
FIG. 43 is a scenario diagram representation of the processing steps executed by the host processor illustrated in FIG. 8 when IndexDefinition objects are refreshed and a CaseInstance object is stored.

FIG. 43 is an object-scenario diagram that represents the next sequence of processing steps, which creates refresh indexes and stores the CaseInstance. In the refresh index/store case instance processing, the IndexDefinition objects are refreshed ("76. refresh") by constructing Index objects ("77. construct") and IndexEntry objects ("78. construct"). The ControlFlowComponent next causes the CaseInstance to be stored ("79. store").

The IndexDefinition objects must be refreshed whenever the referenced items are changed or new items added. After the refresh, each element of the newly created CaseInstance objects must be stored in the data base with an insert operation ("80. insert"). The PropertyInstance ("81. insert") and associated Value and WeightInstance objects must be stored ("insert" items 82 and 83 of the diagram). Next, the ActionPromptInstance, IndexInstance, and IndexInstance objects for each CaseInstance also are stored in the data base, as represented by the "insert" items numbered 84, 85, and 86, respectively. Finally, the "build Case Instance" processing includes destructing each one of the objects not needed after the data storage, which is collectively indicated by the legend "87. destruct". This concludes the case instance definition processing.

The processing represented by the FIG. 43 object-scenario diagram can be further described by the following table of pseudo-code, which is a continuation of the previous tables of pseudo-code:

TABLE 13

Refresh Indexes: Store Case Instance.

|    |    |
|----|----|
|    | Repeat as needed: |
| 76 | Refresh IndexDefinition; |
| 77 | Construct IndexInstance; |
| 78 | Construct IndexEntry; |
|    | End Refresh IndexDefinition Repeat; |
| 79 | Store CaseInstance; |
| 80 | Insert CaseInstance DataStoreComponent; |
| 81 | Insert PropertyInstance DataStoreComponent; |
| 82 | Insert Values DataStoreComponent; |
| 83 | Insert WeightInstance DataStoreComponent; |
| 84 | Insert ActionPromptInstance DataStoreComponent; |
| 85 | Insert IndexInstance DataStoreComponent; |
| 86 | Insert IndexEntryInstance DataStoreComponent; |
|    | End StoreCaseInstance; |
| 87 | Destruct objects; |
|    | End Build CaseInstance. |

This concludes the object-scenario diagrams for the build case definition processing. The next sequence of processing operations for the CBR system is to receive and evaluate query input from the user.

Query Processing

Figure 44:
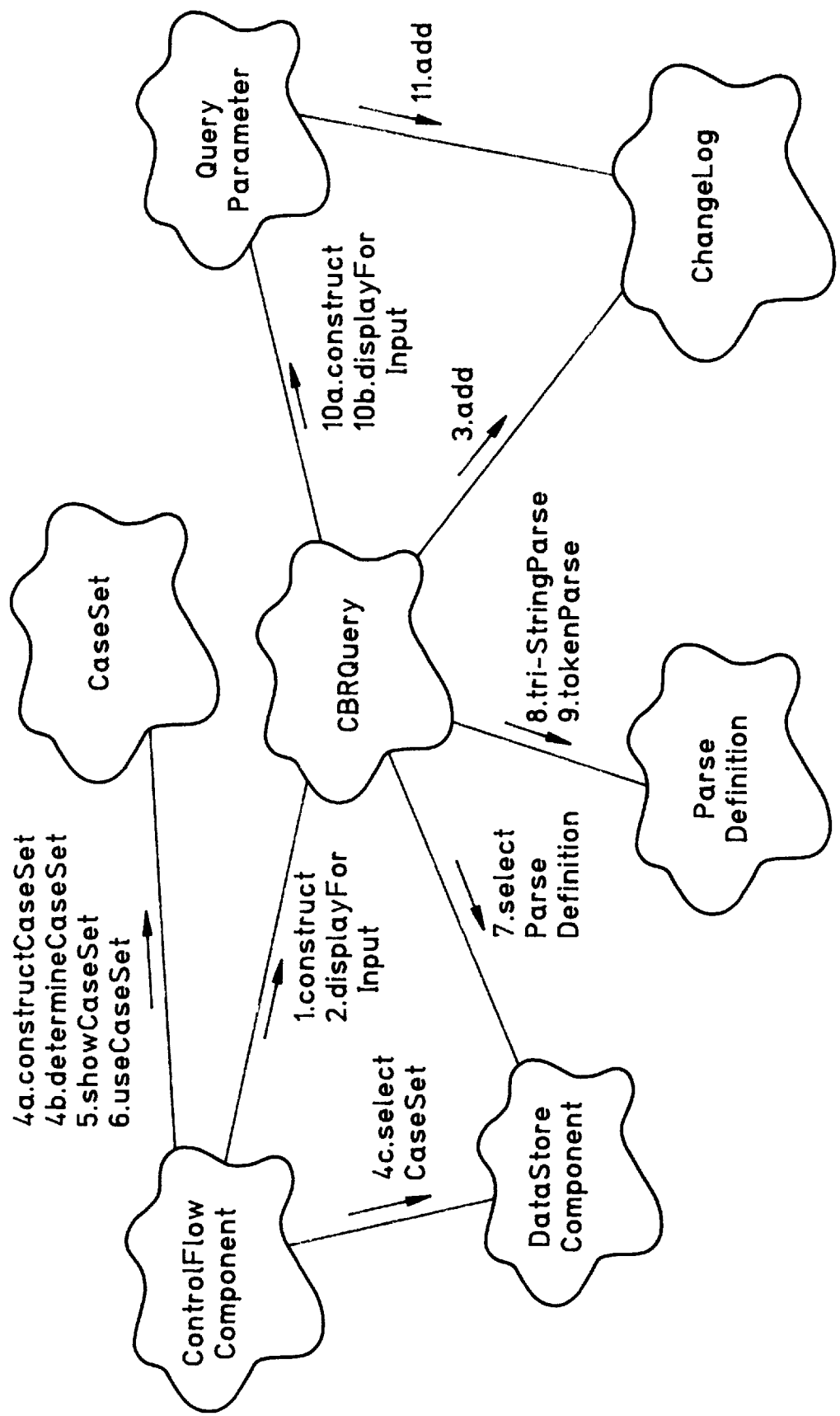
FIG. 44 is a scenario diagram representation of the processing steps executed by the host processor illustrated in FIG. 8 when a single CBR Query is received from a user.

The object interactions for processing a query are illustrated in FIGS. 44–49. Such processing applies a received query against the case base and attempts to identify a solution set of case instances FIG. 44 is a top-level object-scenario diagram for the framework implemented in the computer system illustrated in FIG. 8. FIG. 44 is a scenario that shows the resulting actions that are performed in the framework mechanism for processing of a single query, the simplest type of query that can be posed by the framework user. FIG. 44 assumes that the framework has already been extended so as to instantiate a CBR Session object and a ControlFlowComponent, so that the proper data structures are active and performing the necessary behaviors for the CBR system processing to proceed.

FIG. 44 shows that the processing of the extended framework starts with the creation of a CBRQuery object, indicated by the connecting line from the object cloud ControlFlowComponent to the object cloud CBRQuery with the arrow labelled "1. construct". Those skilled in the art will understand that this is a representation for the creation by the ControlFlowComponent object of a CBRQuery object with all data, attributes, and behaviors necessary to make the CBRQuery object complete. In the preferred embodiment, the framework is implemented in a computer system with the C++ programming language. Those skilled in the art will understand that the creation process is typically a C++ constructor that creates C++ objects.

After the CBRQuery object is created, a determines method can be used to assist the user in selecting a query that was previously built and saved by the DataStoreComponent. For such processing, a list of queries from the DataStoreComponent can be provided to the user, from which the user can select one as an initial query.

As noted above, the computer system receives interactive information from the user in response to display prompts. The legend "2. displayForInput" on the FIG. 44 connecting line from the object cloud ControlFlowComponent to the object cloud CBRQuery indicates that the second processing step is to display a user prompt and prepare to receive a query. That is, in response to the display prompt, a problem will be posed by the user to the CBR system, for matching against the case base and generation of a solution, from either the query retrieved from the DataStoreComponent or a new query fashioned by the user.

In response to the received CBR query, the CBRQuery object is inserted to the ChangeLog object for data storage. This step is indicated by the connecting line from the CBRQuery object cloud to the ChangeLog object cloud with the arrow labelled "3. add". Next, the case base to be used is selected by the user. This processing is indicated by the arrows labelled "4a. constructCaseSet" and "4b. determineCaseSet" on the connecting line from the ControlFlowComponent object cloud to the CaseSet object cloud and the arrow labelled "4c. selectCaseSet" on the connecting line from the ControlFlowComponent object cloud to the DataStoreComponent object cloud. The selected case base is displayed to the user, indicated by the legend "5. showCaseSet", and then is instantiated for use by the CBR system, indicated by the legend "6. useCaseSet" on the connecting line from the ControlFlowComponent object cloud to the CaseSet object cloud.

Once the case base has been selected, the next step is to select the parsing definition that will be used, according to the input start-up processing determined by the framework user. This step is represented by the arrow labelled "7. SelectParseDefinition" on the connecting line from the CBRQuery object cloud to the DataStoreComponent object cloud. FIG. 30 next shows parsing in the case that both the tri-string parse and token parse have been selected. Accordingly, the next processing steps are indicated as "8. tri-StringParse" and "9. tokenParse" on the connecting line from the CBRQuery object cloud to the ParseDefinition object cloud. It should be understood that selection of a parsing definition is not necessarily needed, and one or both of these processing steps may be skipped. After the parse definitions have been settled, the next step is to receive the user query. This step is represented in FIG. 44 by the legends "10a. construct" and "10b. displayForInput" on the connecting line from the CBRQuery object cloud to the QueryParameter object cloud. Finally, the received data input (query) is placed into the appropriate data objects with the "11. add" label on the connecting line from the QueryParameter object cloud to the ChangeLog object cloud.

The processing represented by FIG. 44 can be further described by the following table of pseudo-code, in which code line numbers are provided to indicate ordering and generally correspond to the numbered legends on the connecting lines illustrated in FIG. 44:

TABLE 14

Pseudo-code for Single Query.

| | |
|---|---|
| | Repeat as needed to build/evaluate a query: |
| 1 | If new query //(e.g., first iteration) |
| | Construct CBRQuery; |
| | If needed: |
| 1a | Determine CBRQuery; |
| 1b | Select CBRQuery DataStoreComponent; |
| 1c | Show List CBRQuery; |
| 2 | Display for input "CBR Query"; |
| 3 | Add ChangeLog; |
| | If new Query |
| 4a | Construct CaseSet; |
| | If needed: |
| 4b | Determine CaseSet; |
| 4c | Select CaseSet DataStoreComponent; |
| 5 | Show List CaseSet; |
| | If needed: |
| 6 | Use Set CaseSet (in accordance with user selection); |
| | If needed: |
| 7 | Select ParseDefinition DataStoreComponent; |
| | If needed: |
| 8 | Tri-string Parse the ParseDefinition; |
| | If needed: |
| 9 | Token Parse the ParseDefinition; |
| | If needed: |
| 10a | Construct QueryParameter(s); |
| 10b | Display for input "Query Parameters"; |
| 11 | Add ChangeLog; |

Figure 45:
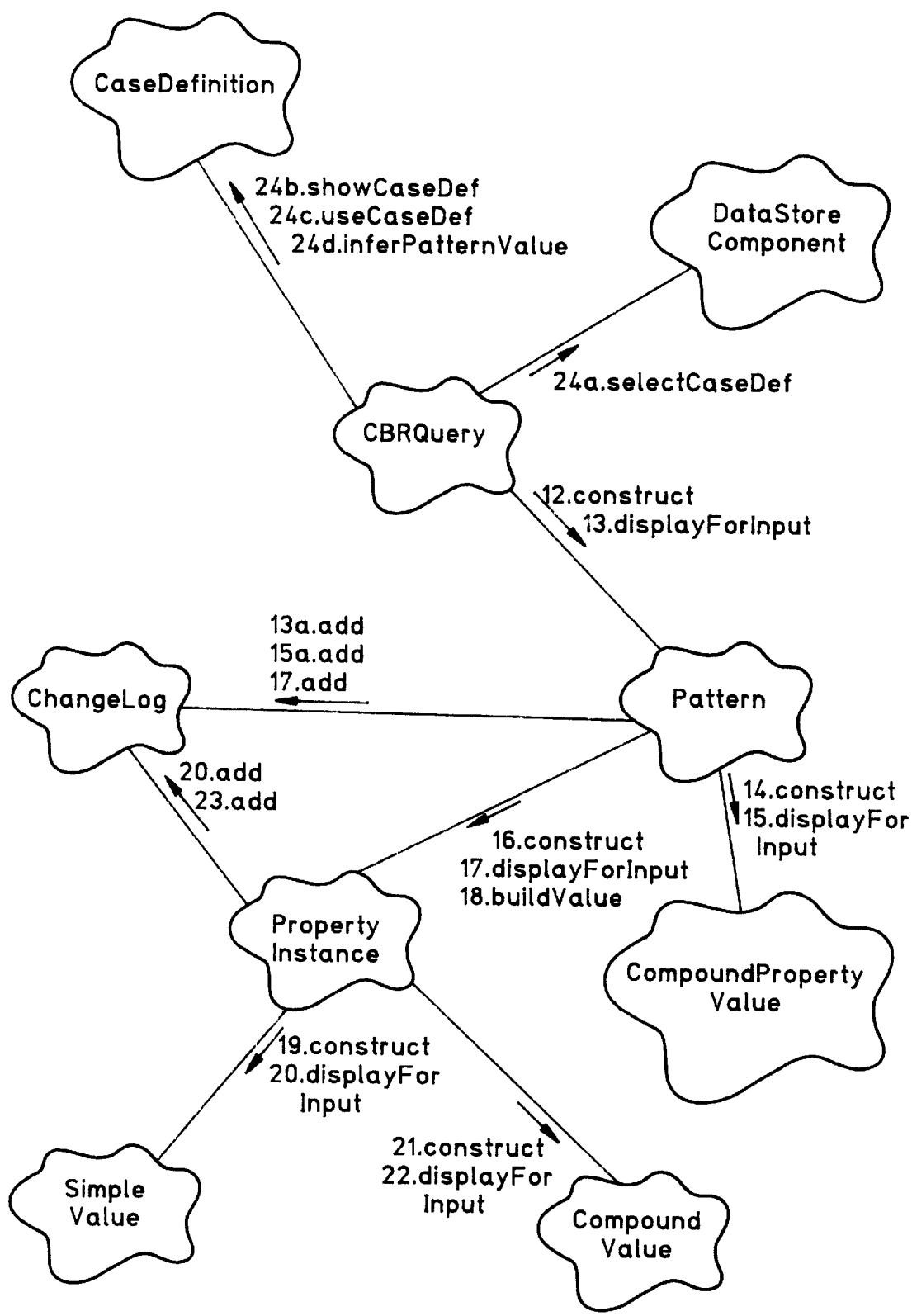
FIG. 45 is a scenario diagram representation of the processing steps executed by the host processor illustrated in FIG. 8 when building a pattern for the CBR Query.

The next sequence of processing steps in responding to a single query are represent the object-scenario diagram of FIG. 45. Proceeding from the last illustrated step in FIG. 44, the processing illustrated in FIG. 45 shows building a pattern for use by the query engine, which begins with receiving property value and property instance selections from the framework user. Such processing involves the step of displaying a pattern prompt to the user, represented by the legends "12. construct" and "13. displayForInput" on the connecting line from the CBRQuery object cloud to the Pattern object cloud. As a result of such processing, the system displays input screens for the user.

As part of providing the input pattern, the system next constructs a CompoundProtpertyValue object and receives the user selection of the appropriate properly value attributes. This processing is represented in FIG. 45 by the arrow from the Pattern object cloud to the CompoundPropertyValue object cloud labelled with "14. construct" and "15. displayForInput". The received compound property value selection is added to the data base as a ChangeLog data object, as represented by the legend "15a. add" on the connecting line from the Pattern object cloud to the ChangeLog object cloud. After the property value input is received, the next processing involves receiving a selected property instance. This processing is represent by the legends "16. construct", "17. displayForInput", and "18. buildValue" on the connecting line from the Pattern object cloud to the PropertyInstance object cloud. The build value attributes are added to the data base and the inputs are recorded into the ChangeLog object, as indicated by the "17a. add" legend on the connecting line from the Pattern object cloud to the ChangeLog object cloud.

FIG. 45 shows processing assuming that both simple value and compound value selections are received, but it should be understood that both selections are not necessarily needed. Accordingly, the next processing steps are shown as the arrows labelled "19. construct" and "20. displayForInput" on the connecting line from the PropertyInstance object cloud to the SimpleValue object cloud, and also as the arrows labelled "21. construct" and "22. displayForInput" on the connecting line from the PropertyInstance object cloud to the CompoundValue object cloud. Depending on the responses received from the user, the system next adds the simple value selection and compound value selection to the data base, as indicated by the respective legends "20. add" and "23. add" on the connecting line from the PropertyInstance object cloud to the ChangeLog object cloud.

Finally, the CBRQuery object implements selection of the CaseDefinition attributes after retrieving a menu of possibilities from the data base. This processing is represented by the legend "24a. selectCaseDeF" on the connecting line from the CBRQuery object cloud to the DataStoreComponent object cloud and the legends "24b. showCaseDef", "24c. useCaseDef", and "24d. inferPatternValue" on the connecting line from the CBRQuery object cloud to the CaseDefinition object cloud. This processing represents display of the case definitions to the user for selection.

The processing represented by FIG. 45 can be further described by the following table of pseudo-code, which is a continuation of the previous table of pseudo-code:

TABLE 15

Pseudo-code for Build Pattern-type CBR Query.

| | |
|---|---|
| | If new Build Pattern |
| 12 | Construct Pattern; |
| | Repeat as needed: |
| 13 | Display for input "Pattern"; |
| | If new PropertyValue |
| 14 | Construct CompoundPropertyValue; |
| 15 | Display for input "Compound Property Value"; |
| 15a | Add ChangeLog; |
| | If new PropertyInstance |
| 16 | Construct PropertyInstance; |
| 17 | Display for input "Property Instance"; |
| 17a | Add ChangeLog; |
| 18 | Build PropertyValueInstance; |
| | If needed: |
| 19 | Construct SimpleValue; |
| 20 | Display for input "Simple Value"; |
| 20a | Add ChangeLog; |
| | If needed: |
| 21 | Construct CompoundValue; |

TABLE 15-continued

Pseudo-code for Build Pattern-type CBR Query.

| | |
|---|---|
| 22 | Display for input "Compound Value"; |
| 23 | Add ChangeLog; |
| 24a | Select CaseDefinitions DataStoreComponent for each user; |
| 24b | Show CaseDefinitions CaseSet; |
| 24c | Use Definition CaseDefinition; |
| 24d | Infer PatternValue CaseDefinition; |
| 13a | Add ChangeLog; |
| | End BuildPattern repeat; |

Figure 46:
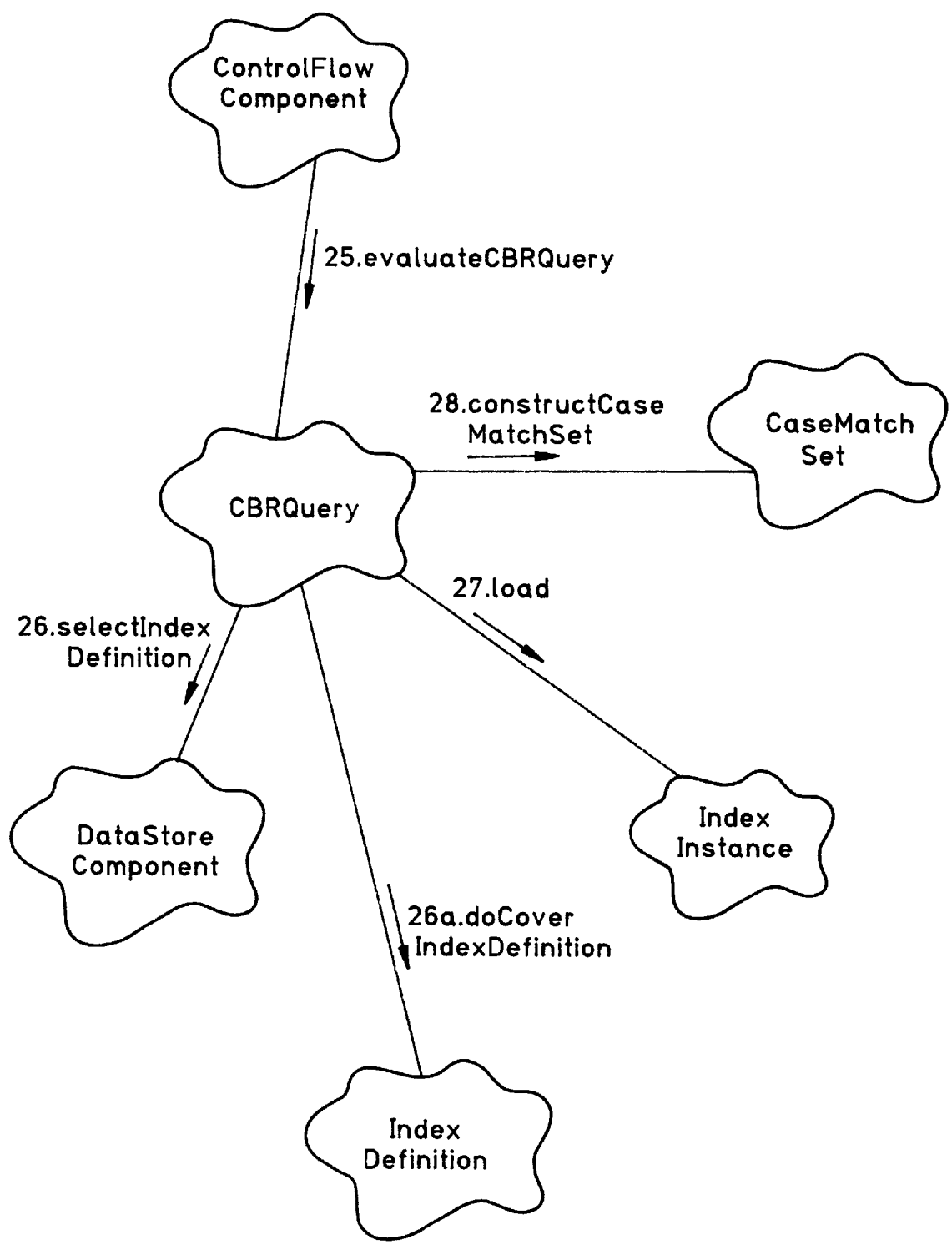
FIG. 46 is a scenario diagram representation of the processing steps executed by the host processor illustrated in FIG. 8 when a received CBR Query is evaluated.

After the query pattern has been built, the next processing is the evaluation of the query. The evaluation processing is represented by the object-scenario diagram of FIG. 46. Proceeding from the last illustrated step in FIG. 31, the processing illustrated in FIG. 46 shows the next step of "25. evaluateCBRQuery" on the connecting line from the ControlFlowComponent object cloud to the CBRQuery object cloud. In response, the system next selects the index definitions to be used in the evaluation for the case definitions that will be searched. This step is represented by the legend "26. selectIndexDefinition" on the connecting line from the CBRQuery object cloud to the DataStoreComponent object cloud. Next, the system checks to determine if the index definition being used contains information that will be useful and will speed the search of the case definitions. This step is indicated by the arrow labelled "26a. doCoverIndexDefinition" on the connecting line from the CBRQuery object cloud to the IndexDefinition object cloud.

If the index definition is useful, and if the index definition is not already retrieved, then the appropriate index objects are loaded into memory. That is, the IndexDefinition objects are constructed and instantiated. Loading the index entries into the CBR system memory is indicated by the legend "27. load" on the connecting line from the CBRQuery object cloud to the IndexInstance object cloud. If the present evaluation is the first iteration of processing for the query, then a CaseMatchSet object is constructed. This is represented by the arrow labelled "28. constructCaseMatchSet" is on the connecting line from the CBRQuery object cloud to the CaseMatchSet object cloud. The CaseMatchSet will serve as a collection object to contain matches located in the case base.

The processing represented by FIG. 46 can be further described by the following table of pseudo-code, which is a continuation of the previous tables of pseudo-code:

TABLE 16

Pseudo-code for Evaluate CBR Query.

| | |
|---|---|
| 25 | Evaluate CBRQuery: |
| 26 | Select IndexDefinition DataStoreComponent //(for Case Definitions Used); |
| | For selected Component |
| 26a | DoCover IndexDefinition; |
| | If covers and not loaded //(per CBRSession) |
| 27 | Load InternalIndexInstance; |
| | If new query |
| 28 | Construct CaseMatchSet; |

Figure 47:
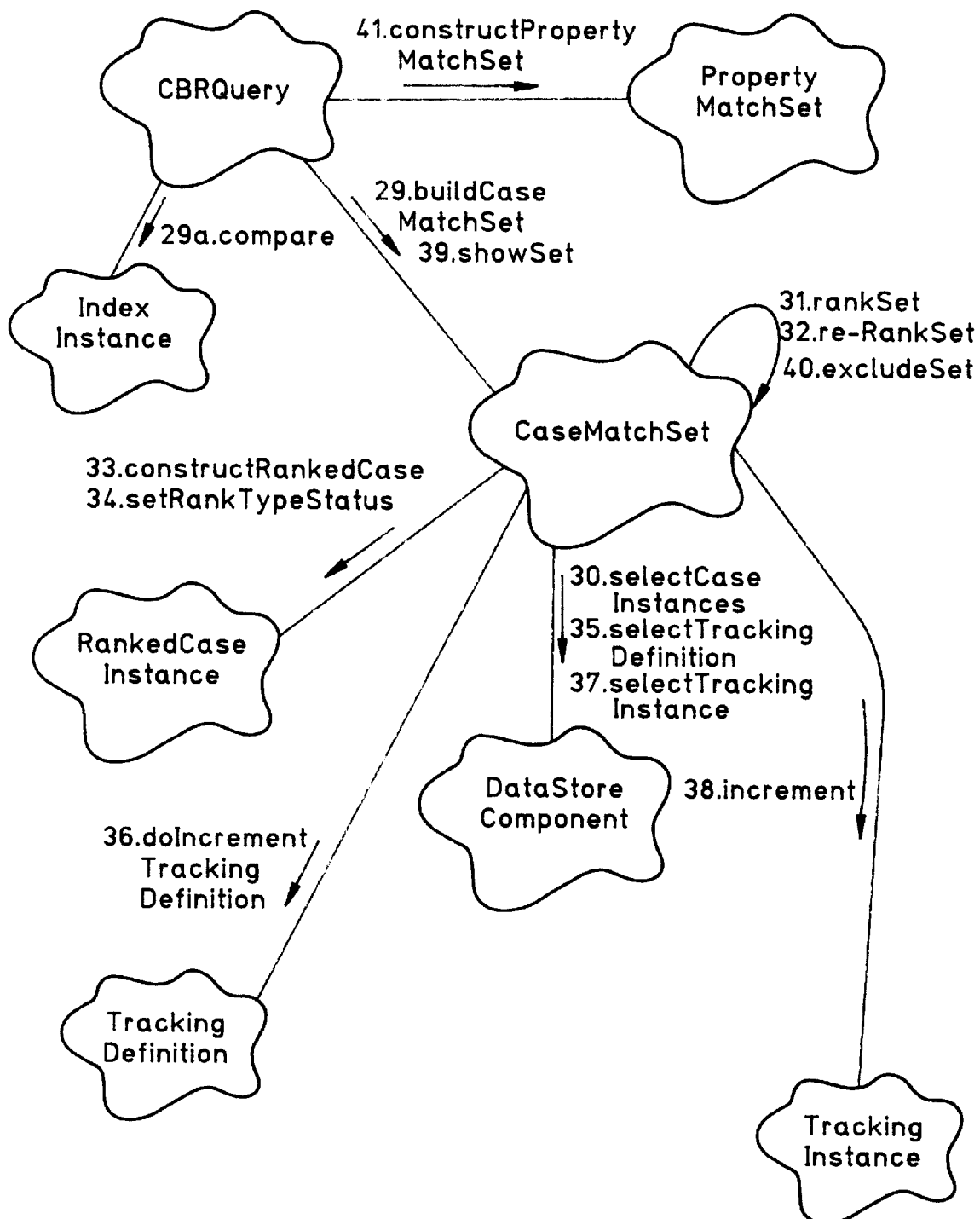
FIG. 47 is a scenario diagram representation of the processing steps executed by the host processor illustrated in FIG. 8 when a CaseMatch Set is built.

FIG. 47 illustrates the processing of a CaseMatchSet after it is constructed. The step of building the CaseMatchSet is represented by the legend "29. buildCaseMatchSet" on the connecting line from the CBRQuery object cloud to the CaseMatchSet object cloud.

Initially, the CaseMatchSet contains the results of selecting CaseInstance objects that match the property values defined in the Pattern object or whose description matches the description in the Pattern. This processing is represented by the legend "29a. compare" on the connecting line from the CBRQuery object cloud to the IndexInstance object cloud and the legend "30. selectCaseInstances" on the connecting line from the CaseMatchSet object cloud to the DataStoreComponent object cloud. Next, the selected CaseInstance objects are ranked for closeness to the Pattern searched. If the CaseInstance has not changed (that is, processing is for another iteration on a previously searched case), then the CaseInstance objects are re-ranked. This processing is represented by the legends "31. rankSet" and "32. re-RankSet" on the connecting, line from the CaseMatchSet object cloud back onto itself.

Ranking involves first constructing a RankedCaseInstance object to contain the rank information for the CaseInstance of the CaseMatchSet being processed. Therefore, for each selected CaseInstance, a check is made to determine if it is a new CaseInstance for evaluation. If the CaseInstance is new, a RankedCaseInstance object is constructed. Each CaseInstance is scored according to the Rank or re-Rank method of the CaseMatchSet and the results are stored in the RankedCaseInstance. The construction processing is represented by the legend "33. constructRankedCase" and the rank processing is represented by the legend "34. setRankTypeStatus" on the connecting line from the CaseMatchSet object cloud to the RankedCaseInstance object cloud.

Next, tracking definitions are checked to see if any apply to the case set. Therefore, the TrackingDefinition objects are iteratively selected, as represented by the arrows labelled "35. selectTrackingDefinition" and "36. doIncrementTrackingDefinition" on the connecting lines from the CaseMatchSet object cloud to the DataStoreComponent cloud and the TrackingDefinition cloud, respectively. If any tracking definitions apply, the corresponding tracking instances are iteratively selected, as represented by the arrows labelled "37. selectTrackingInstance" and "38. increment" on the connecting lines from the CaseMatchSet object cloud to the DataStoreComponent and TrackingInstance object clouds, respectively.

After the tracking instance processing, the ordered CaseMatchSet is displayed to the user to provide an opportunity to select case instances for exclusion from further processing. The display is represented by the legend "39. showSet" on the connecting line from the CBRQuery object cloud to the CaseMatchSet object cloud. If at least one solution to the query is not found, that is, none has scored above a specified threshold, then the user can exclude cases from the match set and repeat the evaluation or the user can use a PropertyMatchSet object (which also is constructed on the first iteration of evaluation processing) to help determine which properties will most quickly lead to a solution and to find values for those properties. This processing is represented in FIG. 47 by the arrow labelled "40. excludeSet" from the CaseMatchSet object cloud back onto itself and the arrow labelled "41. constructPropertyMatchSet" on the connecting line from the CBRQuery object cloud to the PropertyMatchSet object cloud. The PropertyMatchSet will serve as a collection object to contain properties that could be added to the pattern with associated values to further constrain the search.

The processing represented by FIG. 47 can be further described by the following table of pseudo-code, which is a continuation of the previous tables of pseudo-code:

TABLE 17

Pseudo-code for Build Set Case Match Set.

| | |
|---|---|
| 29 | Build CaseMatchSet: |
| | If new CaseInstances because of new or updated Pattern |
| 29a | Compare IndexInstance OR |
| 30 | Select CaseInstance(s) DataStoreComponent |
| | //(that matches some part of the |
| | Pattern and Description); |
| | If new Case |
| 31 | Rank Set CaseMatchSet |
| | else |
| 32 | Re-rank Set CaseMatchSet; |
| | For each case: |
| | If new Case |
| 33 | Construct RankedCaseInstance; |
| 34 | Set Rank, Type, Status RankedCaseInstance; |
| 35 | Select TrackingDefinition DataStoreComponent |
| | //(for the CaseInstance used); |
| 36 | DoIncrement TrackingDefinition; |
| 37 | Select TrackingInstance DataStoreComponent |
| | //(for the CaseInstance used); |
| | If should increment |
| 38 | IncrementTrackingInstance; |
| 39 | Show Set CaseMatchSet; |
| | If no solution yet |
| 40 | Exclude CaseMatchSet //(those indicated by the user); |
| 41 | Construct PropertyMatchSet; |

Figure 48:
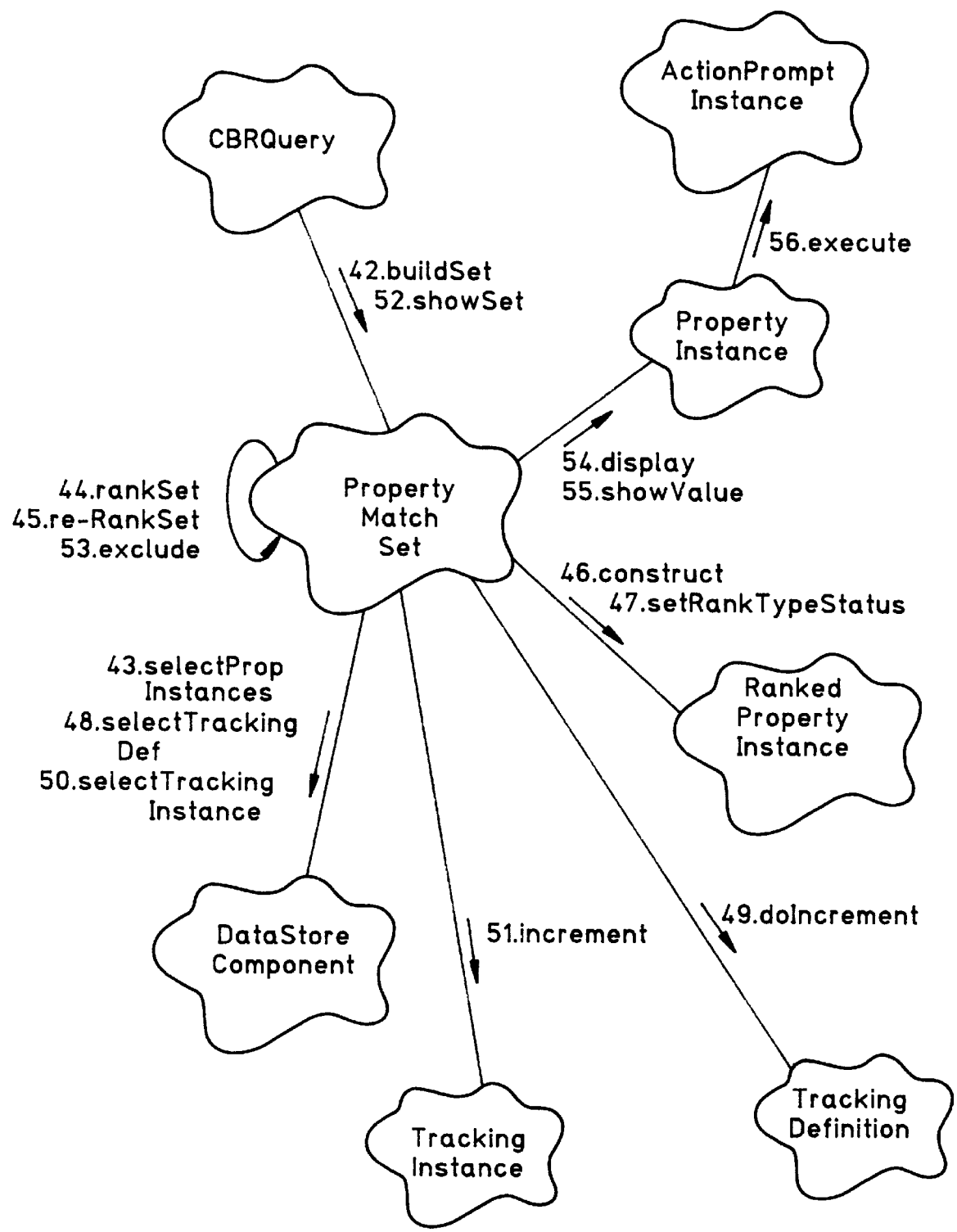
FIG. 48 is a scenario diagram representation of the processing steps executed by the host processor illustrated in FIG. 8 when a PropertyMatch Set is built.

FIG. 48 illustrates CBR system processing when a PropertyMatchSet object is built as part of query evaluation. The building of a PropertyMatchSet object is represented by the legend "42. buildSet" on the connecting line from the CBRQuery object cloud to the PropertyMatchSet object cloud. The property instances contained in the PropertyMatchSet are selected from the case instances in the CaseMatchSet that do not have values assigned to them in the Pattern that is being evaluated. This processing step is represented by the arrow labelled "43. selectPropInstances" on the connecting line from the PropertyMatchSet object cloud to the DataStoreComponent object cloud.

After PropertyInstance objects are selected, they are ranked by the rank method according to the order in which they have the most impact on finding a CaseInstance object solution to the query. If the CaseInstance is new (that is, processing is for an initial iteration), then the CaseInstance objects of the PropertyMatchSet are ranked. On subsequent iterations, they are re-ranked. Such processing is represented in FIG. 34 by the legends "44. rankSet" and "45. re-RankSet" on the connecting line from the PropertyMatchSet object cloud back onto itself.

As with the CaseMatchInstance processing, ranking involves first constructing an object to contain the rank information. Therefore, for each CaseInstance object selected with a Property, a check is made to determine if it is a new CaseInstance. If the CaseInstance is new, a RankedPropertyInstance object is constructed. Each PropertyInstance object is scored according to the Rank or re-Rank method of the PropertyMatchSet and the results are stored in the RankedPropertyInstance. The construction processing is represented by the legend "46. construct" and the rank processing is represented by the legend "47. setRankTypeStatus" on the connecting line from the PropertyMatchSet object cloud to the RankedPropertyInstance object cloud. The set method indicates the ranking and status of each PropertyInstance in the PropertyMatchSet. Each property instance also is checked for specified tracking definitions. If any tracking definitions apply, the corresponding tracking instance count is incremented. This processing is represented by the legends "48. selectTrackingDef""49. doIncrement, "50. selectTrackingInstance", and "51. increment" on the connecting lines from the PropertyMatchSet object cloud to, respectively, the object clouds DataStoreComponent, TrackingDefinition, DataStoreComponent, and TrackingInstance.

After the PropertyMatchSet has been ranked it is displayed to the user to provide an opportunity to select property instances to be excluded from further processing. In FIG. 48 the display step is represented by the legend "52. showSet" on the connecting line from the CBRQuery object cloud to the PropertyMatchSet object cloud and the resulting exclusion is represented by the legend "53. exclude" on the connecting line from the PropertyMatchSet object cloud back onto itself. The user might want to display the property instances, processing that is represented by the arrow labelled "54. display" from the PropertyMatchSet object cloud to the PropertyInstance object cloud. After display, the user can proceed with viewing the property instance values and/or can execute action prompt instances related to the Property object. Such processing is intended to facilitate the user adding information to the Pattern when iterative processing returns to the build pattern portion of the build pattern/evaluate query processing loop of the CBR system. The viewing values processing is represented by the arrow labelled "55. showValue" from the PropertyMatchSet object cloud to the PropertyInstance object cloud and the action prompt processing is represented by the arrow labelled "56. execute" from the PropertyInstance object cloud to the ActionPromptInstance object cloud.

The processing represented by FIG. 48 can be further described by the following table of pseudo-code, which is a continuation of the previous tables of pseudo-code:

TABLE 18

Pseudo-code for Build Property Match Set.

| | |
|---|---|
| 42 | Build PropertyMatchSet: |
| | If new CaseInstance |
| 43 | Select PropertyInstances DataStoreComponent //(for indicated case instances); |
| | If new CaseInstance |
| 44 | Rank Set PropertyMatchSet |
| | else |
| 45 | Re-rank Set PropertyMatchSet; |
| | For each Property: |
| | If new CaseInstance |
| 46 | Construct RankedPropertyInstance; |
| 47 | Set Rank, Type, Status RankedPropertyInstance; |
| 48 | Select TrackingDefinition DataStoreComponent //(for property instance used); |
| 49 | DoIncrement TrackingDefinition; |
| | If should increment |
| 50 | Select TrackingInstance DataStoreComponent //(for property instances used); |
| 51 | Increment TrackingInstance; |
| 52 | Show Set PropertyMatchSet; |
| 53 | Exclude PropertyMatchSet //(those indicated by user); |
| 54 | Display PropertyInstance //(if indicated by user); |
| | If displayed user can: |
| 55 | Show ValuePropertyInstance; |
| | If prompt level is sufficient |
| 56 | Execute ActionPromptInstance; |

Figure 49:
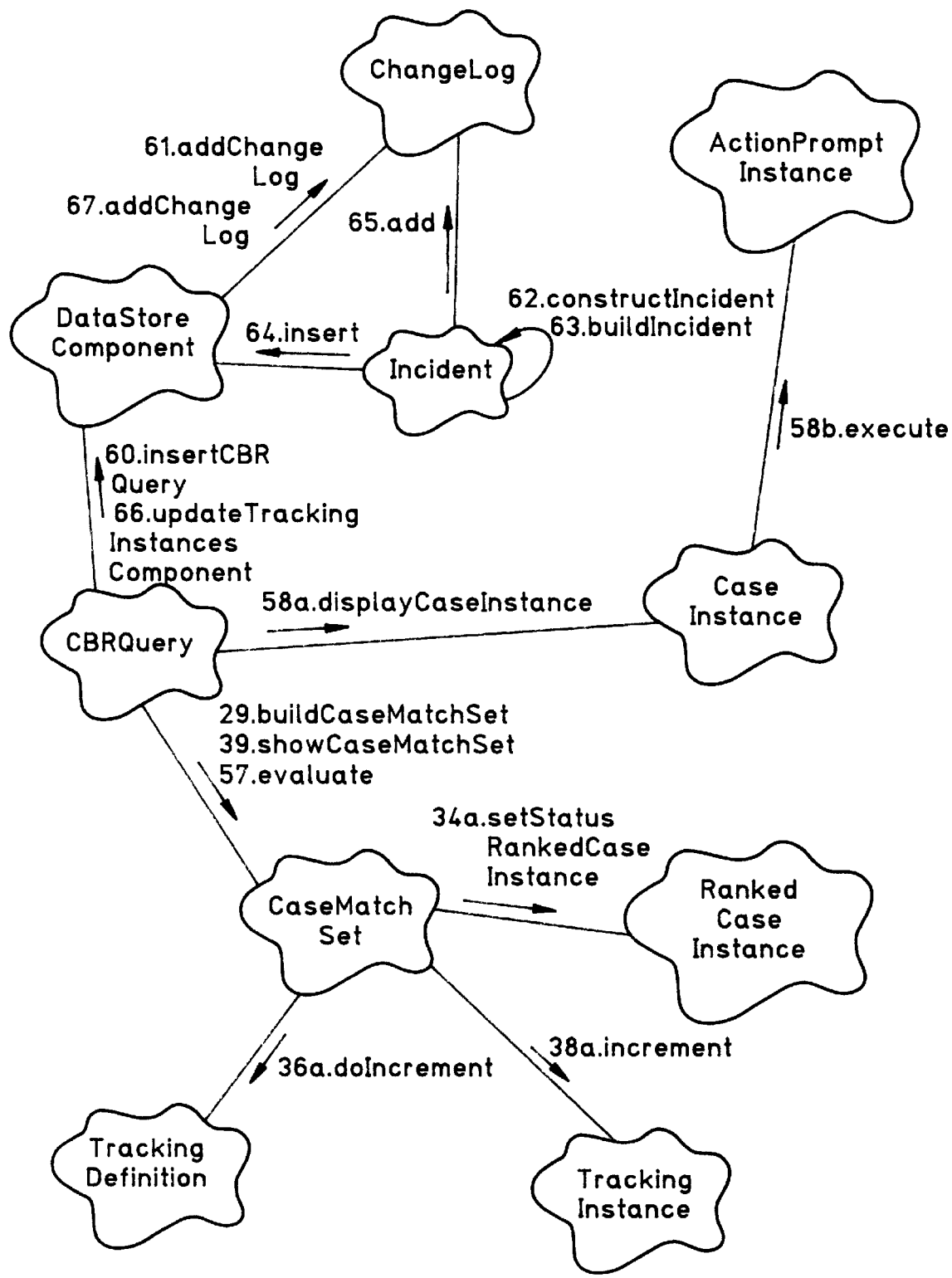
FIG. 49 is a scenario diagram representation of the processing steps executed by the host processor illustrated in FIG. 8 when a Query solution is evaluated.

FIG. 49 illustrates the processing when a query solution is found. The beginning of solution processing is indicated by the legend "57. evaluate" on the connecting line from the CBRQuery object cloud to the CaseMatchSet object cloud. The status of the selected RankedCaseInstance is updated to mark the associated CaseInstance object as a solution for the query. This processing is indicated by the arrow labelled "34a. setStatusRankedCaseInstance" on the connecting line from the CaseMatchSet object cloud to the RankedCaseInstance object cloud.

A doIncrement( ) method is then performed to determine if any tracking information should be updated and, if applicable, corresponding tracking instances are incremented. This processing is represented by the arrows labelled "36a. doIncrement" and "38a. increment" on the connecting lines from the CaseMatchSet object cloud to the TrackingInstance object cloud, respectively. Next the CaseInstance of the solution is displayed to the user, who may then decide to execute associated action prompt instances. Such processing is represented in FIG. 35 by the arrows labelled "58a. displaycaseInstance" from the CBRQuery object cloud to the CaseInstance object cloud and "58b. execute" from the CaseInstance object cloud to the ActionPromptInstance object cloud.

The evaluation processing continues with providing the user with the option of saving the query information into the case base. That is, the CBRQuery information can be saved, with associated objects, using the DataStoreComponent and corresponding ChangeLog additions. The query information becomes part of the case base so that it might conceivably be retrieved to help build a subsequent user query. The storing of the query information into the case base is represented by the legend "60. insertCBRQuery" on the connecting line from the CBRQuery object cloud to the DataStoreComponent object cloud and the legend "61. addChangeLog" on the connecting, line from the DataStoreComponent object cloud to the ChangeLog object cloud.

As an alternative (or in addition) to storing query information in the case base, the user can save the information as an Incident. An Incident cannot be retrieved via a query. That is, the query information saved as an Incident can be retrieved as an Incident or converted into a CaseInstance, but it cannot be retrieved as a member of the case base as a solution to a query. To save query information as an Incident, an Incident object first must be constructed, which is represented by the arrow labelled "62. constructIncident", and then must be built by converting the query information to an incident format, which is represented by the arrow labelled "63. buildIncident", both arrows on the connecting line from the Incident connecting line back onto itself. The built Incident is saved in the DataStoreComponent, represented by the legend "64. insert" on the connecting line from the Incident object cloud to the DataStoreComponent.

After the query information is stored, either in the case base or as an Incident, the ChangeLog is updated, as represented by the arrow labelled "67. addChangeLog" on the connecting line from the DataStoreComponent object cloud to the ChangeLog object cloud. If needed, the tracking instances are updated and the update is added to the ChangeLog. Such processing is represented by the legends "66. update TrackingInstancesComponent" and "67. addChangeLog" on the connecting lines from the CBRQuery object cloud to the DataStoreComponent object cloud and from that cloud to the ChangeLog object cloud. Finally, evaluation processing is completed by executing destruct methods that delete the instantiated objects from the object oriented programming environment of the CBR system, as will be understood by those skilled in the art.

The processing represented by FIG. 49 can be further described by the following table of pseudo-code, which is a continuation of the previous tables of pseudo-code:

TABLE 19

Pseudo-code for End Build/Evaluate Query repeat.

|   | If have solution for the Query |
|---|---|
| 57 | Evaluate: |
| 34a | Set status RankedCaseInstance; |
| 36a | doIncrement TrackingDefinition; |
|   | If should increment |
| 38a | IncrementTrackingInstance; |
|   | If have solution for the Query |
| 58a | Display CaseInstance; |
|   | If user initiates and if prompt level is satisfactory |
| 58b | Execute ActionPromptInstance; |
|   | If user wants to save Query |
| 59 | Store the CBRQuery: |
| 60 | Insert CBRQuery, QueryParameter, Pattern, CompoundProperty Values, and PropertyInstances DataStoreComponent; |
| 61 | Add ChangeLog; |
|   | If user wants to save Query as an Incident |
| 62 | Construct Incident; |
| 63 | Build from QueryIncident; |
| 64 | Insert Incident, PropertyInstances, SimpleValues, CompoundValues, and DataStoreComponent; |
| 65 | Add ChangeLog; |
|   | If needed: |
| 66 | Update TrackingInstances DataStoreComponent; |
| 67 | Add ChangeLog; |
|   | Destruct objects; |
| End Single Query. | |

This destruct operation completes the processing of the CBR system, which then awaits another user request.

The embodiments and examples set forth herein were presented in order to best explain the present invention and its practical application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed. Many modifications and variations are possible in light of the above teaching without departing from the spirit and scope of the following claims.

Notation

There is, as yet, no uniformly accepted notation for communicating object-oriented programming ideas. The notation used in this specification is very similar to that known in the programming industry as Booch notation, after Grady Booch. Mr. Booch is the author of *Object-Oriented Analysis and Design With Applications*, 2d ed. (1994), available from The Benjamin/Cummings Publishing Company, Inc., Redwood City, Calif., USA. Use of Booch notation concepts within this specification should not be taken to imply any connection between the inventors and/or the assignee of this patent application and Mr. Booch or Mr. Booch's employer. The notational system used by Mr. Booch is more fully explained at Chapter 5. pp. 171–228 of the aforementioned book. The notational system used herein will be explained generally below. Other notational conventions used herein will be explained as needed.

A system that is modeled by an object-oriented framework can be represented at a high level of abstraction by a diagram called a top-level class diagram. FIG. 1 of the drawings is an example of a top-level class diagram containing boxes that represent abstractions of the modeled system. The boxes are arranged in a hierarchy such that boxes representing abstractions close to the physical components of the system are at the lower levels of the diagram and boxes representing more abstract, functional components are closer to the top of the diagram. In FIG. 1, the boxes are labelled as "mechanisms" to denote that the abstractions comprise means for implementing modeled system components. The boxes (mechanisms) can be thought of as categories comprising groups of similar classes defined according to object-oriented programming concepts. FIG. 1 represents a zoo administration model and therefore the lower hierarchy boxes include a box called Animal Mechanism, which represents animals within the zoo model, and a box called Containment Unit Mechanism, which represents animal pens and cages. At the highest level of FIG. 1, the box called Zoo Administration represents a functional abstraction that encompasses a variety of administrative tasks that are performed by personnel.

The boxes in a top-level class diagram represent the system abstractions that provide the system behavior. The system abstractions include classes and objects. Details of the system classes are provided in a class diagram that is used to show the class categories and to indicate the relationships and responsibilities of the classes. A class is represented by an irregularly shaped, dashed-line icon commonly referred to as a cloud. FIG. 2, for example, shows several classes represented as clouds. Each class is identified by a name that is unique to the associated class category and also indicates the relationship of each class to one of the mechanisms illustrated in FIG. 1. Within a class icon, the class name is listed above attribute names, operation names followed by parentheses, and constraints that are enclosed within brackets. FIG. 3 illustrates the class Zoo Administrator in greater detail. FIG. 3 indicates that the Zoo Administrator class includes multiple operations, including ones called "5_minute_timer( )", "add_animal( )", and "add_containment_unit( )". Words in the operation names (and class attribute names) are sometimes separated by an underscore for easier reading. An example of a class attribute listing is shown by the attributes called "feed_freq" and "temp_range" in the class Animals illustrated in FIG. 5.

Connecting lines between mechanisms (FIG. 1) and classes (FIG. 2) indicate the nature of the relationships between such respective abstractions. Thus, connections between the boxes in FIG. 1 represent relationships between the various mechanisms. A straight connecting line, for example, represents a simple association relationship indicating shared information. A "using" relationship is a refinement of a simple association whereby one abstraction that is referred to as a server or supplier provides services to another abstraction that is referred to as a client. Such a relationship is indicated by an open circle at one end of a simple association line, the open circle end designating the client that "uses" the associated server.

Another refinement of a simple association between two classes is a type referred to as an inheritance relationship. Inheritance is a relationship among classes in which one class shares the structure and/or behavior associated with one or more other classes. An inheritance association is also referred to as a "is a" relationship. Thus, given two classes A and B, the class A has an inheritance relationship with the class B if A is an example of a B; A is said to be a subclass of B and B is said to be a superclass or parent of A. That is, A "is a" B. An inheritance relationship is denoted with a connecting line that includes an arrowhead at one end to indicate a subclass that derives its characteristics from a parent class at the other end of the line.

Another refinement of class relationships is called an aggregation relationship, which denotes an association between a whole and its parts or attribute classes. In notation, an aggregation relationship is indicated between a whole class and an attribute class connected with an association line by a solid circle at the whole class end, with an attribute class at the other end.

Another relationship specified by a class diagram is an instantiation relationship. An instantiation relationship represents an instance of a class such as a particular implementation of a class as supported by a programming language. For example, a class called "animal" can have multiple instantiations comprising lions, tigers, and bears. An instantiation of a class is represented by a dashed association line with an arrowhead pointing from an instance of a class to the general class.

Finally, a class relationship referred to as a metaclass denotes a relationship in which a class itself is treated as an object that can be manipulated. That is, a metaclass is a class whose instances are themselves classes. Some computer languages, such as Small Talk, support the concept of a metaclass. Such relationships are denoted by a shaded line with an arrowhead pointing from an instance of a metaclass to the general metaclass.

Classes can be parameterized, which denotes a family of classes whose structure and behavior are defined independently of its formal class parameters. A parameterized class is represented by a cloud-shaped class icon with a rectangular box placed over a portion of the cloud. The parameter list is named within the rectangular box. An instantiated class includes a parameter box, called an adornment, in contrast to a dashed line box for a general class. The instantiation relationship between a parameterized class and its instantiated class is represented as a dashed line pointing to the parameterized class. Typically, an instantiated class requires a "using" relationship to another concrete class for use as an actual parameter.

Properties of classes can be represented by class adornments that are enclosed within the class cloud icon. In particular, an abstract class is denoted by an upper case block "A" within a triangle that is placed within a cloud. An abstract class is a class for which no instances may be created. That is, it is a class of classes. Other class adornments are functions of the OO implementation language. For example, the C++ language permits special class qualifications that will be given special adornments. A static class is represented by an upper case block "S" within an adornment triangle, a friend class is denoted by an upper case block "F" within an adornment triangle, and a virtual class is represented by an upper case block "V" within an adornment triangle.

In addition to defining classes, a designer of an object oriented programming system must define objects (see Chapter 5 of the Booch reference). Objects are represented as solid line clouds within which is placed the object name located above a list of object attributes. An object is a tangible entity that exhibits a well defined behavior. An object is intended to represent some part of a real system that is being represented by the object oriented program. An object is characterized by a state, a behavior, and an identity. An object can be thought of as an instance of a class. The behavior of an object is an indication of how the object acts and reacts in terms of its state changes and its message-passing actions.

Objects and their interrelationships are represented in object diagrams that comprise object icons having links that indicate synchronization between objects. Links are sequentially numbered to indicate the flow of operations. The existence of a link between two objects indicates an association between their corresponding classes and denotes a path of communication between them. Thus, a link between two objects indicates that one object may send messages to another. The direction of message transfer is indicated by adorning a simple connecting line with an arrowhead that points from an object that invokes an operation, referred to as the client, to the object that provides the operation, referred to as the supplier. Such a representation of a simple synchronization relationship denotes the simplest form of message-passing. Such an association can indicate, for example, the invocation of an operation. Operation parameters can be indicated adjacent the linking line.

Some objects may be active, meaning that they embody their own thread of control. That is, such objects are not simply sequential. Active objects may have a variety of concurrency characteristics. If an object has multiple threads of control, then synchronization must be specified. Message synchronization can be synchronous, meaning that the client will wait until the supplier accepts the message. Synchronous synchronization is indicated with an "X" with an arrowhead. Synchronization can encompass balking message-passing, meaning that the client will abandon the message if the supplier cannot immediately service the message. Balking is indicated with an arrowhead turned back on itself. Synchronization can encompass a time-out synchronization, meaning that the client will abandon the message if the supplier cannot service the message within a specified amount of time. Time-out synchronization is indicated with a clock face representation adjacent a linking arrowhead. Finally, synchronization can encompass an asynchronous message, meaning that the client sends an event to a supplier for processing, the supplier queues the message, and the client then proceeds without waiting for the supplier. Those skilled in the art will appreciate that asynchronous message synchronization is analogous to interrupt handling. Asynchronous message synchronization is indicated with a half arrowhead.

It bears mention that the Booch notation includes interaction diagrams that trace the execution of objects and classes. Interaction diagrams are essentially restructured object diagrams. That is, interaction diagrams do not convey any additional information from that conveyed by object diagrams, but simply present the same information in a different format. The present specification makes use of object diagrams rather than interaction diagrams, but those skilled in the art will recognize that then are equivalent and also will understand how to convert from one to the other without further explanation.

In FIG. 7 for example, the object called Zelda 706 obtains a list of current zoo keepers by calling an operation called List Zoo Keepers from the object called Zoo Keeper Register. The second processing step is represented in FIG. 7 by the Zoo Keeper Register object responding to the operation call by passing a message to the Zelda object that comprises the zoo keeper list. The zoo keeper objects include members of the Zoo Keepers class called Tina, Vince, and Fred. The third step indicated in the object diagram is for the object Zelda to pass a message to each of the zoo keepers instructing them to check the animals by calling the respective Check Animals operation of each zoo keeper object.

We claim:

1. A computer system comprising:
    a central processing unit;
    a user interface; and
    a main memory having an operating system that supports an object oriented programming environment containing framework that provides an extensible case-based reasoning system that evaluates a user query by determining a set of case instance descriptions that most closely match properties of a query object corresponding to the user query and thereby produces a solution to the user query;
    wherein the case instance descriptions comprise an object oriented programming case set class having case instance objects that include property objects, value objects, and attributes.

2. A computer system as defined in claim 1, wherein the framework permits a user to provide a case structure definition class that specifies an inheritance data structure for the case instance objects.

3. A computer system as defined in claim 1, wherein the case instance objects have a data structure and behavior specified by a case structure definition class having property objects and corresponding property value attributes.

4. A computer system as defined in claim 3, wherein the property objects include simple value objects and compound value objects.

5. A computer system as defined in claim 3, wherein the case instance objects further include weight instance objects that assign weight attribute values to each of the property objects.

6. A computer system as defined in claim 1, wherein the framework permits a user to provide an action prompt definition class of objects that specify computer system prompts that are displayed to a user and, upon a received user response, initiate a computer system action.

7. A computer system as defined in claim 1, wherein the framework permits a user to provide an index definition class of objects that specify a subset of the case instance object properties and in which the properties are included, thereby comprising an index to the case instance objects.

8. A computer system as defined in claim 1, wherein the query object includes a pattern of attributes and property objects and value objects corresponding to the attributes, property objects, and value objects of the case instance class of objects, and is evaluated in a match scoring operation that compares the attributes, properties, and values of the query object with the corresponding attributes, properties, and values of a case instance object and computes a match score indicating the similarity of the query object and the case instance object.

9. A computer system as defined in claim 8, wherein the match scoring operation comprises a dynamically weighted operation in which weight multiplier values are applied to designated properties of the query object and the case instance object, wherein each weight multiplier value indicates an importance ranking of the designated property relative to the other properties of the respective query object and case instance object.

10. A computer system as defined in claim 9, wherein the weight multiplier values are received from the user and are then applied to the query and case instance properties.

11. A computer system as defined in claim 10, wherein one or more of the weight multiplier values are zero, such that a zero weight multiplier value is designated for properties that are not to be penalized in the computation of a match score if unspecified.

12. A computer system as defined in claim 8, wherein the match scoring operation comprises a dynamically weighted operation in which relative usage factors are applied to designated properties of the query object and case instance object by multiplying each designated property weight of the query object and case instance object by a corresponding respective query usage scaling factor or case instance usage scaling factor.

13. A computer system as defined in claim 12, wherein the relative usage factors are received from the user and are then applied to the property weights of the query and case instance properties.

14. A computer system as defined in claim 1, wherein the framework permits a user to store the query object into the case set class, whereupon the stored query object can then be retrieved from the case set as the solution to a newly defined query object.

15. A computer system as defined in claim 1, wherein the framework permits a user to specify an incident class of objects into which a query object can be stored or later retrieval and further processing.

16. A computer system comprising:
- a central processing unit;
- a user interface; and
- a main memory having an operating system that supports an object oriented programming environment containing a framework that provides an extensible case-based reasoning system that evaluates a user query by determining a set of case instance descriptions that most closely match properties of a query object corresponding to the user query and thereby produces a solution to the user query;
- wherein the case instance descriptions comprise an object oriented programming case set class having case instance objects that include property objects, value objects, and attributes;
- the framework permits a user to provide a case structure definition class that specifies an inheritance data structure for the case instance objects; and
- wherein a user may change the case structure definition class and the computer system, in response, records the change in a change log.

17. A computer system as defined in claim 16, wherein the change log is an object oriented programming class of objects.

18. A computer system comprising:
- a central processing unit;
- a user interface; and
- a main memory having an operating system that supports an object oriented programming environment containing a framework that provides an extensible case-based reasoning system that evaluates a user query by determining a set of case instance descriptions that most closely match properties of a query object corresponding to the user query and thereby produces a solution to the user query;
- wherein the case instance descriptions comprise an object oriented programming case set class having case instance objects that include property objects, value objects, and attributes; and
- wherein the framework permits a user to provide a tracking definition class of objects that specify a case instance attribute status condition that is to be detected and upon which a tracking count is incremented.

19. A computer system comprising:
- a central processing unit;
- a user interface; and
- a main memory having an operating system that supports an object oriented programming environment containing a framework that provides an extensible case-based reasoning system that evaluates a user query by determining a set of case instance descriptions that most closely match properties of a query object corresponding to the user query and thereby produces a solution to the user query;
- wherein the case instance descriptions comprise an object oriented programming case set class having case instance objects that include property objects, value objects, and attributes; and
- wherein the framework permits a user to provide a parsing definition class of objects that specify a parsing scheme to be used in a parsing operation on text or property values in a query object.

20. A computer system as defined in claim 19, wherein the text parsing operation includes token parsing for language translation.

21. A computer system comprising:
- central processing unit;
- a user interface; and
- a main memory having an operating system that supports an object oriented programming environment containing a framework that provides an extensible case-based reasoning system that evaluates a user query by determining a set of case instance descriptions that most closely match properties of a query object corresponding to the user query and thereby produces a solution to the user query;
- wherein the case instance descriptions comprise an object oriented programming case set class having case instance objects that include property objects value objects, and attributes;
- wherein the query object includes a pattern of attributes and property objects and value objects corresponding to the attributes, property objects, and value objects of the case instance class of objects, and is evaluated in a match scoring operation that compares the attributes, properties, and values of the query object with the corresponding attributes, properties, and values of a case instance object and computes a match score indicating the similarity of the query object and the case instance object; and
- wherein the match scoring operation comprises calculating a raw match score indicative of the similarity between the properties of the query object and the case instance object and multiplying the raw match score by a delta factor that is a function of property ranking values that indicate an importance ranking of each property relative to the other properties of the respective query object and case instance object, and the delta factor is defined as $$\text{delta factor} = 1 + \frac{\sum(\text{ignored ranking values}) - \sum(\text{additional ranking values})}{\sum(\text{ranking values}) - \sum(\text{ignored ranking values}) + \sum(\text{additional ranking values})}$$

where the ignored ranking values comprise properties that are not specified in a query or case instance and the additional ranking values comprise the remaining properties, and the summation symbols indicate the sum of the corresponding ranking values.

22. A computer system as defined in claim 21, wherein the ranking values are scalar numbers that specify a relative numerical ranking of each property relative to the others in a case definition.

23. An object oriented framework for use in a computer system having an operating system that supports an object oriented programming environment that defines a case set class having case instance objects that include property objects, value objects, and attributes comprising case instance descriptions and provides an extensible case-based reasoning system that evaluates a user query by determining a set of the case instance objects that most closely match a query object corresponding to the user query and thereby produces a solution to the user query.

24. An object oriented framework as defined in claim 23, wherein the framework permits a user to provide a case structure definition class that specifies an inheritance data structure for the case instance objects.

25. An object oriented framework as defined in claim 23, wherein the case instance objects have a data structure and behavior specified by a case structure definition class having property objects and corresponding property value attributes.

26. An object oriented framework as defined in claim 25, wherein the property objects include simple value objects and compound value objects.

27. An object oriented framework as defined in claim 25, wherein the case instance objects further include weight instance objects that assign weight attribute values to each of the property objects.

28. An object oriented framework as defined in claim 23, wherein the framework permits a user to provide an action prompt definition class of objects that specify computer system prompts that are displayed to a user and, upon a received user response, initiate a computer system action.

29. An object oriented framework as defined in claim 23, wherein the framework permits a user to provide an index definition class of objects that specify a subset of the case instance object properties and in which the properties are included, thereby comprising an index to the case instance objects.

30. An object oriented framework as defined in claim 23, wherein the query object includes a pattern of attributes and property and value objects corresponding to the attributes, property objects, and value objects of the case instance class of objects, and is evaluated in a match scoring operation that compares the attributes, properties, and values of the query object with the corresponding attributes, properties, and values of a case instance object and computes a match score indicating the similarity of the query object and the case instance object.

31. An object oriented framework system as defined in claim 30, wherein the match scoring operation comprises a dynamically weighted operation in which weight multiplier values are applied to designated properties of the query object and the case instance object, wherein each weight multiplier value indicates an importance ranking of the designated property relative to the other properties of the respective query object and case instance object.

32. An object oriented framework as defined in claim 31, wherein the weight multiplier values are received from the user and are then applied to the query and case instance properties.

33. An object oriented framework as defined in claim 31, wherein one or more of the weight multiplier values are zero, such that a zero weight multiplier value is designated for properties that are not to be penalized in the computation of a match score if unspecified.

34. An object oriented framework as defined in claim 30, wherein the match scoring operation comprises a dynamically weighted operation in which relative usage factors are applied to designated properties of the query object and case instance object by multiplying each designated property weight of the query object and case instance object by a corresponding respective query usage scaling factor or case instance usage scaling factor.

35. An object oriented framework as defined in claim 34, wherein the relative usage factors are received from the user and are then applied to the property weights of the query and case instance properties.

36. An object oriented framework as defined in claim 23, wherein the framework permits a user to store the query object into the case set class, whereupon the stored query object can then be retrieved from the case set as the solution to a newly defined query object.

37. An object oriented framework as defined in claim 23, wherein the framework permits a user to specify an incident class of objects into which a query object can be stored for later retrieval and further processing.

38. An object oriental framework for use in a computer system having an operating system that supports an object oriented programming environment that defines a case set class having case instance objects that include property objects, value objects, and attributes comprising case instance descriptions and provides an extensible case-based reasoning system that evaluates a user query by determining a set of the case instance objects that most closely match a query object corresponding to the user query and thereby produces a solution to the user query;

wherein the framework permits a user to provide a case structure definition class that specifies an inheritance data structure for the case instance objects; and wherein a user may change the case structure definition class and the computer system, in response, records the change in a change log.

39. An object oriented framework as defined in claim 38, wherein the change log is an object oriented programming class of objects.

40. An object oriented framework for use in a computer system having an operating system that supports an object oriented programming environment that defines a case set class having case instance objects that include property objects, value objects, and attributes comprising case instance descriptions and provides an extensible case-based reasoning system that evaluates a user query by determining a set of the case instance objects that most closely match a query object corresponding to the user query and thereby produces a solution to the user query;

wherein the framework permits a user to provide a tracking definition class of objects that specify a case instance attribute status condition that is to be detected and upon which a tracking count is incremented.

41. An object oriented framework for use in a computer system having an operating system that supports an object oriented programming environment that defines a case set class having case instance objects that include property objects, value objects, and attributes comprising case instance descriptions and provides an extensible case-based reasoning system that evaluates a user query by determining a set of the case instance objects that most closely match a query object corresponding to the user query and thereby produces a solution to the user query;

wherein the framework permits a user to provide a parsing definition class of objects that specify a parsing scheme to be used in a parsing operation on text or property values in a query object.

42. An object oriented framework as defined in claim 41, wherein the text parsing operation includes token parsing for language translation.

43. An object oriented framework for use in a computer system having an operating system that supports an object oriented programming environment that defines a case set class having case instance objects that include property objects, value objects, and attributes comprising case instance descriptions and provides an extensible case-based reasoning system that evaluates a user query by determining a set of the case instance objects that most closely match a query object corresponding to the user query and thereby produces a solution to the user query;

wherein the query object includes a pattern of attributes and property and value objects corresponding to the attributes, property objects, and value objects of the case instance class of objects, and is evaluated in a match scoring operation that compares the attributes, properties, and values of the query object with the corresponding attributes, properties, and values of a case instance object and computes a match score indicating the similarity of the query object and the case instance object; and wherein the match scoring operation comprises calculating a raw match score indicative of the similarity between the properties of the query object and the case instance object and multiplying the raw match score by a delta factor that is a function of property ranking values that indicate an importance ranking of each property relative to the other properties of the respective query object and case instance object, and the delta factor is defined as $$\text{delta factor} = 1 + \frac{\sum (\text{ignored ranking values}) - \sum (\text{additional ranking values})}{\sum (\text{ranking values}) - \sum (\text{ignored ranking values}) + \sum (\text{additional ranking values})}$$

where the ignored ranking values comprise properties that are not specified in a query or case instance and the additional ranking values comprise the remaining properties, and the summation symbols indicate the sum of the corresponding ranking values.

44. An object oriented framework as defined in claim 43, wherein the ranking values are scalar numbers that specify a relative numerical ranking of each property relative to the others in a case definition.

45. A program product for use in a computer system having an operating system that supports an object-oriented programming environment, the program product comprising:

a signal bearing media; and a framework recorded on the signal bearing media, the framework providing an extensible case-based reasoning system that evaluates a user query by determining a set of case instance descriptions that most closely match properties of a query object corresponding to the user query and thereby produces a solution to the user query;

wherein the case instance descriptions comprise an object oriented programming case set class having case instance objects that include attributes, property objects, and value objects.

46. A program product as defined in claim 45, wherein the framework permits a user to provide a case structure definition class that specifies an inheritance data structure for the case instance objects.

47. A program product as defined in claim 45, wherein the case instance objects have a data structure and behavior specified by a case structure definition class having property objects and corresponding property value attributes.

48. A program product as defined in claim 47, wherein the property objects include simple value objects and compound value objects.

49. A program product as defined in claim 47, wherein the case instance objects further include weight instance objects that assign weight attribute values to each of the property objects.

50. A program product as defined in claim 45, wherein the framework permits a user to provide an action prompt definition class of objects that specify computer system prompts that are displayed to a user and, upon a received user response, initiate a computer system action.

51. A program product as defined in claim 45, wherein the framework permits a user to provide an index definition class of objects that specify a subset of the case instance object properties and in which the properties are included, thereby comprising an index to the case instance objects.

52. A program product as defined in claim 45, wherein the query object includes a pattern of attributes and property and value objects corresponding to the attributes, property objects, and value objects of the case instance class of objects, and is evaluated in a match scoring operation that compares the attributes, properties, and values of the query object with the corresponding attributes, properties, and values of a case instance object and computes a match score indicating the similarity of the query object and the case instance object.

53. A program product as defined in claim 52, wherein the match scoring operation comprises a dynamically weighted operation in which weight multiplier values are applied to designated properties of the query object and the case instance object, wherein each weight multiplier value indicates an importance ranking of the designated property relative to the other properties of the respective query object and case instance object.

54. A program product as defined in claim 53, wherein the weight multiplier values are received from the user and are then applied to the query and case instance properties.

55. A program product as defined in claim 53, wherein one or more of the weight multiplier values are zero, such that a zero weight multiplier value is designated for properties that are not to be penalized in the computation of a match score if unspecified.

56. A program product as defined in claim 53, wherein the match scoring operation comprises a dynamically weighted operation in which relative usage factors are applied to designated properties of the query object and case instance object by multiplying each designated property weight of the query object and case instance object by a corresponding respective query usage scaling factor or case instance usage scaling factor.

57. A program product as defined in claim 56, wherein the relative usage factors are received from the user and are then applied to the property weights of the query and case instance properties.

58. A program product as defined in claim 45, wherein the framework permits a user to store the query object into the case set class, whereupon the stored query object can then be retrieved from the case set as the solution to a newly defined query object.

59. A program product as defined in claim 45, wherein the framework permits a user to specify an incident class of objects into which a query object can be stored for later retrieval and further processing.

60. A program product as defined in claim 45, wherein the signal bearing media comprises recordable media.

61. A program product as defined in claim 45, wherein the signal bearing media comprises transmission media.

62. A program product for use in a computer system having an operating system that supports an object-oriented programming environment, the program product comprising:

a signal bearing media; and a framework recorded on the signal bearing media, the framework providing an extensible case-based reasoning system that evaluates a user query by determining a set of case instance descriptions that most closely match properties of a query object corresponding to the user query and thereby produces a solution to the user query;

wherein the case instance descriptions comprise an object oriented programming case set class having case instance objects that include attributes, property objects, and value objects; and wherein the framework permits a user to provide a case structure definition class that specifies an inheritance data structure for the case instance objects;

wherein a user may change the case structure definition class and the computer system, in response, records the change in a change log.

63. A program product as defined in claim 62, wherein the change log is an object oriented programming class of objects.

64. A program product for use in a computer system having an operating system that supports an object-oriented programming environment, the programming product comprising:

a signal bearing media; and a framework recorded on the signal bearing media, the framework providing an extensible case-based reasoning system that evaluates a user query by determining a set of case instance descriptions that most closely match properties of a query object corresponding to the user query and thereby produces a solution to the user query;

wherein the case instance descriptions comprise an object oriented programming case set class having case instance objects that include attributes, property objects, and value objects; and wherein the framework permits a user to provide a tracking definition class of objects that specify a case instance attribute status condition that is to be detected and upon which a tracking count is incremented.

65. A program product for use in a computer system having an operating system that supports an object-oriented programming environment, the program product comprising:

a signal bearing media; and a framework recorded on the signal bearing media, the framework providing an extensible case-based reasoning system that evaluates a user query by determining a set of case instance descriptions that most closely match properties of a query object corresponding to the user query and thereby produces a solution to the user query;

wherein the case instance descriptions comprise an object oriented programming case set class having case instance objects that include attributes, property objects, and value objects; and wherein the framework permits a user to provide a parsing definition class of objects that specify a parsing scheme to be used in a parsing operation on text or property values in a query object.

66. A program product as defined in claim 65, wherein the text parsing operation of the framework includes token parsing for language translation.

67. A program product for use in a computer system having an operating system that supports an object-oriented programming environment, the program product comprising:

a signal bearing media; and a framework recorded on the signal bearing media, the framework providing an extensible case-based reasoning system that evaluates a user query by determining a set of case instance descriptions that most closely match properties of a query object corresponding to the user query and thereby produces a solution to the user query;

wherein the case instance descriptions comprise an object oriented programming case set class having case instance objects that include attributes, property objects, and value objects;

wherein the query object includes a pattern of attributes and property and value objects corresponding to the attributes, property objects, and value objects of the ease instance class of objects, and is evaluated in a match scoring operation that compares the attributes, properties, and values of the query object with the corresponding attributes, properties, and values of a case instance object and computes a match score indicating the similarity of the query object and the case instance object;

wherein the match scoring operation comprises a dynamically weighted operated in which weight multiplier values are applied to designated properties of the query object and the ease instance object, wherein each weight multiplier value indicates an importance ranking of the designated property relative to the other properties of the respective query object and case instance object; and wherein the match scoring operation comprises calculating a raw match score indicative of the similarity between the properties of the query object and the case instance object and multiplying the raw match score by a delta factor that is a function of property ranking values that indicate an importance ranking of each property relative to the other properties of the respective query object and case instance object, and the delta factor is defined as $$\text{delta factor} = 1 + \frac{\sum(\text{ignored ranking values}) - \sum(\text{additional ranking values})}{\sum(\text{ranking values}) - \sum(\text{ignored ranking values}) + \sum(\text{additional ranking values})}$$

where the ignored ranking values comprise properties that are not specified in a query or case instance and the additional ranking values comprise the remaining properties, and the summation symbols indicate the sum of the corresponding ranking values.

68. A program product as defined in claim 67, wherein the ranking values are scalar numbers that specify a relative numerical ranking of each property relative to the others in a case definition.

69. A method of executing an application program in a computer system having a central processing unit that controls processing in the computer system, a user interface, and a main memory having an operating system that supports an object oriented programming environment, the method comprising the steps of:

providing an object oriented framework that provides an extensible case-based reasoning system; and evaluating a user query by determining a set of case instance descriptions that most closely match properties of a query object corresponding to the user query and thereby produces a solution to the user query;

wherein the case instance descriptions of the provided object oriented framework comprise an object oriented programming case set class having case instance object that include attributes, property objects, and value objects.

70. A method as defined in claim 69, wherein the provided framework permits a user to provide a case structure definition class that specifics an inheritance data structure for the case instance objects.

71. A method as defined in claim 69, wherein the case instance objects have a data structure and behavior specified by a case structure definition class having property objects and corresponding property value attributes.

72. A method as defined in claim 71, wherein the property objects include simple value objects and compound value objects.

73. A method as defined in claim 71, wherein the case instance objects further include weight instance objects that assign weight attribute values to each of the property objects.

74. A method as defined in claim 69, wherein the provided framework permits a user to provide an action prompt definition class of objects that specify computer system prompts that are displayed to a user and, upon a received user response, initiate a computer system action.

75. A method as defined in claim 69, wherein the provided framework permits a user to provide an index definition class of objects that specify a subset of the case instance object properties and in which the properties are included, thereby comprising an index to the case instance objects.

76. A method as defined in claim 69, wherein the query object includes a pattern of attributes and property objects and value objects corresponding to the attributes, property objects, and value objects of the case instance class of objects, and is evaluated in a match scoring operation that compares the attributes, properties, and values of the query object with the corresponding attributes, properties, and values of a case instance object and computes a match score indicating the similarity of the query object and the case instance object.

77. A method as defined in claim 76, wherein the match scoring operation of the provided framework comprises a dynamically weighted operation in which weight multiplier values are applied to designated properties of the query object and the case instance object, wherein each weight multiplier value indicates an importance ranking of the designated property relative to the other properties of the respective query object and case instance object.

78. A method as defined in claim 77, wherein the weight multiplier values are received from the user and are then applied to the query and case instance properties.

79. A method as defined in claim 78, wherein one or more of the weight multiplier values are zero, such that a zero weight multiplier value is designated for properties that are not to be penalized in the computation of a match score if unspecified.

80. A method as defined in claim 76, wherein the match scoring operation of the provided framework comprises a dynamically weighted operation in which relative usage factors are applied to designated properties of the query object and case instance object by multiplying each designated property weight of the query object and case instance object by a corresponding respective query usage scaling factor or case instance usage scaling factor.

81. A method as defined in claim 80, wherein the relative usage factors are received from the user and are then applied to the property weights of the query and case instance properties.

82. A method as defined in claim 69, wherein the provided framework permits a user to store the query object into the case set class, whereupon the stored query object can then be retrieved from the case set as the solution to a newly defined query object.

83. A method as defined in claim 69, wherein the provided framework permits a user to specify an incident class of objects into which a query object can be stored for later retrieval and further processing.

84. A method of executing an application program in a computer system having a central processing unit that controls processing in the computer system, a user interface, and a main memory having an operating system that supports an object oriented programming environment, the method comprising the steps of:

providing an object oriented framework that provides an extensible case-based reasoning system; and evaluating a user query by determining a set of case instance descriptions that most closely match properties of a query object corresponding to the user query and thereby produces a solution to the user query;

wherein the case instance descriptions of the provided object oriented framework comprise an object oriented programming case set class having case instance objects that include attributes, property objects, and value objects;

wherein the provided framework permits a user to provide a case structure definition class that specifies and inheritance data structure for the case instance objects; and wherein a user may change the case structure definition class and the computer system, in response, records the change in a change log.

85. A method as defined in claim 84, wherein the change log is an object oriented programming class of objects.

86. A method of executing an application program in a computer system having a central processing unit that controls processing in the computer system, a user interface, and a main memory having an operating system that supports an object oriented programming environment, the method comprising the steps of:

providing an object oriented framework that provides an extensible case-based reasoning system; and evaluating a user query by determining a set of case instance descriptions that most closely match properties of a query object corresponding, to the user query and thereby produces a solution to the user query;

wherein the user instance descriptions of the provided object oriented framework comprise an object oriented programming case set class having case instance objects that include attributes, property objects, and value objects; and wherein the provided framework permits a user to provide a tracking definition class of objects that specify a case instance attribute status condition that is to be detected and upon which a tracking count is incremented.

87. A method of executing an application program in a computer system having a central processing unit that controls processing in the computer system, a user interface, and a main memory having an operating system that supports an object oriented programming environment, the method comprising the steps of:

providing an object oriented framework that provides an extensible case-based reasoning system; and evaluating a user query by determining a set of case instance descriptions that most closely match properties of a query object corresponding to the user query and thereby produces a solution to the user query;

wherein the case instance descriptions of the provided object oriented framework comprise an object oriented programming case set class having case instance objects that include attributes, property objects, and value objects; and wherein the provided framework permits a user to provide a parsing definition class of objects that specify a parsing scheme to be used in a parsing operation on text or property values in a query object.

88. A method as defined in claim 87, wherein the text parsing operation of the provided framework includes token parsing for language translation.

89. A method of executing an application program in a computer system having a central processing unit that controls processing in the computer system, a user interface, and a main memory having an operating system that supports an object oriented programming environment, the method comprising the steps of:

providing an object oriented framework that provides an extensible case-based reasoning system; and evaluating a user query by determining a set of case instance descriptions that most closely match properties of a query object corresponding to the user query and thereby produces a solution to the user query;

wherein the case instance descriptions of the provided object oriented framework comprise an object oriented programming case set class having case instance objects that include attributes, property objects, and value objects;

wherein the query object includes a pattern of attributes and property objects and value objects corresponding to the attributes, property objects, and value objects of the case instance class of objects, and is evaluated in a match scoring operation that compares the attributes, properties, and values of the query object with the corresponding attributes, properties, and values of a case instance object and computes a match score indicating the similarity of the query object and the case instance object; and wherein the match scoring operation of the provided framework comprises calculating a raw match score indicative of the similarity between the properties of the query object and the case instance object and multiplying the raw match score by a delta factor that is a function of property ranking values that indicate an importance ranking of each property relative to the other properties of the respective query object and case instance object, and the delta factor is defined as $$\text{delta factor} = 1 + \frac{\sum(\text{ignored ranking values}) - \sum(\text{additional ranking values})}{\sum(\text{ranking values}) - \sum(\text{ignored ranking values}) + \sum(\text{additional ranking values})}$$

where the ignored ranking values comprise properties that are not specified in a query or case instance and the additional ranking values comprise the remaining properties, and the summation symbol indicate the sum of the corresponding ranking values.

90. A method as defined in claim 89, wherein the ranking values are scalar numbers that specify a relative numerical ranking of each property relative to the others in a case definition.

91. A method of executing an application program in a computer system having a central processing unit that controls processing in the computer system, a user interface, and a main memory having an operating system that supports a programming environment, the method comprising the steps of:

providing a case-based reasoning system that operates in the programming environment; and evaluating a user query by determining a set of case instance descriptions that most closely match properties of a user query and thereby produces a solution to the user query; wherein:

the case instances comprise data structures that include properties, values, and attributes;

the user query specifies a pattern of properties, values, and attributes, and is evaluated in a match scoring operation that compares the properties, values, and attributes of the user query with the corresponding properties, values, and attributes of a case instance and computes a match score indicating the similarity of the user query and the case instance; and the match scoring operation comprises a dynamically weighted operation in which weight multiplier values are applied to designated properties of the user query and the case instance, wherein each weight multiplier value indicates an importance ranking of the designated property relative to the other properties of the respective user query and case instance.

92. A method as defined in claim 91, wherein the weight multiplier values are received from the user and are then applied to the user query and case instance properties.

93. A method as defined in claim 92, wherein one or more of the weight multiplier values are zero, such that a zero weight multiplier value is designated for properties that are not to be penalized in the computation of a match score if unspecified.

94. A method as defined in claim 93, wherein the match scoring operation comprises a dynamically weighted operation in which relative usage factors are applied to designated properties of the user query and case instance by multiplying each designated property weight of the user query and case instance by a corresponding respective query usage scaling factor or case instance usage scaling factor.

95. A computer system as defined in claim 94, wherein the relative usage factors are received from the user and are then applied to the property weights of the user query and case instance properties.

96. A method of executing an application program in a computer system having a central processing unit that controls processing in the computer system, a user interface, and a main memory having an operating system that supports a programming environment, the method comprising the steps of:

providing a case-based reasoning system that operates in the programming environment; and evaluating a user query by determining a set of case instance descriptions that most closely match properties of a user query and thereby produces a solution to the user query; wherein:

the case instances comprise data structures that include properties, values, and attributes;

the user query specifies a pattern of properties, values, and attributes, and is evaluated in a match scoring operation that compares the properties, values, and attributes of the user query with the corresponding properties, values, and attributes of a case instance and computes a match score indicating the similarity of the user query and the instance; and the match scoring operation comprises a dynamically weighted operation in which weight multiplier values are applied to designated properties of the user query and the case instance, wherein each weight multiplier value indicates an importance ranking of the designated property relative to the other properties of the respective user query and case instance;

wherein the match scoring operation comprises calculating a raw match score indicative of the similarity between the properties of the user query and the case instance and multiplying the raw match score by a delta factor that is a function of property ranking values that indicate an importance ranking of each property relative to the other properties of the respective user query and case instance, and the delta factor is defined as $$\text{delta factor} = 1 + \frac{\sum(\text{ignored ranking values}) - \sum(\text{additional ranking values})}{\sum(\text{ranking values}) - \sum(\text{ignored ranking values}) + \sum(\text{additional ranking values})}$$

where the ignored ranking values comprise properties that are not specified in a user query or case instance and the additional ranking values comprise the remaining properties, and the summation symbols indicate the sum of the corresponding ranking values.

97. A method as defined in claim 96, wherein the ranking values are scalar numbers that specify a relative numerical ranking of each property relative to the others in a case instance.

98. A method as defined in claim 96, wherein the step of providing a case-based reasoning system comprises providing an object oriented framework that provides an extensible case-based reasoning system and the case instance descriptions and user query are object oriented programming objects.

* * * * *

UNITED STATES PATENT AND TRADEMARK OFFICE
CERTIFICATE OF CORRECTION

PATENT NO. : 6,081,798
DATED : Jun. 27, 2000
INVENTOR(S) : Verlyn Mark Johnson, Dennis Dale Koski, Thomas Alan Shore It is certified that an error appears in the above-identified patent and that said Letters Patent is hereby corrected as shown below:

Claim 67, Col. 72, Line 25, "ease" should be --case--.

Claim 67, Col. 72, Line 33, "operated" should be --operation--.

Claim 67, Col. 72, Line 35, "ease" should be --case--.

Claim 69, Col. 73, Line 13, "object" should be --objects--.

Claim 84, Col. 74, Line 38, "and" should be --an--.

Claim 86, Col. 74, Line 56, "corresponding," should be --corresponding--.

Claim 86, Col. 74, Line 58, "user" should be --case--.

Claim 89, Col. 76, Line 9, "query" should be --user query--.

Claim 96, Col. 77, Line 18, "instance" should be --case instance--.

Signed and Sealed this

Twenty-fourth Day of April, 2001

Attest:

NICHOLAS P. GODICI

*Attesting Officer*    *Acting Director of the United States Patent and Trademark Office*